United States Patent
Ganzi et al.

(10) Patent No.: US 12,180,103 B2
(45) Date of Patent: Dec. 31, 2024

(54) TREATMENT OF SALINE WATER FOR AGRICULTURAL AND POTABLE USE AND FOR GENERATION OF DISINFECTANT SOLUTION

(71) Applicant: Evoqua Water Technologies LLC, Pittsburgh, PA (US)

(72) Inventors: Gary C Ganzi, Lexington, MA (US); Joshua Griffis, Ashburnham, MA (US); Simon Dukes, Chelmsford, MA (US); Li-Shiang Liang, Harvard, MA (US); Darren Adrian Dale, Chesterfield (GB); Michael Shaw, Bedford, NH (US); Paul Beddoes, Shirehampton (GB); George Gu, Austin, TX (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 259 days.

(21) Appl. No.: 16/287,203

(22) Filed: Feb. 27, 2019

(65) Prior Publication Data
US 2019/0263697 A1    Aug. 29, 2019

Related U.S. Application Data

(63) Continuation-in-part of application No. PCT/US2018/047034, filed on Aug. 20, 2018.
(Continued)

(51) Int. Cl.
*C02F 9/00*        (2006.01)
*C02F 1/44*        (2006.01)
(Continued)

(52) U.S. Cl.
CPC ............... *C02F 9/00* (2013.01); *C02F 1/20* (2013.01); *C02F 1/442* (2013.01);
(Continued)

(58) Field of Classification Search
CPC .................. C02F 1/4693; C02F 1/4674
See application file for complete search history.

(56) References Cited

U.S. PATENT DOCUMENTS

| 2,514,415 A | 7/1950 | Rasch |
| 2,681,319 A | 6/1954 | Bodamer |

(Continued)

FOREIGN PATENT DOCUMENTS

| AU | 629790 A | 10/1992 |
| CA | 2316012 C | 4/2005 |

(Continued)

OTHER PUBLICATIONS

USFilter, "H-Series Industrial CDI(r) Systems," product information, 1998, 4 pgs.
(Continued)

*Primary Examiner* — Salil Jain

(57) ABSTRACT

A water treatment system for producing potable water and water for irrigation from saline water, the system includes an electrodialysis apparatus including one or more monovalent selective membranes and having an inlet fluidly connectable to a source of water to be treated, a diluate outlet, and a concentrate outlet, a nanofiltration apparatus positioned downstream of the electrodialysis apparatus and having an inlet fluidly connectable to the diluate outlet of the electrodialysis apparatus, a permeate outlet, and a retentate outlet, and an electrolyzer in fluid communication with one of the concentrate outlet and the retentate outlet, and configured to generate a product stream including one or more of chlorine gas, hypochlorite ion, sodium hydroxide, sulfuric acid, hydrochloric acid, or sodium hypochlorite.

14 Claims, 31 Drawing Sheets

Related U.S. Application Data

(60) Provisional application No. 62/547,971, filed on Aug. 21, 2017, provisional application No. 62/635,731, filed on Feb. 27, 2018.

(51) Int. Cl.
  *C02F 1/467* (2006.01)
  *C02F 1/20* (2023.01)
  *C02F 1/461* (2023.01)
  *C02F 1/469* (2023.01)
  *C02F 1/66* (2023.01)
  *C02F 1/74* (2023.01)
  *C02F 101/10* (2006.01)
  *C02F 101/16* (2006.01)
  *C02F 103/08* (2006.01)

(52) U.S. Cl.
  CPC .. *C02F 2001/46128* (2013.01); *C02F 1/4674* (2013.01); *C02F 1/4693* (2013.01); *C02F 1/66* (2013.01); *C02F 1/74* (2013.01); *C02F 2101/106* (2013.01); *C02F 2101/108* (2013.01); *C02F 2101/163* (2013.01); *C02F 2103/08* (2013.01); *C02F 2201/46115* (2013.01); *C02F 2201/4612* (2013.01); *C02F 2209/005* (2013.01); *C02F 2209/06* (2013.01); *C02F 2301/043* (2013.01)

(56) References Cited

U.S. PATENT DOCUMENTS

| | | |
|---|---|---|
| 2,681,320 A | 6/1954 | Bodamer |
| 2,788,319 A | 4/1957 | Pearson |
| 2,794,777 A | 6/1957 | Pearson |
| 2,815,320 A | 12/1957 | Kollsman |
| 2,854,394 A | 9/1958 | Kollsman |
| 2,923,674 A | 2/1960 | Kressman |
| 2,943,989 A | 7/1960 | Kollsman |
| 3,014,855 A | 12/1961 | Kressman |
| 3,035,777 A | 5/1962 | Bodell et al. |
| 3,074,864 A | 1/1963 | Gaysowski |
| 3,099,615 A | 7/1963 | Kollsman |
| 3,148,687 A | 9/1964 | Dosch |
| 3,149,061 A | 9/1964 | Parsi |
| 3,149,062 A | 9/1964 | Gottschal |
| 3,165,460 A | 1/1965 | Zang |
| 3,291,713 A | 12/1966 | Parsi |
| 3,330,750 A | 7/1967 | McRae et al. |
| 3,341,441 A | 9/1967 | Giuffrida et al. |
| 3,375,208 A | 3/1968 | Duddy |
| 3,627,703 A | 12/1971 | Kojima et al. |
| 3,630,378 A | 12/1971 | Bauman |
| 3,645,884 A | 2/1972 | Gilliland |
| 3,686,089 A | 8/1972 | Korngold |
| 3,755,135 A | 8/1973 | Johnson |
| 3,869,375 A | 3/1975 | Ono et al. |
| 3,869,376 A | 3/1975 | Tejeda |
| 3,870,033 A | 3/1975 | Faylor et al. |
| 3,876,565 A | 4/1975 | Takashima et al. |
| 3,989,615 A | 11/1976 | Kiga et al. |
| 4,032,452 A | 6/1977 | Davis |
| 4,033,850 A | 7/1977 | Kedem et al. |
| 4,089,758 A | 5/1978 | McAloon |
| 4,102,752 A | 7/1978 | Rugh, II |
| 4,116,889 A | 9/1978 | Chlanda et al. |
| 4,119,581 A | 10/1978 | Rembaum et al. |
| 4,130,473 A | 12/1978 | Eddleman |
| 4,153,761 A | 5/1979 | Marsh |
| 4,160,738 A | 7/1979 | Guter |
| 4,167,551 A | 9/1979 | Tamura et al. |
| 4,191,811 A | 3/1980 | Hodgdon |
| 4,197,206 A | 4/1980 | Karn |
| 4,216,073 A | 8/1980 | Goldstein |
| 4,217,200 A | 8/1980 | Kedem et al. |
| 4,226,688 A | 10/1980 | Kedem et al. |
| 4,228,000 A | 10/1980 | Hoeschler |
| 4,294,933 A | 10/1981 | Kihara et al. |
| 4,298,442 A | 11/1981 | Giuffrida |
| 4,321,145 A | 3/1982 | Carlson |
| 4,330,654 A | 5/1982 | Ezzell et al. |
| 4,358,545 A | 11/1982 | Ezzell et al. |
| 4,374,232 A | 2/1983 | Davis |
| 4,430,226 A | 2/1984 | Hegde et al. |
| 4,465,573 A | 8/1984 | O'Hare |
| 4,473,450 A | 9/1984 | Nayak et al. |
| 4,505,797 A | 3/1985 | Hodgdon et al. |
| 4,574,049 A | 3/1986 | Pittner |
| 4,614,576 A | 9/1986 | Goldstein |
| 4,632,745 A | 12/1986 | Giuffrida et al. |
| 4,636,296 A | 1/1987 | Kunz |
| 4,655,909 A | 4/1987 | Furuno |
| 4,661,411 A | 4/1987 | Martin et al. |
| 4,671,863 A | 6/1987 | Tejeda |
| 4,687,561 A | 8/1987 | Kunz |
| 4,702,810 A | 10/1987 | Kunz |
| 4,707,240 A | 11/1987 | Parsi et al. |
| 4,747,929 A | 5/1988 | Siu et al. |
| 4,747,955 A | 5/1988 | Kunin |
| 4,751,153 A | 6/1988 | Roth |
| 4,753,681 A | 6/1988 | Giuffrida et al. |
| 4,770,793 A | 9/1988 | Treffry-Goatley et al. |
| 4,804,451 A | 2/1989 | Palmer |
| 4,806,244 A | 2/1989 | Guilhem |
| 4,808,287 A | 2/1989 | Hark |
| 4,849,102 A | 7/1989 | Latour et al. |
| 4,871,431 A | 10/1989 | Parsi |
| 4,872,958 A | 10/1989 | Suzuki et al. |
| 4,915,803 A | 4/1990 | Morris |
| 4,925,541 A | 5/1990 | Giuffrida et al. |
| 4,931,160 A | 6/1990 | Giuffrida |
| 4,956,071 A | 9/1990 | Giuffrida et al. |
| 4,964,970 A | 10/1990 | O'Hare |
| 4,969,983 A | 11/1990 | Parsi |
| 4,983,267 A | 1/1991 | Moeglich et al. |
| 5,026,465 A | 6/1991 | Katz et al. |
| 5,030,672 A | 7/1991 | Hann et al. |
| 5,066,375 A | 11/1991 | Parsi et al. |
| 5,066,402 A | 11/1991 | Anselme et al. |
| 5,073,268 A | 12/1991 | Saito et al. |
| 5,082,472 A | 1/1992 | Mallouk et al. |
| 5,084,148 A | 1/1992 | Kazcur et al. |
| 5,092,970 A | 3/1992 | Kaczur et al. |
| 5,094,732 A | 3/1992 | Oldani et al. |
| 5,106,465 A | 4/1992 | Kaczur et al. |
| 5,116,509 A | 5/1992 | White |
| 5,120,416 A | 6/1992 | Parsi et al. |
| 5,126,026 A | 6/1992 | Chlanda |
| 5,128,043 A | 7/1992 | Wildermuth |
| 5,154,809 A | 10/1992 | Oren et al. |
| 5,166,220 A | 11/1992 | McMahon |
| 5,176,828 A | 1/1993 | Proulx |
| 5,196,115 A | 3/1993 | Andelman |
| 5,203,976 A | 4/1993 | Parsi et al. |
| 5,211,823 A | 5/1993 | Giuffrida et al. |
| 5,223,103 A | 6/1993 | Kazcur et al. |
| H1206 H | 7/1993 | Thibodeaux et al. |
| 5,240,579 A | 8/1993 | Kedem |
| 5,254,227 A | 10/1993 | Cawlfield et al. |
| 5,259,936 A | 11/1993 | Ganzi |
| 5,286,354 A | 2/1994 | Bard et al. |
| 5,292,422 A | 3/1994 | Liang et al. |
| 5,308,466 A | 5/1994 | Ganzi et al. |
| 5,308,467 A | 5/1994 | Sugo et al. |
| 5,316,637 A | 5/1994 | Ganzi et al. |
| 5,344,566 A | 9/1994 | Clancey |
| 5,346,624 A | 9/1994 | Libutti et al. |
| 5,346,924 A | 9/1994 | Giuffrida |
| 5,356,849 A | 10/1994 | Matviya et al. |
| 5,358,640 A | 10/1994 | Zeiher et al. |
| 5,364,439 A | 11/1994 | Gallup et al. |
| 5,376,253 A | 12/1994 | Rychen et al. |
| 5,397,445 A | 3/1995 | Umemura et al. |
| 5,411,641 A | 5/1995 | Trainham, III et al. |

(56) References Cited

U.S. PATENT DOCUMENTS

| | | |
|---|---|---|
| 5,423,965 A | 6/1995 | Kunz |
| 5,425,858 A | 6/1995 | Farmer |
| 5,425,866 A | 6/1995 | Sugo et al. |
| 5,434,020 A | 7/1995 | Cooper |
| 5,444,031 A | 8/1995 | Hayden |
| 5,451,309 A | 9/1995 | Bell |
| 5,458,787 A | 10/1995 | Rosin et al. |
| 5,460,725 A | 10/1995 | Stringfield |
| 5,460,728 A | 10/1995 | Klomp et al. |
| 5,489,370 A | 2/1996 | Lomasney et al. |
| 5,503,729 A | 4/1996 | Elyanow et al. |
| 5,518,626 A | 5/1996 | Birbara et al. |
| 5,518,627 A | 5/1996 | Tomoi et al. |
| 5,536,387 A | 7/1996 | Hill et al. |
| 5,538,611 A | 7/1996 | Otowa |
| 5,538,655 A | 7/1996 | Fauteux et al. |
| 5,539,002 A | 7/1996 | Watanabe |
| 5,547,551 A | 8/1996 | Bahar et al. |
| 5,558,753 A | 9/1996 | Gallagher et al. |
| 5,580,437 A | 12/1996 | Trainham, III et al. |
| 5,584,981 A | 12/1996 | Turner et al. |
| 5,593,563 A | 1/1997 | Denoncourt et al. |
| 5,599,614 A | 2/1997 | Bahar et al. |
| 5,635,071 A | 6/1997 | Al-Samadi |
| 5,670,053 A | 9/1997 | Collentro et al. |
| 5,679,228 A | 10/1997 | Elyanow et al. |
| 5,679,229 A | 10/1997 | Goldstein et al. |
| 5,714,521 A | 2/1998 | Kedem et al. |
| RE35,741 E | 3/1998 | Oren et al. |
| 5,736,023 A | 4/1998 | Gallagher et al. |
| 5,759,373 A | 6/1998 | Terada et al. |
| 5,762,774 A | 6/1998 | Tessier |
| 5,766,479 A | 6/1998 | Collentro et al. |
| 5,788,826 A | 8/1998 | Nyberg |
| 5,804,055 A | 9/1998 | Coin et al. |
| 5,814,197 A | 9/1998 | Batchelder et al. |
| 5,837,124 A | 11/1998 | Su et al. |
| 5,858,191 A | 1/1999 | DiMascio et al. |
| 5,868,915 A | 2/1999 | Ganzi et al. |
| 5,891,328 A | 4/1999 | Goldstein |
| 5,925,240 A | 7/1999 | Wilkins et al. |
| 5,928,807 A | 7/1999 | Elias |
| 5,954,935 A | 9/1999 | Neumeister et al. |
| 5,961,805 A | 10/1999 | Terada et al. |
| 5,980,716 A | 11/1999 | Horinouchi et al. |
| 6,030,535 A | 2/2000 | Hayashi et al. |
| 6,060,535 A | 5/2000 | Villar et al. |
| 6,099,716 A | 8/2000 | Molter et al. |
| 6,126,805 A | 10/2000 | Batchelder et al. |
| 6,149,788 A | 11/2000 | Tessier et al. |
| 6,171,374 B1 | 1/2001 | Barton et al. |
| 6,183,643 B1 | 2/2001 | Goodley |
| 6,187,201 B1 | 2/2001 | Abe et al. |
| 6,190,528 B1 | 2/2001 | Li et al. |
| 6,190,558 B1 | 2/2001 | Robbins |
| 6,193,869 B1 | 2/2001 | Towe et al. |
| 6,197,174 B1 | 3/2001 | Barber et al. |
| 6,214,204 B1 | 4/2001 | Gadkaree et al. |
| 6,228,240 B1 | 5/2001 | Terada et al. |
| 6,235,166 B1 | 5/2001 | Towe et al. |
| 6,248,226 B1 | 6/2001 | Shinmei et al. |
| 6,254,741 B1 | 7/2001 | Stuart et al. |
| 6,258,278 B1 | 7/2001 | Tonelli et al. |
| 6,267,891 B1 | 7/2001 | Tonelli et al. |
| 6,274,019 B1 | 8/2001 | Kuwata |
| 6,284,124 B1 | 9/2001 | DiMascio et al. |
| 6,284,399 B1 | 9/2001 | Oko et al. |
| 6,296,751 B1 | 10/2001 | Mir |
| 6,303,037 B1 | 10/2001 | Tamura et al. |
| 6,344,122 B1 | 2/2002 | Deguchi et al. |
| 6,365,023 B1 | 4/2002 | De Los Reyes et al. |
| 6,365,051 B1 | 4/2002 | Bader |
| 6,391,178 B1 | 5/2002 | Garcia et al. |
| 6,402,916 B1 | 6/2002 | Sampson et al. |
| 6,402,917 B1 | 6/2002 | Emery et al. |
| 6,458,257 B1 | 10/2002 | Andrews et al. |
| 6,462,935 B1 | 10/2002 | Shiue et al. |
| 6,482,304 B1 | 11/2002 | Emery et al. |
| 6,495,014 B1 | 12/2002 | Datta et al. |
| 6,508,936 B1 | 1/2003 | Hassan |
| 6,537,436 B2 | 3/2003 | Schmidt et al. |
| 6,645,383 B1 | 11/2003 | Lee et al. |
| 6,649,037 B2 | 11/2003 | Liang et al. |
| 6,726,822 B2 | 4/2004 | Garcia et al. |
| 6,766,812 B1 | 7/2004 | Gadini |
| 6,780,328 B1 | 8/2004 | Zhang |
| 6,824,662 B2 | 11/2004 | Liang et al. |
| 6,896,814 B2 | 5/2005 | Chidambaran et al. |
| 7,083,730 B2 | 8/2006 | Davis |
| 7,459,088 B2 | 12/2008 | Davis |
| 7,501,064 B2 | 3/2009 | Schmidt et al. |
| 8,114,259 B2 | 2/2012 | Zuback et al. |
| 8,182,693 B2 | 5/2012 | Wilkins et al. |
| 8,277,627 B2 | 10/2012 | Ganzi et al. |
| 10,322,953 B2 | 6/2019 | Ganzi et al. |
| 2001/0003329 A1 | 6/2001 | Sugaya et al. |
| 2001/0037942 A1 | 11/2001 | Schmidt et al. |
| 2002/0092769 A1 | 7/2002 | Garcia et al. |
| 2002/0104804 A1 | 8/2002 | Grott |
| 2002/0136749 A1 | 9/2002 | Rose et al. |
| 2002/0144948 A1 | 10/2002 | Aimar et al. |
| 2002/0189951 A1 | 12/2002 | Liang et al. |
| 2003/0080467 A1 | 5/2003 | Andrews et al. |
| 2003/0089609 A1 | 5/2003 | Liang et al. |
| 2003/0106845 A1 | 6/2003 | Bernard et al. |
| 2003/0155243 A1 | 8/2003 | Sferrazza |
| 2003/0201235 A1 | 10/2003 | Chidambaran et al. |
| 2003/0205526 A1 | 11/2003 | Vuong |
| 2004/0007358 A1 | 1/2004 | Lien |
| 2004/0035802 A1 | 2/2004 | Emery et al. |
| 2004/0055896 A1* | 3/2004 | Anderson ............ C02F 1/4674 205/701 |
| 2004/0055955 A1 | 3/2004 | Davis |
| 2004/0079700 A1 | 4/2004 | Wood et al. |
| 2004/0255955 A1 | 12/2004 | Daly |
| 2005/0016922 A1 | 1/2005 | Enzweiler et al. |
| 2005/0016932 A1 | 1/2005 | Arba et al. |
| 2005/0103622 A1 | 5/2005 | Jha et al. |
| 2005/0103630 A1 | 5/2005 | Ganzi et al. |
| 2005/0103631 A1 | 5/2005 | Freydina et al. |
| 2005/0103644 A1 | 5/2005 | Wilkins et al. |
| 2005/0103717 A1 | 5/2005 | Jha et al. |
| 2005/0103722 A1 | 5/2005 | Freydina et al. |
| 2005/0103723 A1 | 5/2005 | Wilkins et al. |
| 2005/0103724 A1 | 5/2005 | Wilkins et al. |
| 2005/0109703 A1 | 5/2005 | Newenhizen |
| 2005/0115906 A1 | 6/2005 | Shay |
| 2005/0121388 A1 | 6/2005 | Wood et al. |
| 2005/0210745 A1 | 9/2005 | Grott |
| 2005/0263457 A1 | 12/2005 | Wilkins et al. |
| 2006/0060532 A1 | 3/2006 | Davis |
| 2006/0091077 A1 | 5/2006 | Haas et al. |
| 2006/0144787 A1 | 7/2006 | Schmidt et al. |
| 2006/0231403 A1 | 10/2006 | Riviello |
| 2006/0231495 A1 | 10/2006 | Freydina et al. |
| 2007/0215344 A1 | 9/2007 | McElhiney |
| 2007/0284251 A1 | 12/2007 | Zuback et al. |
| 2007/0284252 A1 | 12/2007 | Ganzi et al. |
| 2008/0067125 A1* | 3/2008 | Wilkins ............ C02F 1/442 210/641 |
| 2008/0277341 A1 | 11/2008 | Huang et al. |
| 2009/0314718 A1 | 12/2009 | Sparrow et al. |
| 2010/0089756 A1 | 4/2010 | Wilkins et al. |
| 2012/0035394 A1 | 2/2012 | Bicker et al. |
| 2012/0055875 A1 | 3/2012 | Lien |
| 2013/0015135 A1* | 1/2013 | Ganzi ............ C02F 1/469 210/650 |
| 2013/0020259 A1 | 1/2013 | Wallace |
| 2013/0206689 A1 | 8/2013 | Gibson Juby et al. |

(56) References Cited

U.S. PATENT DOCUMENTS

| | | | |
|---|---|---|---|
| 2015/0353401 A1* | 12/2015 | Matsumoto | C02F 9/00 210/202 |
| 2016/0289099 A1 | 10/2016 | Wallace | |

FOREIGN PATENT DOCUMENTS

| | | | |
|---|---|---|---|
| CN | 1044411 A | 8/1990 | |
| DE | 1201055 B | 9/1965 | |
| DE | 2708240 A1 | 8/1978 | |
| DE | 3238280 A1 | 4/1984 | |
| DE | 4016000 C2 | 10/1993 | |
| DE | 4418812 C2 | 3/1999 | |
| DE | 19942347 B4 | 7/2004 | |
| EP | 0170895 B1 | 3/1989 | |
| EP | 0503589 B1 | 10/1994 | |
| EP | 0621072 B1 | 3/1997 | |
| EP | 0870533 B1 | 1/2000 | |
| EP | 1106241 A1 | 6/2001 | |
| EP | 0680932 B1 | 8/2001 | |
| EP | 0803474 B1 | 4/2003 | |
| EP | 1075868 A3 | 6/2003 | |
| EP | 1101790 B1 | 9/2004 | |
| EP | 1222954 B1 | 11/2004 | |
| EP | 1506941 A1 | 2/2005 | |
| EP | 1172145 B1 | 5/2007 | |
| EP | 1068901 B1 | 8/2007 | |
| EP | 1388595 A1 | 11/2010 | |
| EP | 1762546 A1 | 8/2011 | |
| FR | 2818267 B1 | 9/2003 | |
| GB | 776469 A | 6/1957 | |
| GB | 877239 A | 9/1961 | |
| GB | 880344 A | 10/1961 | |
| GB | 893051 A | 4/1962 | |
| GB | 942762 A | 11/1963 | |
| GB | 1048026 A | 11/1966 | |
| GB | 1137679 A | 12/1968 | |
| GB | 1381681 A | 1/1975 | |
| GB | 1448533 A | 9/1976 | |
| JP | 54-5888 | 1/1979 | |
| JP | 07-265865 A | 10/1995 | |
| JP | 09-253643 A | 9/1997 | |
| JP | 11042483 A | 2/1999 | |
| JP | 2001-79358 | 3/2001 | |
| JP | 2001-79553 | 3/2001 | |
| JP | 2001-104960 A | 4/2001 | |
| JP | 2001-113137 A | 4/2001 | |
| JP | 2001-113279 A | 4/2001 | |
| JP | 2001-113280 A | 4/2001 | |
| JP | 2001-121152 A | 5/2001 | |
| JP | 2005007347 A | 1/2005 | |
| JP | 2005007348 A | 1/2005 | |
| RO | 114874 B1 | 8/1999 | |
| RU | 2004137231 A | 6/2006 | |
| WO | 9211089 A1 | 7/1992 | |
| WO | 9532052 A1 | 11/1995 | |
| WO | 9532791 A1 | 12/1995 | |
| WO | 9622162 A1 | 7/1996 | |
| WO | 9725147 A1 | 7/1997 | |
| WO | 9746491 A1 | 12/1997 | |
| WO | 9746492 A1 | 12/1997 | |
| WO | 9811987 A1 | 3/1998 | |
| WO | 9817590 A1 | 4/1998 | |
| WO | 9820972 A1 | 5/1998 | |
| WO | 9858727 A1 | 12/1998 | |
| WO | 9939810 A1 | 8/1999 | |
| WO | 0030749 A1 | 6/2000 | |
| WO | 0075082 A1 | 12/2000 | |
| WO | 0064325 A3 | 6/2001 | |
| WO | 0149397 A1 | 7/2001 | |
| WO | 0204357 A1 | 1/2002 | |
| WO | 0214224 A1 | 2/2002 | |
| WO | 0226629 A3 | 12/2002 | |
| WO | 03086590 A1 | 10/2003 | |
| WO | 2004013048 A2 | 7/2004 | |
| WO | 2005087669 A1 | 9/2005 | |
| WO | 2005113120 A1 | 12/2005 | |
| WO | 2006031732 A2 | 9/2006 | |
| WO | 2007145785 A1 | 12/2007 | |
| WO | 2007145786 A1 | 12/2007 | |
| WO | 2009038805 A1 | 3/2009 | |
| WO | WO-2017049052 A1 * | 3/2017 | C25B 1/26 |

OTHER PUBLICATIONS

Von Gottberg et al., "Optimizing Water Recovery and Energy Consumption for Seawater RO Systems," Water & Process Technologies, General Electric Technical Paper (2005).
Walters, et al., "Concentration of Radioactive Aqueous Wastes," Industrial and Engineering Chemistry, Jan. 1955, pp. 61-67.
Wang, et al., A Study of the electrodeionization process-high-purity water production with a RO-EDI system,: Desalination, vol. 132, pp. 349-352, Oct. 3, 2000.
Warshawsky et al., "Thermally Regenerable Polymerable Polymeric Crown Ethers, II Synthesis and Application in Electrodialysis," pp. 579-584, publication and date unknown.
Watson, "The Basics of Seawater Desalting by Reverse Osmosis," Water & Wastes Digest, pp. 16-19, Jan. 2007.
Wood, "Hot Water Sanitization of Continuous Electrodeionization Systems" Pharmaceutical Engineering, vol. 20, No. 6, Nov./Dec. 2000, pp. 1-15.
Wood, J.H. et al., "Continuous Electrodeionisation: Module Design Considerations for the Production of High Purity Water," Proc. of IEX at the Millenium, Jul. 16, 2000, pp. 44-51.
World Bank, "Seawater and Brackish Water Desalination in the Middle East, North Africa and Central Asia," A Review of Key Issues and Experience in Six Countries Final Report, Main Report, Dec. 2004.
World Health Organization, Guidelines for Drinking-Water Quality; Chemical Facts Sheet pp. 296-461 (2003).
www.waterline.com/content/news/article.asp Microfiltration and Ultra-filtration Hold Huge Potential for the Desalination Pretreatment Market, Nov. 14, 2006.
T. Hayes and D. Arthur. "Overview of emerging produced water treatment technologies" The 11th Annual International Petroleum Environmental Conference. Oct. 15, 2004.
Dow Liquid Separations. FILMTEC Membranes (S. S. Beardsley and S. A. McClellan). Membrane Softening: An Emerging Technology Helping Florida Communities Meet the Increased Regulations for Quality Potable Water. Aug. 1997. AWWA 1995 Membrane Technology Conference.
"Affordable Desalination Sets Low Energy Record," press release, http://www.affordableseal.com/home/news/ADC%20Sets%20Low%20Energy%20Record%205-8-06.pdf, May 4, 2006, printed on Apr. 16, 2008.
"Desalting Handbook for Planners", Desalination and Water Purification Research and Development Program, Report No. 72, 3rd Edition, Jul. 2003, pp. 1-233.
"Guidelines for the Safe Use of Wastewater, Excreta and Greywater", World Health Organization, vol. 2, Wastewater Use in agriculture, pp. 1-196, undated.
"Preliminary Research Study for the Construction of a Pilot Cogeneration Desalination Plant in Southern California," Water Treatment Technology Program Report No. 7, U.S. Department of the Interior May, 1995.
"Salt Content in Irrigation Water", Lenntech, pp. 1-5, undated.
"SAR Hazard of Irrigation," Lenntech, pp. 1-4, undated.
"Zeta Potential" Lenntech, pp. 1-3, undated.
Almulla et al., "Developments in high recovery brackish water desalination plants as part of the solution to water quantity problems," Desalination 153 (2002) pp. 237-243.
ASTM, "Standard Practice for Calculation and Adjustment of the Langelier Saturation Index for Reverse Osmosis," Designation: D3739-94 (Reapproved 1998) pp. 1-4.
Busch et al., "Reducing energy consumption in seawater desalination," Desalination 165 (2004) 299-312.
Calay, J.-C. et al., "The Use of EDI to Reduce the Ammonia Concentration in Steam Generators Blowdown of PWR Nuclear

(56) References Cited

OTHER PUBLICATIONS

Power Plants," PowerPlant Chemistry, vol. 2, No. 8, 2000, pp. 467-470.
Cote, et al, "A new immersed membrane for pretreatment to reverse osmosis," Desalination 139 (2001) 229-236.
Cote, et al, "Use of Ultrafiltration for Water Reuse and Desalination," The ZEEWEED® Ultrafiltration Membrane.
Del Pino et al., "Wastewater reuse through dual-membrane processes: opportunities for sustainable water resources," Desalination 124 (1999) 271-277.
Dimascio et al., "Electrodialesis Polishing (An Electrochemical Deionization Process)," 1994, pp. 164-172.
Dimascio, et al., "Continuous Electrodeionization: Production of High-Purity Water without Regeneration Chemicals," The Electrochemical Society Interface, Fall 1998, pp. 26-29.
Farmer et al., Capacitive Deionization of NH4ClO4 Solutions with Carbon Aerogel Electrodes, J. Appl. Electro-Chemistry, vol. 26, (1996), pp. 1007-1018.
FDA, "Guide to Inspections of High Purity Water Systems," printed from www.fda.gov. on Dec. 28, 2001.
Frost & Sullivan, "Microfiltration and Ultrafiltration Hold Huge Potential for the Desalination Pretreatment Market" published Nov. 14, 2006, Water Online.
Ganzi, G.C. et al., "Electrodeionization: Theory and Practice of Continuous Electrodeionization," Ultrapure Water, Jul./Aug. 1997, pp. 64-69.
Gifford et al. "An Innovative Approach to Continuous Electrodeionization Module ad System Design for Power Applications" 7 pages, Oct. 2000.
Gittens, G.J. et al., "The Application of Electrodialysis to Demineralisation," A.I.Ch.E.I.Chem.E. Symposium Series No. 9, 1965 (London: Instn chem. Engrs), pp. 79-83.
Glueckauf, "Electro-Deionisation Through a Packed Bed," British Chemical Engineering, Dec. 1959, pp. 646-651.
Hell et al., "Experience with full-scale electrodialysis for nitrate and hardness removal," Desalination 117 (1998) 173-180.
Hobro et al., "Recycling of Chromium from Metal Finishing Waste Waters Using Electrochemical Ion Exchange (EIX)," 1994, pp. 173-183.
Jha, Anil D. et al., "CEDI: Selecting the Appropriate Configuration," reprinted from Power Engineering, Aug. 2000 edition.
Johnson, et al., "Desalting by Means of Porous Carbon Electrodes," Electrochemical Technology, vol. 118, No. 3, Mar. 1971, pp. 510-517.
Kedem et al., "EDS—Sealed Cell Electrodialysis," Desalination, vol. 46, 1983, pp. 291-299.
Kedem et al., "Reduction of Polarization by Ion-Conduction Spacers: Theoretical Evaluation of a Model System," Desalination, vol. 27, 1978, pp. 143-156.
King, C. Judson, et al., "Separation Technology in Japan"; Japanese Technology Evaluation Center; International Tech. Research Institute, Loyola College in Maryland, pp. 1-143, Mar. 1993.
Korngold, "Electrodialysis Process Using Ion Exchange Resins Between Membranes," Desalination, vol. 16, 1975, pp. 225-233.
Laktionov, Evgueni Viktorovitch, "Demineralisation De Solutions Electrolytiques Diluees. Analyse Comparative Des Performances De Differents Procedes D'Electrodialyse", Directuer de these, Universite Montpellier II, Science Et Technique Due Languedoc, Jul. 17, 1998.
Larchet et al., "Application of electromembrane technology for providing drinking water for the population of the Aral region," Desalination 149 (2002) 383-387.
Lesch et al., "A Short Note on Calculating the Adjusted SAR Index" American Society of Agricultural and Biological Engineers, 2009, vol. 52(2), pp. 493-496.
Matejka, "Continuous Production of High-Purity Water by Electro-Deionisation," J. Appl. Chem., Biotechnol., vol. 21, Apr. 1971, pp. 117-120.
Mohammad et al., "Predicting flux and rejection of multicomponent salts mixture in nanofiltration membranes," Desalination 157 (2003) 105-111.
Nesicolaci, M., "Reverse Osmosis is Taking Global Water & Wastewater Treatment by Storm," Water Purification Solutions, Severn Trent Services, undated.
Oren et al., "Studies on Polarity Reversal with Continuous Deionization," Desalination, Elsevier Scientific Publishing Co., Amsterdam, NL, vol. 86, No. 2, Jun. 1, 1992, pp. 155-171.
Pourcelly, Gerald, Conductivity and selectivity of ion exchange membranes: structure-correlations, Desalination, vol. 147 (2002) pp. 359-361.
Public Health and the Environmental World Health Organization, "Desalination for Safe Water Supply, Guidance for the Health and Environmental Aspects Applicable to Desalination," Geneva 2007.
R. Simons, "Electric Field Effects on Proton Transfer Between Ionizable Groups and Water in Ion Exchange Membranes," Electrochimica Acta, vol. 29, No. 2, 1984, pp. 151-158.
R. Simons, "Strong Electric Field Effects on Proton Transfer Between Membrane-Bound Amines and Water," Nature, vol. 280, Aug. 30, 1979, pp. 824-826.
R. Simons, "The Origin and Elimination of Water Splitting in Ion Exchange Membranes During Water Demineralisation by Electrodialysis," Desalination, vol. 28, Jan. 29, 1979, pp. 41-42.
R. Simons, "Water Splitting in Ion Exchange Membranes," Pergamon Press Ltd., 1985, pp. 275-282.
Shaposhnik et al., "Demineralization of water by electrodialysis with ion-exhange membranes, grains and nets," Desalination, vol. 133 (2001), pp. 211-214.
Sirivedhin et al., Reclaiming produced water for beneficial use: salt removal by electrodialysis,: J. of Membrane Science 243 (2004) 335-343.
Tseng, Tai, et al., "Optimization of Dual-Staged Nanofiltration Membranes for Seawater Desalination"; American Water Works Association 2003 CA-NC Annual Fall Conference; Oct. 7, 2003.
U.S. Bureau of Reclamation, Sandia National Laboratories, "Desalination and Water Purification Technology Roadmap—A Report of the Executive Committee," Jan. 2003.
U.S. Congress, Office of the Technology Assessment, "Using Desalination Technologies for Water Treatment," OTA-BP-O-46 (Washington D.C.: U.S. Government Printing Office), Mar. 1988.
USFilter, "CDI-LXtm Systems," product information, 2001, 6 pgs. Mar. 2001.

\* cited by examiner

| Constant | Value | Unit |
|---|---|---|
| Cell Half Length | 0.6 | m |
| Current Density | 1800 | A/m² |
| Electrode Area | 0.91 | m²/cell |
| Electrolyzer Size | 20 | cells |
| Flow Rate | 22 | m³/hr |
| 1 Faraday | 26.81 | A/hr |
| Molar Mass Cl₂ | 70.91 | g/mol |
| Molar Mass H₂ | 2.02 | g/mol |
| Molar Mass OH- | 17.01 | g/mol |
| 1 g/hr Cl₂ | 0.76 | A |
| 1 g/hr H₂ | 26.59 | A |
| 1 g/hr OH- | 1.58 | A |

| | |
|---|---|
| Flow Rate (m³/hr) | 22 |
| Cell Output (kg/hr) | 2.2 |
| Pump Discharge Pressure (Barg) | 8 |
| Pressure Loss from Pump (Barg) | 0.25 |
| Hydrogen Generation/kg Hypo (m³/hr) | 0.45 |
| H₂ Solubility in Water (m³/hr @ 1 BarA) | 0.44 |

*FIG. 9A*

| Total Hardness | Value | Units |
|---|---|---|
| Na⁺ TDS | 10,750 | ppm |
| Cl⁻ TDS | 19,350 | ppm |
| Mg²⁺ TDS | 1,290 | ppm |
| Ca²⁺ TDS | 410 | ppm |
| | Mg²⁺ | Ca²⁺ |
| Cl⁻ | kg/hr | kg/hr |
| kg/hr | 28.38 | 9.02 |
| 425.7 | | |
| Na⁺ | | |
| kg/hr | | |
| 236.5 | | |

*FIG. 9B*

| Cell No. | Cell Inlet Pressure Barg | Pressure Drop Thru Cell Barg | Cell Outlet Pressure Barg | Hydrogen Generation m³/hr (atmos) | Hydrogen Volume at Line Pressure m³/hr | Dissolvable Hydrogen m³/hr | Hydrogen in Cell m³/hr | Hydrogen in the Cell % |
|---|---|---|---|---|---|---|---|---|
| 1 | 7.75 | 0.28 | 7.48 | 0.99 | 0.12 | 3.85 | -3.73 | -17% |
| 2 | 7.48 | 0.28 | 7.19 | 1.98 | 0.24 | 3.73 | -3.49 | -16% |
| 3 | 7.19 | 0.28 | 6.91 | 2.97 | 0.38 | 3.61 | -3.23 | -15% |
| 4 | 6.91 | 0.29 | 6.62 | 3.96 | 0.52 | 3.48 | -2.96 | -13% |
| 5 | 6.62 | 0.29 | 6.33 | 4.95 | 0.68 | 3.35 | -2.68 | -12% |
| 6 | 6.33 | 0.30 | 6.03 | 5.94 | 0.84 | 3.22 | -2.38 | -11% |
| 7 | 6.03 | 0.30 | 5.73 | 6.93 | 1.03 | 3.09 | -2.06 | -9% |
| 8 | 5.73 | 0.31 | 5.42 | 7.92 | 1.23 | 2.96 | -1.73 | -8% |
| 9 | 5.42 | 0.31 | 5.11 | 8.91 | 1.46 | 2.83 | -1.37 | -6% |
| 10 | 5.11 | 0.32 | 4.79 | 9.9 | 1.71 | 2.69 | -0.98 | -4% |
| 11 | 4.79 | 0.32 | 4.47 | 10.89 | 1.99 | 2.55 | -0.56 | -3% |
| 12 | 4.47 | 0.33 | 4.15 | 11.88 | 2.31 | 2.41 | -0.10 | 0% |
| 13 | 4.15 | 0.33 | 3.82 | 12.87 | 2.67 | 2.26 | 0.41 | 2% |
| 14 | 3.82 | 0.34 | 3.48 | 13.86 | 3.09 | 2.12 | 0.97 | 4% |
| 15 | 3.48 | 0.34 | 3.14 | 14.85 | 3.59 | 1.97 | 1.61 | 7% |
| 16 | 3.14 | 0.35 | 2.80 | 15.84 | 4.17 | 1.82 | 2.35 | 11% |
| 17 | 2.80 | 0.35 | 2.4 | 16.83 | 4.89 | 1.67 | 3.22 | 15% |
| 18 | 2.44 | 0.36 | 2.09 | 17.82 | 5.77 | 1.52 | 4.25 | 19% |
| 19 | 2.09 | 0.36 | 1.73 | 18.81 | 6.90 | 1.36 | 5.54 | 25% |
| 20 | 1.73 | 0.37 | 1.36 | 19.8 | 8.39 | 1.20 | 7.19 | 33% |

*FIG. 9C*

Unit Generation Rates:

| Cell # | Cl₂ kg/hr | Cl₂ ppm | H₂ kg/hr | H₂ ppm | OH⁻ kg/hr | OH⁻ ppm |
|---|---|---|---|---|---|---|
| 1 | 2.2 | 98.7 | 0.06 | 2.8 | 1.04 | 47.4 |
| 2 | 4.3 | 197.4 | 0.12 | 5.6 | 2.08 | 94.7 |
| 3 | 6.5 | 296.2 | 0.19 | 8.4 | 3.13 | 142.1 |
| 4 | 8.7 | 394.9 | 0.25 | 11.2 | 4.17 | 189.4 |
| 5 | 10.9 | 493.6 | 0.31 | 14.0 | 5.21 | 236.8 |
| 6 | 13.0 | 592.3 | 0.37 | 16.8 | 6.25 | 284.2 |
| 7 | 15.2 | 691.1 | 0.43 | 19.6 | 7.29 | 331.5 |
| 8 | 17.4 | 789.8 | 0.49 | 22.5 | 8.34 | 378.9 |
| 9 | 19.5 | 888.5 | 0.56 | 25.3 | 9.38 | 426.3 |
| 10 | 21.7 | 987.2 | 0.62 | 28.1 | 10.42 | 473.6 |
| 11 | 23.9 | 1086.0 | 0.68 | 30.9 | 11.46 | 521.0 |
| 12 | 26.1 | 1184.7 | 0.74 | 33.7 | 12.50 | 568.3 |
| 13 | 28.2 | 1283.4 | 0.80 | 36.5 | 13.55 | 615.7 |
| 14 | 30.4 | 1382.1 | 0.86 | 39.3 | 14.59 | 663.1 |
| 15 | 32.6 | 1480.9 | 0.93 | 42.1 | 15.63 | 710.4 |
| 16 | 34.8 | 1579.6 | 0.99 | 44.9 | 16.67 | 757.8 |
| 17 | 36.9 | 1678.3 | 1.05 | 47.7 | 17.71 | 805.1 |
| 18 | 39.1 | 1777.0 | 1.11 | 50.5 | 18.76 | 852.5 |
| 19 | 41.3 | 1875.8 | 1.17 | 53.3 | 19.80 | 899.9 |
| 20 | 43.4 | 1974.5 | 1.23 | 56.1 | 20.84 | 947.2 |

FIG. 9D

Rejection values recorded for the main seawater ions, as a function of the recovery (membrane type: DS-5 DL, pressure: 14 bars, feed flow rate: 60 l/h m$^{-2}$; temperature range: 25–27 °C; permeate flux range: 19.2–18.0 l/h m$^{-2}$).

| Recovery (%) | Cl(-I) (%) | Na(I) (%) | Ca(II) (%) | Mg(II) (%) | K(I) (%) | HCO$_3$(-I) (%) |
|---|---|---|---|---|---|---|
| 10 | 28.4 ± 4.0 | 4.3 ± 2.6 | 100.0 ± 0 | 100.0 ± 0 | 32.7 ± 12.5 | 37.7 ± 0.9 |
| 40 | 14.2 ± 0.1 | 2.0 ± 1.5 | 60.7 ± 5.1 | 98.2 ± 2.5 | 9.1 ± 7.1 | 37.7 ± 0.5 |
| 50 | 11.7 ± 0 | 2.6 ± 1.4 | 58.3 ± 1.1 | 98.2 ± 0.2 | 4.8 ± 0.5 | 36.4 ± 2.2 |
| 55 | 10.6 ± 0 | 1.6 ± 0.6 | 58.2 ± 6.1 | 92.6 ± 3.8 | 4.7 ± 2.3 | 35.6 ± 1.8 |
| 60 | 10.2 ± 0.4 | 3.1 ± 1.5 | 54.6 ± 0 | 92.9 ± 0.2 | 6.1 ± 1.9 | 33.8 ± 1.6 |
| 63 | 9.6 ± 0.3 | 1.8 ± 0.3 | 49.7 ± 0.8 | 95.0 ± 7.1 | 5.7 ± 1.3 | 33.7 ± 1.5 |
| 66 | 9.3 ± 0.2 | 1.3 ± 0.7 | 46.4 ± 3.7 | 89.5 ± 1.3 | 5.6 ± 1.0 | 32.6 ± 0.1 |
| 69 | 9.1 ± 0.5 | 1.4 ± 0.1 | 47.0 ± 0.5 | 91.4 ± 8.7 | 4.9 ± 1.5 | 30.0 ± 1.5 |
| 72 | 8.5 ± 1.3 | 1.1 ± 0.3 | 45.1 ± 1.3 | 89.2 ± 4.0 | 4.4 ± 1.2 | 30.2 ± 1.9 |
| 75 | 8.3 ± 0.6 | 0.4 ± 0.8 | 41.8 ± 1.3 | 83.4 ± 5.4 | 4.1 ± 2.2 | 31.2 ± 5.9 |
| 78 | 6.5 | 0.9 | 38.8 | 71.5 | 3.1 | 21.6 |

*FIG. 11*

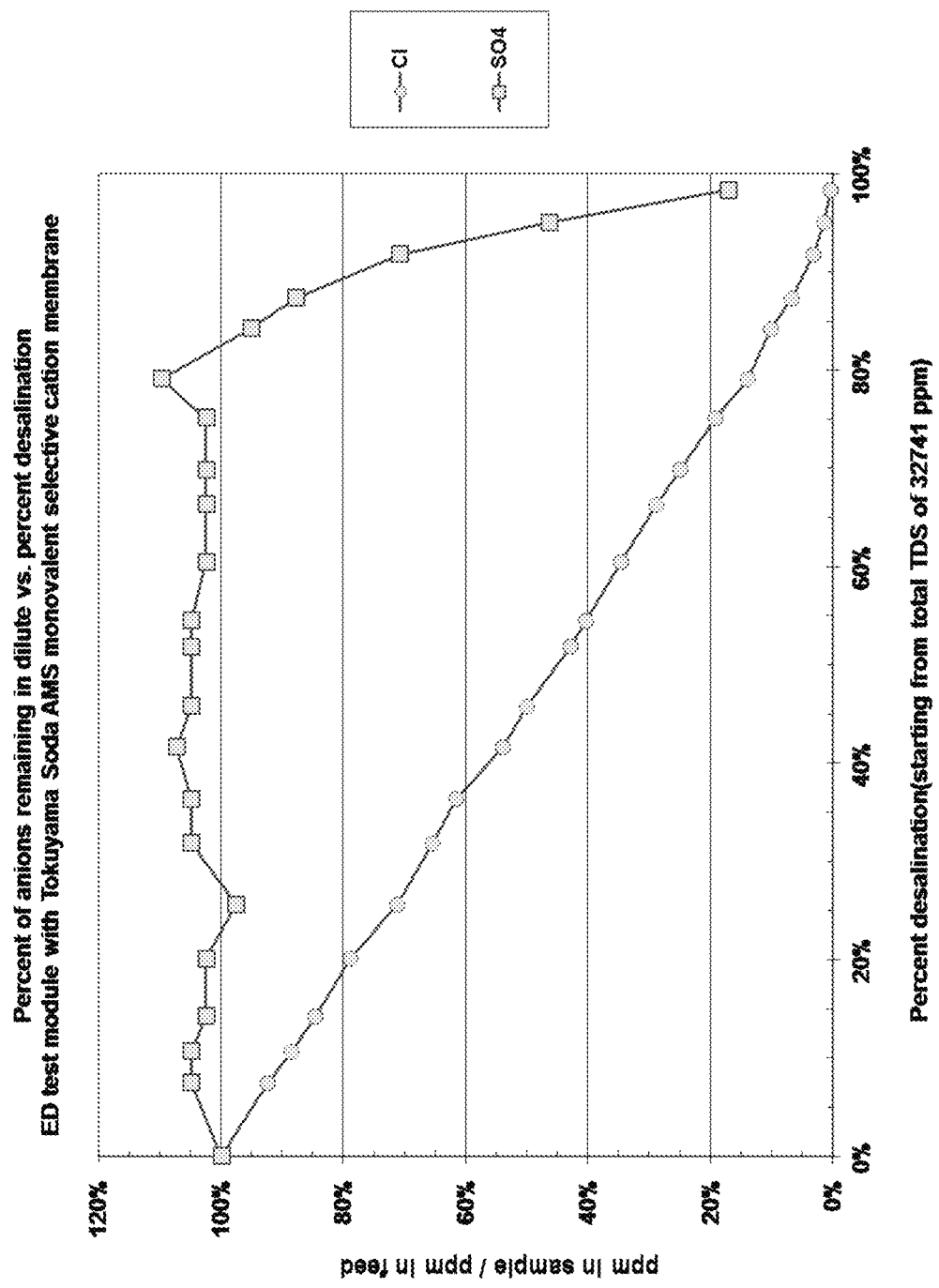

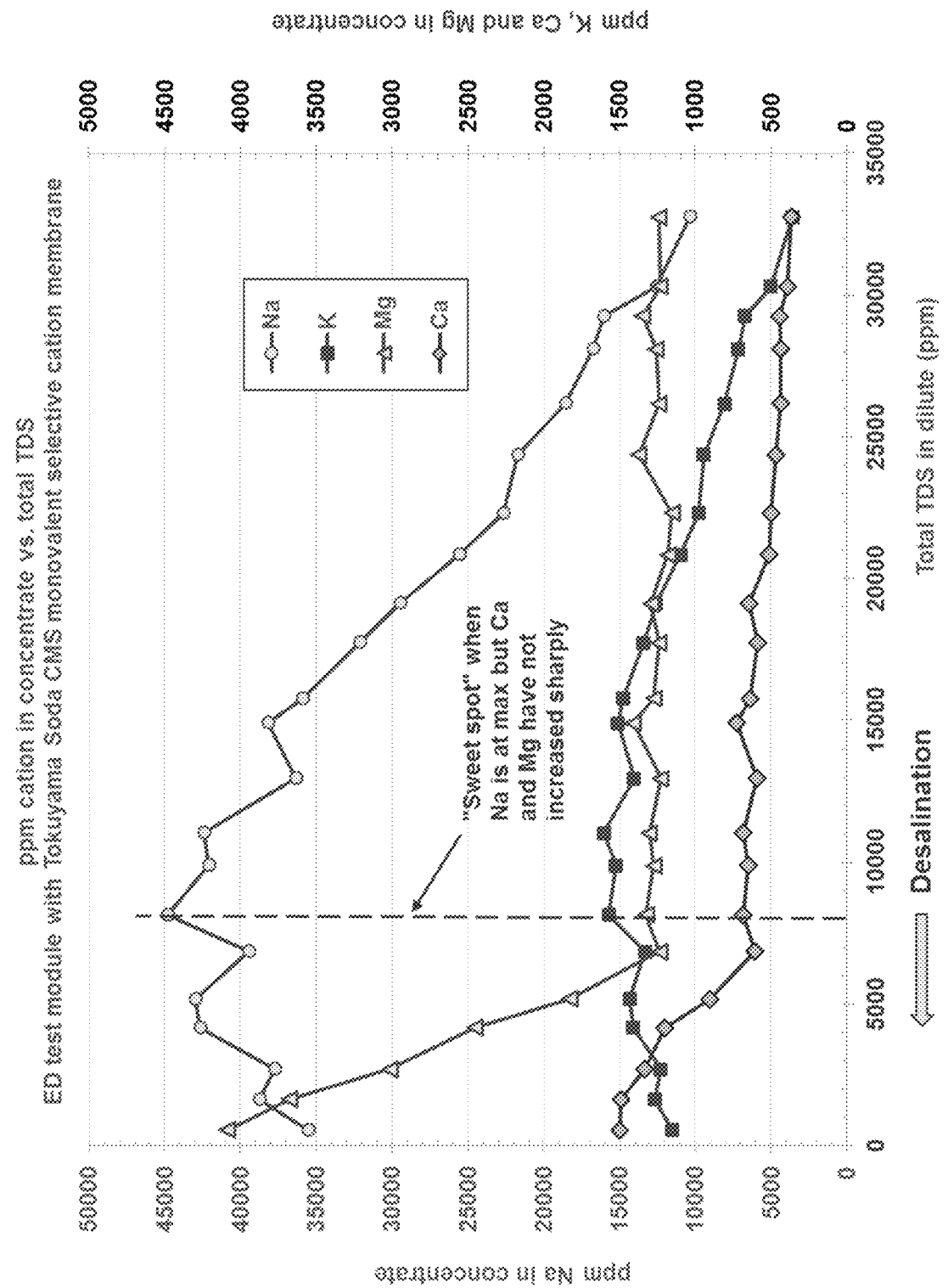

Mean Concentration of major ions in Instant Ocean® synthetic seawater at approximate salinimty of 35 ppt

| Ion | Concentration (ppm) |
|---|---|
| Chloride | 19,290 |
| Sodium | 10,780 |
| Magnesium | 1,320 |
| Potassium | 420 |
| Calcium | 400 |
| Carbonate/bicarbonate | 200 |
| Bromide | 56 |
| Strontium | 8.8 |
| Fluoride | 1 |
| Iodide | 0.24 |

| HYPOCHLORITE CONC. (VIA TITRATION) | | | | | |
|---|---|---|---|---|---|
| Conc. Theoretical (ppm) | 8000 | 4000 | 2000 | 1000 | 300 |
| Conc. Det.#1 (mg/L) | 6134 | 3503 | 2191 | 1276 | 789 |
| Conc. Det.#2 (mg/L) | 6162 | 3517 | 2141 | 1276 | 785 |
| Conc. Average (mg/L) | 6148 | 3510 | 2166 | 1276 | 787 |
| Titration Volume (mL) | 5 | 5 | 5 | 20 | 20 |
| Deviation % | -23.2 | -12.2 | 8.3 | 27.6 | 162.4 |

| HYPOCHLORITE CONC. (VIA ABSORBANCE) | | | | | |
|---|---|---|---|---|---|
| 385 nm | 0.233 | 0.161 | 0.122 | 0.099 | 0.088 |
| 390 nm | 0.166 | 0.117 | 0.091 | 0.075 | 0.067 |
| 395 nm | 0.123 | 0.089 | 0.069 | 0.058 | 0.053 |
| pH | 8.79 | 8.79 | 8.76 | 8.67 | 8.74 |

| 3.5% I.O. (ABSORBANCE) | |
|---|---|
| 385 nm | 0.02 |
| 390 nm | 0.019 |
| 395 nm | 0.018 |

| RECIRCULATING HYPOCHLORITE GENERATION EXPERIMENTAL PARAMETERS | | | | | | |
|---|---|---|---|---|---|---|
| Temperature (C) | 20 | 20 | 20 | 20 | 20 | 20 |
| Flow Rate (L/min) | 0.6 | 0.6 | 0.6 | 0.6 | 0.6 | 0.6 |
| Time of Operation (hrs) | 2.08 | 1.18 | 0.83 | 0.42 | 0.12 |  |
| V DC | 11.62 | 11.8 | 9.81 | 9.5 | 9.5 |  |
| A DC | 12 | 12 | 8.3 | 8.3 | 8.3 |  |
| Feed Conductivity (mS) | 45.8 | 45.1 | 45.3 | 45.25 | 45.06 |  |
| Volume (L) | 6 | 8 | 8 | 8 | 8 |  |
| Titration #1 (mL) | 8.65 | 4.94 | 3.09 | 7.2 | 4.45 |  |
| Titration #2 (mL) | 8.69 | 4.96 | 3.02 | 7.2 | 4.43 |  |

| EXPERIMENTAL NOTES |
|---|
| 3.5% Instant Ocean (I.O.) solution prepared with RO water |
| 1mol NaClO equivalent to 1mol $Cl_2$ (MW=70.91g/mol) |
| $Na_2S_2O_3$ Conc. = 0.1M |

TREATMENT OF SALINE WATER FOR AGRICULTURAL AND POTABLE USE AND FOR GENERATION OF DISINFECTANT SOLUTION

CROSS-REFERENCE TO RELATED APPLICATIONS

This application claims priority under 35 U.S.C. § 121 as a continuation-in-part of PCT Application Serial No. PCT/US18/47034, titled "TREATMENT OF SALINE WATER FOR AGRICULTURAL AND POTABLE USE," filed Aug. 20, 2018, which in turn claims priority under 35 U.S.C. § 119(e) to U.S. Provisional Patent Application No. 62/547,971, titled "TREATMENT OF SALINE WATER FOR AGRICULTURAL AND POTABLE USE," filed Aug. 21, 2017. This application also claims priority under 35 U.S.C. § 119(e) to U.S. Provisional Application Ser. No. 62/635,731, titled "REGULATION OF PROCESS STREAM COMPOSITION FOR IMPROVED ELECTROLYZER#PERFORMANCE," filed on Feb. 27, 2018. Each of these applications is incorporated by reference herein in its entirety for all purposes.

BACKGROUND OF INVENTION

1. Field of Invention

This invention relates to systems and methods of providing crop irrigation water as well as potable water and, more particularly, to systems and methods of providing irrigation water and/or potable water from water having unacceptable dissolved solids content.

2. Discussion of Related Art

Climate change is expected to pose an increasing threat to agriculture as global temperatures increase and farms require more water to satisfy the needs of their crops. A constraint to providing increased water by irrigation of farmlands is the availability of freshwater. Agriculture consumes more freshwater than any other industry—an estimated 70% of total global freshwater withdrawal. Many areas are already water stressed. Continued global warming may cause additional problems regarding freshwater availability by, for example, altering the geographical distribution of freshwater and changing the distribution, quantity, and annual timing of rainfall. Accordingly, the production of water suitable for irrigation purposes from otherwise unsuitable water sources may be of increasing importance.

Desalting or desalination refers to a water treatment process that removes salt from, for example, water. In some cases, the water source is brackish water or seawater and desalting techniques thereof provide at least a portion of municipal requirements for potable, drinking water. Desalination techniques typically include those based on distillation as well as reverse osmosis techniques. The desalted water can also be consumed in commercial and industrial applications as, for example, process feed water, boiler feed water, and irrigation water. Particular examples of industries that may utilize desalted water include the pharmaceutical, mining, paper and pulp, and agricultural industries.

Electrochemical devices used to produce a product solution from a feed stream by chemical reactions at electrodes are widely used in industrial and municipal implementations. Examples of reactions include:

A1. Electrochlorination with Generation of Sodium Hypochlorite from Sodium Chloride and Water.

| | |
|---|---|
| $2Cl^- \rightarrow Cl_2 + 2e^-$ | Reaction at anode: |
| $2Na^+ + 2H_2O + 2e^- \rightarrow 2NaOH + H_2$ | Reaction at cathode: |
| $Cl_2 + 2OH^- \rightarrow ClO^- + Cl^- + H_2O$ | In solution: |
| $NaCl + H_2O \rightarrow NaOCl + H_2$ | Overall reaction: |
| $E^0_{ox} = -1.36\ V$ | (Chlorine generation) |
| $E^0_{red} = -0.83\ V$ | (Hydrogen generation) |
| $E^0_{cell} = -2.19\ V$ | |

A2. Precipitate Reaction Conditions.

| | |
|---|---|
| $Mg^{2+} + 2OH^- \rightarrow Mg(OH)_2$ | Magnesium Hydroxide: |
| $Ca^{2+} + CO_3^{2-} \rightarrow CaCO_3$ | Calcium Carbonate: |

B. Generation of Sodium Hydroxide and Chlorine from Sodium Chloride and Water, with a Cation Exchange Membrane Separating the Anode and the Cathode:

| | |
|---|---|
| $2Cl^- \rightarrow Cl_2 + 2e^-$ | Reaction at anode: |
| $2H_2O + 2e^- \rightarrow 2OH^- + H_2$ | Reaction at cathode: |
| $2NaCl + 2H_2O \rightarrow 2NaOH + Cl_2 + H_2$ | Overall reaction: |

SUMMARY

In accordance with an aspect of the present invention, there is provided an electrochemical cell. The electrochemical cell comprises a housing having an inlet, an outlet, and a central axis and an anode-cathode pair disposed substantially concentrically within the housing about the central axis and defining an active area between an anode and a cathode of the anode-cathode pair, an active surface area of at least one of the anode and the cathode having a surface area greater than a surface area of an internal surface of the housing, the anode-cathode pair configured and arranged to direct all fluid passing through the electrochemical cell axially through the active area.

In some embodiments, the electrochemical cell has an overall electrode packing density of at least about 2 mm$^{-1}$.

In some embodiments, the electrochemical cell further comprises a central core element disposed within the electrochemical cell and configured to block flow of fluid through a portion of the electrochemical cell along the central axis, the central core element unconnected to at least one electrode of the anode-cathode pair.

In some embodiments, the anode-cathode pair is spiral-wound about the central axis.

In some embodiments, the electrochemical cell further comprises one or more spiral-wound bipolar electrodes. In some embodiments, the anode is laterally displaced from the cathode along a length of the electrochemical cell.

In some embodiments, at least one of the anode and the cathode is a rigid electrode. The anode and the cathode may each include a titanium plate, and surfaces of the anode may be coated with an oxidation resistant coating selected from the group consisting of platinum and a mixed metal oxide. The anode and the cathode may each comprise one or more of titanium, nickel, and aluminum. Surfaces of the anode may be coated with an oxidation resistant coating selected from the group consisting of platinum, a mixed metal oxide, magnetite, ferrite, cobalt spinel, tantalum, palladium, iridium, gold, and silver. At least one of the anode and the cathode may be fluid permeable and/or may include a perforated titanium plate.

In some embodiments, the electrochemical cell further comprises a separator configured to maintain a gap distance between the anode and the cathode, the separator being open to flow of an electrolyte solution through the active area. The separator may include a hub having spokes with slots that engage edges of at least one of the anode and the cathode. The hub may further include an electrical connector configured to electrically connect the one of the anode and the cathode to a source of current.

In some embodiments, the electrochemical cell further comprises a hub including spokes in electrical contact with one of the anode and the cathode. The spokes may include slots that engage edges of the one of the anode and the cathode and maintain a gap between turns of the spiral wound anode-cathode pair.

In some embodiments, the central core element comprises a non-conductive core disposed within an innermost winding of the anode-cathode pair.

In some embodiments, the anode-cathode pair includes a plurality of concentric electrode tubes and gaps defined between adjacent electrode tubes. The plurality of concentric electrode tubes may include one of a plurality of anode electrode tubes and a plurality of cathode electrode tubes. One of the plurality of anode electrode tubes and the plurality of cathode electrode tubes may be rigid electrodes.

In some embodiments, the plurality of concentric tube electrodes includes a plurality of anode electrode tubes and a plurality of cathode electrode tubes.

In some embodiments, the electrochemical cell is configured to enable current (DC and/or AC) to flow through an electrolyte solution from an anode electrode tube to a cathode electrode tube in a single pass.

In some embodiments, the electrochemical cell further comprises a bipolar electrode tube disposed between an anode electrode tube and a cathode electrode tube.

In some embodiments, an anode electrode tube is laterally displaced along a length of the electrochemical cell from a cathode electrode tube having a same diameter as the anode electrode tube. The electrochemical cell may comprise an electrode tube including an anodic half and a cathodic half.

In some embodiments, the electrochemical cell further comprises a plurality of bipolar electrode tubes disposed between respective concentrically arranged adjacent pairs of anode electrode tubes and cathode electrode tubes.

In some embodiments, at least one of the plurality of anode electrode tubes and the plurality of cathode electrode tubes is perforated and/or fluid permeable.

In some embodiments, the electrochemical cell further comprises at least one separator positioned between adjacent electrode tubes, the at least one separator configured to define and maintain a gap between the adjacent electrode tubes. The separator may be open to flow of an electrolyte solution through the gap defined between the adjacent electrode tubes.

In some embodiments, the electrochemical cell further comprises a metallic hub including spokes electrically coupled to edges of a plurality of the concentric electrode tubes. Each spoke may include slots that engage the edges of the plurality of the concentric electrode tubes maintain gaps between adjacent electrode tubes in the plurality of the concentric electrode tubes.

In some embodiments, the central core element includes an end cap disposed within an end of an innermost concentric tube electrode of the electrochemical cell.

In some embodiments, the electrochemical cell has an obround cross section.

In some embodiments, the electrochemical cell further comprises an electrical connector in electrical communication with one of the anode and the cathode, the electrical connector including at least two materials having different degrees of resistance to chemical attack by an electrolyte solution. The at least two materials may include a first material and a second material and the electrical connector may include a fluid permeable body formed of the first material. The fluid permeable body may include a plurality of apertures.

In some embodiments, the electrochemical cell includes a plate or body of the second material coupled to the fluid permeable body formed of the first material with one or more mechanical fasteners.

In some embodiments, the electrochemical cell includes a plate or body of the second material coupled to the fluid permeable body formed of the first material with a compression fit.

In some embodiments, the electrochemical cell includes a plate or body of the second material coupled to the fluid permeable body formed of the first material with threads formed in an edge of the fluid permeable body formed of the first material.

In some embodiments, the electrochemical cell includes a body formed of the second material coupled to the fluid permeable body formed of the first material with threads formed in cylindrical portion of the body formed of the second material.

In some embodiments, the electrochemical cell includes a body formed of the second material welded to the body formed of the first material.

In accordance with another aspect, there is provided a system comprising an electrochemical cell. The electrochemical cell comprises a housing having an inlet, an outlet, and a central axis and an anode-cathode pair disposed substantially concentrically within the housing about the central axis and defining an active area between an anode and a cathode of the anode-cathode pair, an active surface area of at least one of the anode and the cathode having a surface area greater than a surface area of an internal surface of the housing, the anode-cathode pair configured and arranged to direct all fluid passing through the electrochemical cell axially through the active area. The system further comprises a source of electrolyte in fluid communication with the electrochemical cell. The electrochemical cell is configured to produce one or more reaction products from electrolyte from the source of electrolyte and to output the one or more reaction products. The system further comprises a point of use for the one or more reaction products output by the electrochemical cell. The one or more reaction products may include a disinfectant. The disinfectant may include or consist essentially of sodium hypochlorite.

In some embodiments, the source of electrolyte comprises water including sodium chloride.

In some embodiments, the system is included in a land-based oil drilling system, wherein the point of use is a downhole of the oil drilling system.

In accordance with another aspect, there is provided an electrochemical cell. The electrochemical cell includes a cathode and an anode disposed in a housing and defining a gap therebetween, each of the cathode and anode including arcuate portions, an active surface area of the anode being greater than a surface area of an internal surface of the housing and an active surface area of the cathode being greater than a surface area of an internal surface of the housing, the cathode and anode configured and arranged to direct all fluid passing through the electrochemical cell axially through the gap.

In some embodiments, the anode includes a plurality of plates extending from an arcuate base and the cathode includes a plurality of plates extending from an arcuate base, the plurality of plates of the anode interleaved with the plurality of plates of the cathode.

In accordance with another aspect, there is provided an electrochemical cell. The electrochemical cell includes a cathode and an anode disposed in a housing and defining a gap therebetween, each of the cathode and anode including a portion conforming to respective portions of an internal surface of the housing, an active surface area of the anode being greater than a surface area of an internal surface of the housing and an active surface area of the cathode being greater than a surface area of an internal surface of the housing, the cathode and anode configured and arranged to direct all fluid passing through the electrochemical cell axially through the gap. At least one of the anode and the cathode may include a corrugated portion.

In accordance with one aspect, there is provided a water treatment system for producing potable water and water for irrigation from saline water. The system comprises an electrodialysis apparatus including one or more monovalent selective membranes and having an inlet fluidly connectable to a source of water to be treated having a concentration of dissolved salts of between 500 mg/L and 10,000 mg/L, a diluate outlet, and a concentrate outlet, a low-pressure nanofiltration apparatus positioned downstream of the electrodialysis apparatus and having an inlet fluidly connectable to the diluate outlet of the electrodialysis apparatus, a permeate outlet, and a retentate outlet, an irrigation distribution system fluidly connectable to the retentate outlet of the nanofiltration apparatus and with the diluate outlet of the electrodialysis apparatus, and a diverting system configured to vary an amount of diluate from the electrodialysis apparatus directed to the irrigation distribution system and an amount of diluate from the electrodialysis apparatus directed to the nanofiltration apparatus.

In some embodiments, one or both of diluate of the electrodialysis system and permeate of the nanofiltration system is post-treated to remove excess boron.

In some embodiments, the system further comprises a pre-filtration system in fluid communication between the source of water to be treated and the inlet of the electrodialysis apparatus. The pre-filtration system may include at least one of a microfilter, a settler, a screen filter, a microsand filter, and a coarse particle filter. The pre-filtration system may be preceded by a pH adjusting system and an air stripping system.

In some embodiments, the system further comprises a conduit fluidly connecting the permeate outlet of the nanofiltration apparatus to at least one of an inlet of a concentrating compartment or inlet of an electrode stream compartment of the electrodialysis apparatus. The conduit may directly connect the permeate outlet of the nanofiltration apparatus to at least one of an inlet of a concentrating compartment or inlet of an electrode stream compartment of the electrodialysis apparatus.

In some embodiments, the concentrate outlet of the electrodialysis apparatus is fluidly connectable to an inlet of an electrochemical generation system for production of one or more of chlorine gas, hypochlorite ion, sodium hydroxide, sulfuric acid, or hydrochloric acid. The electrochemical generation system may be fluidly connectable to a source of pH adjustment agent configured to introduce pH adjustment agent into the water to be treated.

In some embodiments, the system further comprises a water softening apparatus upstream of the inlet to the electrochemical generation system.

In some embodiments, the system further comprises a system for treating permeate of the nanofiltration apparatus to achieve at least one of upward pH adjustment, lowered pH adjustment, addition of chlorine gas or addition of hypochlorite ion.

In some embodiments, the electrodialysis apparatus further includes one or more monovalent cation selective membranes.

In some embodiments, the one or more monovalent cation selective membranes have a selectivity coefficient for sodium over calcium of at least about 2.

In some embodiments, the electrodialysis apparatus further includes one or more monovalent anion selective membranes. The one or more monovalent anion selective membranes may have a selectivity coefficient for chloride over sulfate of at least about 2.

In some embodiments, the electrodialysis apparatus is configured to produce diluate having a sodium adsorption ratio (SAR) value of less than about 10. The electrodialysis apparatus may be configured to produce diluate having a SAR value of less than about 5. The nanofiltration apparatus may be configured to produce retentate having a SAR value less than the SAR value of the diluate. The nanofiltration apparatus may be configured to produce retentate and permeate, the retentate having a SAR value less than the SAR value of the permeate.

In some embodiments, the electrodialysis apparatus is configured to produce diluate having a higher ratio of divalent cations including magnesium and calcium to monovalent cations including sodium and a lower total concentration of ions than in the water to be treated.

In some embodiments, wherein the nanofiltration apparatus is configured to produce retentate having a higher concentration of the divalent cations than the concentration of the divalent cations in the diluate and a lower concentration of the monovalent cations than the concentration of the monovalent cations in the diluate.

In some embodiments, the system further comprises a controller configured to adjust the amount of diluate from the electrodialysis apparatus directed to the irrigation distribution system and the amount of diluate from the electrodialysis apparatus directed to the nanofiltration apparatus with the diverting system in any amount from 0% to 100% of an amount of diluate produced in the electrodialysis apparatus. The controller may be configured to adjust the amount of diluate directed to the irrigation distribution system and the amount of diluate directed to the nanofiltration apparatus depending on a relative demand for irrigation water and potable water.

In some embodiments, the system further comprises a mixer configured to blend diluate produced in the electrodialysis apparatus with any retentate produced in the nanofiltration apparatus and produce irrigation water having a SAR value intermediate of a SAR value of the diluate and a SAR value of the retentate.

In some embodiments, the system further comprises a sensor in communication with the controller, the sensor configured to provide the controller with an indication of one or more parameters of one of diluate from the electrodialysis apparatus and retentate from the nanofiltration apparatus, the controller configured to adjust the diverting system responsive to the indication of the one or more parameters.

In some embodiments, the system further comprises a sensor in communication with a controller, the sensor configured to provide the controller with an indication of one or more parameters of one of diluate from the electrodialysis apparatus and retentate from the nanofiltration apparatus, the controller configured to adjust one or more operating parameters of the electrodialysis apparatus responsive to the indication of the one or more parameters.

In accordance with another aspect, there is provided a method of treating saline water to produce potable water and irrigation water. The method comprises directing water to be treated having a concentration of dissolved salts of between 500 mg/L and 10,000 mg/L to an inlet of an electrodialysis apparatus including one or more monovalent cation selective membranes, treating the water to be treated in the electrodialysis apparatus to produce a diluate, determining an amount of the diluate to direct to an irrigation distribution system and an amount of the diluate to direct to an inlet of a low-pressure nanofiltration apparatus, treating any diluate directed to the inlet of the low-pressure nanofiltration apparatus in the nanofiltration apparatus to produce a permeate and a retentate, and combining any retentate with any of the diluate directed to the irrigation distribution system at the irrigation distribution system.

In some embodiments, the method further comprises directing at least a portion of any permeate produced in the nanofiltration apparatus to a concentrating compartment of the electrodialysis apparatus.

In some embodiments, producing the diluate in the electrodialysis apparatus comprises producing treated water having a SAR value of less than about 10.

In some embodiments, producing the diluate in the electrodialysis apparatus comprises producing treated water having a SAR value of less than about 5.

In some embodiments, producing the retentate in the nanofiltration apparatus comprises producing treated water having a SAR value of less than the SAR value of the diluate.

In some embodiments, the method further comprises directing at least a portion of the diluate to the irrigation distribution system.

In some embodiments, combining any retentate with any of the diluate directed to the irrigation distribution system comprises producing irrigation water with a SAR value intermediate of a SAR value of the diluate and a SAR value of the retentate.

In some embodiments, combining any retentate with any of the diluate directed to the irrigation distribution system comprises producing irrigation water with a SAR value of less than about 8 and a total dissolved solids level of greater than about 750 ppm.

In some embodiments, the method further comprises adjusting an amount of diluate from the electrodialysis apparatus directed to the irrigation distribution system and the amount of diluate from electrodialysis apparatus directed to the nanofiltration apparatus based on one of one or more parameters of the diluate from the electrodialysis apparatus and flow rate of retentate from the nanofiltration apparatus.

In some embodiments, the method further comprises adjusting one or more operating parameters of the electrodialysis apparatus based on one or more parameters of one of the diluate from the electrodialysis apparatus and any retentate from the nanofiltration apparatus.

In some embodiments, the method further comprises pre-filtering the water to be treated prior to directing the water to be treated to the inlet of the electrodialysis apparatus.

In some embodiments, the method further comprises directing permeate suitable for use as potable water from the permeate outlet of the nanofiltration apparatus to a potable water point of use.

In some embodiments, a pH of the water to be treated is reduced prior to introduction into the electrodialysis apparatus such that a concentration of bicarbonate ions in the water to be treated is reduced. The pH may be reduced using a controlled amount of one of either hydrochloric or sulfuric acid. An amount of hydrochloric or sulfuric acid added to the water to be treated may be determined based on a relationship between the pH of the water to be treated, and one of either of a concentrate water recovery of the electrodialysis apparatus or a SAR value of diluate of the electrodialysis apparatus. The reduced pH level water to be treated may be treated in an air stripping apparatus to remove a portion of dissolved or gaseous carbon dioxide prior to introduction of the water to be treated into the electrodialysis apparatus.

In some embodiments, the water to be treated is subjected to aeration followed by filtration such that a portion of one or more of elements or compounds of iron, manganese, arsenic, or sulfur are reduced in concentration prior to introduction of the water to be treated into the electrodialysis apparatus.

In some embodiments, a ratio of retentate outlet flow to permeate flow through the nanofiltration apparatus is controlled so as to limit a scaling potential of dissolved constituents of the nanofiltration retentate.

In some embodiments, effluent from one of more of the nanofiltration permeate stream or the electrodialysis diluate outlet stream is further treated to reduce dissolved concentration of boron compounds.

In some embodiments, a system including the nanofiltration apparatus and the electrodialysis apparatus is controlled and operated such that permeate from the nanofiltration apparatus meets water quality standards for potable drinking water.

In some embodiments, concentrations of one or both of dissolved boron or silica compounds in the water to be treated remain essentially the same in concentrating and diluting streams of the electrodialysis apparatus, and one or more of retentate and permeate of the nanofiltration apparatus.

In some embodiments, a system including the nanofiltration apparatus and the electrodialysis apparatus is controlled and operated such that retentate from the nanofiltration apparatus, diluate from the electrodialysis apparatus, or a combination of both meet water quality requirements for agricultural water.

In some embodiments, a system including the nanofiltration apparatus and the electrodialysis apparatus is controlled and operated such that concentrate from the electrodialysis apparatus meets water quality standards for use in produced oil recovery operations. The concentrate may be treated with one of ion exchange softening to reduce a concentration of divalent cations or pH adjustment prior to use in produced oil recovery operations.

In some embodiments, a ratio of divalent selenate or selenite ion concentration to chloride ion concentration in the concentrate from the electrodialysis apparatus is less than that of the water to be treated.

In some embodiments, a ratio of divalent selenate or selenite ion concentration to chloride concentration in diluate from the electrodialysis apparatus is less than that of the water to be treated and a ratio of calcium ion concentration to sodium ion concentration in the diluate from the electrodialysis apparatus is greater than that of the water to be treated.

In some embodiments, the method further comprises removing at least about 50% of nitrite present in the water to be treated in the electrodialysis apparatus. The method may further comprise removing at least about 50% of nitrate present in diluate of the electrodialysis apparatus directed to the nanofiltration apparatus in the nanofiltration apparatus.

In accordance with another aspect, there is provided a water treatment system for producing potable water and water for irrigation from saline water. The system comprises an electrodialysis apparatus including one or more monovalent selective membranes and having an inlet fluidly connectable to a source of water to be treated, a diluate outlet, and a concentrate outlet, a nanofiltration apparatus positioned downstream of the electrodialysis apparatus and having an inlet fluidly connectable to the diluate outlet of the electrodialysis apparatus, a permeate outlet, and a retentate outlet, and an electrolyzer in fluid communication with one of the concentrate outlet and the retentate outlet, and configured to generate a product stream including one or more of chlorine gas, hypochlorite ion, sodium hydroxide, sulfuric acid, hydrochloric acid, or sodium hypochlorite.

The system may further comprise a product holding tank fluidically connected downstream of the electrolyzer, the product holding tank including a recirculation line configured to pass product fluid from the holding tank through a second electrolyzer to produce a further treated product and return the further treated product to the product holding tank.

In some embodiments, the electrolyzer includes up to 20 concentric tube electrode (CTE) electrochemical cells. The up to 20 CTE cells may be fluidically connected in series.

The system may further comprise a source of pH adjustment agent in fluid communication with an inlet of the electrolyzer. In some embodiments, the source of pH adjustment agent includes an electrodialysis system. The electrodialysis system included in the source of pH adjustment agent may include bipolar membranes.

The system may further comprise an electrodialysis system in fluid communication between the retentate outlet and the electrolyzer. The electrodialysis system may be in fluid communication between the retentate outlet and the electrolyzer. The electrodialysis system may include a reject outlet in fluid communication with an inlet of the electrolyzer.

In some embodiments, the electrodialysis system in fluid communication between the retentate outlet and the electrolyzer is configured to produce potable water.

The system may further comprise a fluid oxygenation system in fluid communication between the electrodialysis system and the electrolyzer.

The system may further comprise an irrigation distribution system fluidly connectable to the retentate outlet of the nanofiltration apparatus and with the diluate outlet of the electrodialysis apparatus.

In some embodiments, the electrodialysis apparatus is configured to produce diluate having a sodium adsorption ratio (SAR) value of less than about 10. The nanofiltration apparatus may be configured to produce retentate having a SAR value less than the SAR value of the diluate.

In some embodiments, the electrodialysis apparatus is configured to produce diluate having a higher ratio of divalent cations including magnesium and calcium to monovalent cations including sodium and a lower total concentration of ions than in the water to be treated. The nanofiltration apparatus may be configured to produce retentate having a higher concentration of the divalent cations than the concentration of the divalent cations in the diluate and a lower concentration of the monovalent cations than the concentration of the monovalent cations in the diluate.

In accordance with another aspect, there is provided a method of treating saline water to produce potable water and irrigation water. The method comprises directing water to be treated to an inlet of an electrodialysis apparatus including one or more monovalent cation selective membranes, treating the water to be treated in the electrodialysis apparatus to produce a diluate and a concentrate, treating the concentrate in an electrolyzer configured to generate a product stream including one or more of chlorine gas, hypochlorite ion, sodium hydroxide, sulfuric acid, hydrochloric acid, or sodium hypochlorite from the concentrate, and determining an amount of the diluate to direct to an irrigation distribution system and an amount of the diluate to direct to an inlet of a low-pressure nanofiltration apparatus.

The method may further comprise directing at least a portion of the diluate to the irrigation distribution system.

The method may further comprise treating any diluate directed to the inlet of the low-pressure nanofiltration apparatus in the nanofiltration apparatus to produce a permeate and a retentate. The method may further comprise directing permeate suitable for use as potable water from a permeate outlet of the nanofiltration apparatus to a potable water point of use. The method may further comprise combining any retentate with any of the diluate directed to the irrigation distribution system at the irrigation distribution system.

In some embodiments, producing the diluate in the electrodialysis apparatus comprises producing treated water having a SAR value of less than about 10.

In some embodiments, producing the retentate in the nanofiltration apparatus comprises producing treated water having a SAR value of less than the SAR value of the diluate.

The method may further comprise treating the retentate in a second electrolyzer configured to generate a product stream including one or more of chlorine gas, hypochlorite ion, sodium hydroxide, sulfuric acid, hydrochloric acid, or sodium hypochlorite from the retentate.

The method may further comprise directing one or both of the concentrate treated in the electrolyzer and the retentate treated in the second electrolyzer to a product holding tank, the product holding tank including a recirculation line configured to pass product fluid from the holding tank through a third electrolyzer for further treatment to produce a further treated product and return the further treated product to the product holding tank.

In some embodiments, one of treating the concentrate in the electrolyzer and treating the retentate in the second electrolyzer includes treating one of the concentrate and the retentate in up to 20 concentric tube electrode (CTE) electrochemical cells fluidically connected in series.

The method may further comprise delivering a pH adjustment agent into an inlet of one of the electrolyzer and the second electrolyzer.

The method may further comprise generating the pH adjustment agent in a second electrodialysis apparatus.

The method may further comprise treating the retentate in a second electrodialysis apparatus in fluid communication between a retentate outlet of the nanofiltration apparatus and the second electrolyzer.

The method may comprise directing treated retentate from a reject outlet of the second electrodialysis apparatus to an inlet of the electrolyzer. The method may further comprise producing potable water in the second electrodialysis apparatus.

The method may further comprise treating the retentate treated in the second electrodialysis apparatus with a fluid oxygenation system in fluid communication between the second electrodialysis apparatus and the electrolyzer.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 9A is a table of representative electrolyzer system parameters;

FIG. 9B is a table of representative electrolyzer system mass flow rates;

FIG. 9C is a table of representative hydrogen volume generation rates in an electrolyzer system;

FIG. 9D is a table of representative mass generation rates in an electrolyzer system;

FIG. 11 illustrates removal rates of select compounds in an example nanofiltration system;

FIG. 13B illustrates relative levels of Cl— and SO$_4^{2-}$ as a function of desalination percent in an example electrodialysis module;

FIG. 14A illustrates relative levels of select cations as a function of total TDS in seawater concentrate from an example electrodialysis module;

FIG. 21B illustrates the composition of feed solution utilized for the system of FIG. 21A; and FIG. 21C illustrates results of testing of the system of FIG. 21A.

DETAILED DESCRIPTION

Figure 1:
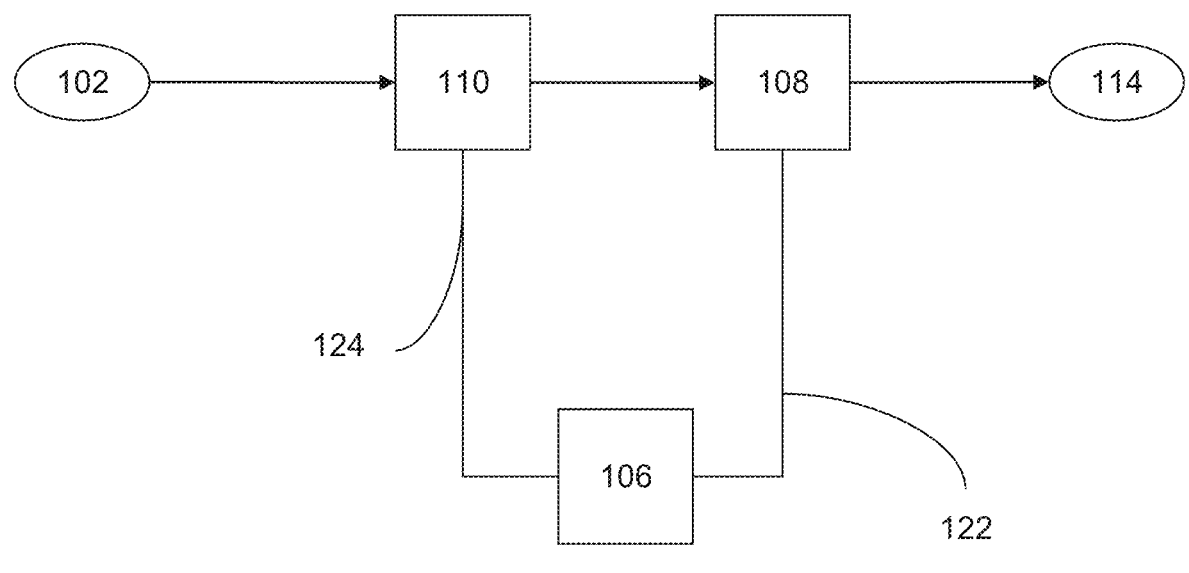
FIG. 1 is a schematic illustration of a system in accordance with one or more features of the invention.
Figure 1:
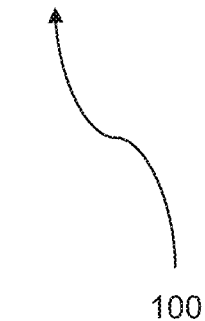

This invention is not limited in its application to the details of construction and the arrangement of components set forth in the following description or illustrated in the drawings. The invention is capable of embodiments and of being practiced or of being carried out in various ways beyond those exemplarily presented herein.

Scarcity of irrigation water of sufficient quality is deleterious to crop yields and may require choice of crop species that are of less demand. Newer methods of irrigation that reduce the amount of water used, using techniques such as drip irrigation, may also cause a non-sustainable condition due to salt and impurity buildup in the soil from the water used for irrigation. The soil salinity may rise to much higher concentrations than in the irrigation water due to use of most of the water by the crops, and by evaporation. Conditions of irrigation and soil with inadequate source water for leaching the soil or insufficient rainfall may result in soil salinities 4 to 5 times higher than in the irrigation water itself. Further, should the land consist of relatively shallow impermeable ground layers, the irrigation water may raise the water table. When highly saline ground water reaches crop root levels, the water may be harmful to crop growth. Also, saline soils may damage leafy crops due to water splash off the soil surface. Furthermore, if the agricultural land is drained of the saline water, trace impurities in the soil such as selenium or boron, or residual contaminants from fertilizer use such as nitrate may cause contamination of the drainage water and cause difficulties in safe effluent control.

Irrigation water needs also are in competition with potable drinking water for humans, and water free of contaminants for livestock, and wildlife. Thus it is commonly the case that a source of a combination of irrigation water and potable water are needed in agricultural regions.

One or more aspects of the invention can involve systems and techniques for providing water suitable for agricultural facilities. Other aspects of the invention can provide potable water or water suitable for human use or consumption as well as for livestock and poultry. Some systems and techniques of the invention can convert or otherwise render non-potable water suitable for agricultural, livestock, poultry, and/or human consumption. Still further aspects of the invention can involve systems and techniques that preferentially or selectively remove some species over other species from a fluid to be treated to provide a product having one or more desirable characteristics. In contrast with non-selective techniques, some selective removal aspects of the invention can be more cost effective by avoiding or reducing additional post-treatment processes, for example, blending. Thus, the systems and techniques of the invention economically provide treated water that is more suitable for an intended use.

In some embodiments of the invention, some types of species are retained in a treated fluid stream while other types of species are preferentially removed. The resultant product fluid can be utilized in various applications and/or otherwise satisfy one or more objectives. Other aspects of the invention can involve systems and techniques that provide water having one or more properties or characteristics tailored to satisfy a particular purpose. Some embodiments of the invention can thus involve systems and techniques that provide one or more water streams or bodies that have one or more attributes that have been adjusted based on one or more parameters of the point of use or facility in which the stream or body is to be utilized.

Even further aspects of the invention can involve systems and techniques that economically provide water for agricultural, industrial, commercial, and/or residential service. Further, some particular aspects of the invention can involve providing water to serve a plurality of requirements or levels of purity or quality. Thus in some embodiments, the systems and techniques of the invention can provide one or more water streams or bodies in a mixed use facility. Particularly advantageous aspects of the invention can involve providing the plurality of water streams or bodies, each of which may have differing water quality levels, from a source of water having high solids content, to a plurality of points of use, each of which may have differing requirements. Such aspects of the invention can provide systems and techniques that treat, for example, non-potable water to render it potable and/or suitable for irrigation, for livestock and/or poultry consumption, and/or for human consumption or use.

In some aspects of the invention, water having a high level of one or more objectionable species dissolved therein can be treated to remove or at least reduce the concentration of such species to an acceptable level. The one or more objectionable species can be any species that render the untreated water unsuitable for a particular application. For example, the water may contain a high level or undesirable concentration of monovalent cations and/or anions which adversely or undesirably hinders retention of water in soil or adsorption of other species, including, for example, divalent or even multivalent species. If the requirement is pertinent to crop irrigation, the undesirable condition or characteristic can involve water that contains one or more species that affects the permeability and/or infiltration properties of the soil being irrigated. For example, some aspects of the invention can involve rendering or treating water to preferentially remove monovalent species over non-monovalent species.

In accordance with one or more particular aspects, the invention can involve embodiments directed to systems and/or methods comprising providing or introducing water to be treated into an electrically-driven separation apparatus. Some embodiments of the invention can involve an irrigation system comprising an electrically-driven separation apparatus fluidly connected, or at least connectable, to one or more sources of water to be treated and at least one irrigation water distribution system.

Other aspects of the invention may involve a method of providing potable water. Some aspects of the invention can provide irrigation water and/or potable water without thermally-driven separation techniques, high pressure operation, or unit operations. For example, a method in accordance with some embodiments of the invention can comprise one or more acts or steps of providing water to be treated and treating at least a portion of the water to be treated in an electrically-driven separation apparatus to produce a first treated water. The method can further comprise one or more acts of treating a portion of the water to be treated, typically a separate portion, in one or more pressure-driven separation apparatus to produce a second treated water. In some cases, the method can further comprise a step of using the first treated water as feed to the second apparatus to provide a second treated water to produce the potable water. The potable water typically has a target or desired total dissolved solids (TDS) content, for example, a TDS content of less than about 500 ppm.

Aspects of the invention directed to systems that provide potable water can comprise a source of water to be treated and a pressure-driven separation apparatus having an inlet that is fluidly connected, or at least connectable, to the source of water to be treated. The pressure-driven apparatus can also have one or more outlets, typically at least one product outlet as a treated water outlet. The pressure-driven separation apparatus typically also has at least one reject outlet as an outlet for a stream containing one or more species, typically an undesirable species, removed from the treated water. The system for providing potable water can further comprise one or more electrically-driven separation apparatus which can be fluidly connected, or connectable, to the source of water to be treated, to the pressure-driven separation apparatus, or both. For example, as described in further detail below, one or more electrically-driven separation apparatus can be fluidly connected to a reject outlet of the pressure-driven separation apparatus. In accordance with particular embodiments of the invention, the system for providing potable water can further comprise one or more mixers having one or more inlets fluidly connected, or connectable, to the treated water outlet of the pressure-driven apparatus and the product water outlet of the electrically-driven separation apparatus. The mixer can comprise any mixing unit operation that facilitates at least partially blending or combining one or more product streams including, in some cases, a stream from the source of water to be treated to form a final product stream having one or more desirable characteristics.

The water to be treated can comprise brackish water having a TDS of between about 1,500 mg/L (1,500 ppm) and about 5,000 mg/L (5,000 ppm), and/or saline water containing high concentrations of dissolved solids or salts, for example, a concentration of dissolved salts of between about 500 mg/L and about 10,000 mg/L. Other sources of water to be treated can comprise water that would be unsuitable for use in agricultural facilities because of infiltration and/or toxicity considerations.

The systems and techniques of the invention can comprise, where appropriate, pre-treatment subsystems to facilitate one or more operating principles thereof. One or more pre-treatment and/or post-treatment unit operations may be utilized in one or more embodiments of the invention. For example, the systems and techniques of the invention may comprise a pre-treatment subsystem including one or a plurality of filters or screens that separate or remove at least a portion of any suspended solids from the water to be treated. Such pre-treatment subsystems typically remove particulate material that would damage any downstream unit operation of the systems of the invention, or, for example, irrigation equipment. Other pre-treatment unit operations may include, for example, microfilters and/or sedimentary-based systems that can remove suspended solids having characteristic dimensions of, for example, one micron or greater, or 10 microns or greater.

Further pre-treatment operations may be utilized to improve the effectiveness of one or more unit operations of the invention. For example, a pre-treatment subsystem can comprise coolers or heaters that, respectively, cool or heat the water to be treated prior to separation operations. Cooling of the raw feed stream, or any intermediate process stream may be performed to, for example, facilitate the transport of an undesirable species, or to hinder the transport of a desirable species, from the stream to be treated. Likewise, heating may be performed to raise the temperature of the raw feed stream, or one or more intermediate process streams, to a desired temperature that, for example, facilitates economical or efficient operation of the one or more separation apparatus. Non-limiting examples of heating processes may involve heaters, furnaces, or heat exchangers that may be associated with or be a unit operation of a process or system of the invention. For example, heating may be provided through a heat exchanger of a power plant that is not necessarily associated with the treatment systems of the invention.

Pre-treatment systems may also or alternatively be used to remove or reduce the concentration one or more species in the water to be treated to improve the effectiveness of one or more treatment unit operations, reduce the potential for scaling, or remove undesirable species that may be difficult to remove in the one or more treatment unit operations. For example, the pH of the water to be treated may be adjusted to cause one or more dissolved species to precipitate or to be converted into a different form so that it may be removed from the water to be treated by, for example, filtration, settling, or air stripping. pH adjustment agents that may be used include, for example, hydrochloric acid, sulfuric acid, sodium hydroxide, or any other pH adjustment agent known in the art. Species that may be removed from the water to be treated may include, for example, elemental or ionic forms or compounds of any one or more of bicarbonate, iron, manganese, arsenic, sulfur, selenium (e.g., divalent selenate or selenite), boron, or silica. In other embodiments, a pre-treatment system may include a water softening apparatus, for example, an ion exchange system that may remove hardness components, for example, calcium from the water to be treated.

Post-treatment unit operations may polish, remove, or reduce the concentration one or more species in the treated water. For example, one or more ion exchange columns may be utilized to remove species that are not readily removed in the electrically-driven separation apparatus and/or the pressure-driven separation apparatus. Non-limiting examples of species that would typically be removed or at least have a reduction in concentration to, preferably, non-toxic and/or non-objectionable levels, in post-treatment operations include those that may affect soil aggregation, water infiltration, and/or would be toxic to plant growth such as aluminum, arsenic, beryllium, boron, cadmium, cobalt, chromium, copper, iron, fluoride, lithium, manganese, molybdenum, nickel, lead, selenium, tin, titanium, tungsten, vanadium, boron, and zinc. An example of an ion exchange resin that may be utilized to remove species such as boron is the AMBERLITE™ PWA10 boron selective ion exchange resin available from the Dow Chemical Company. Other species that may be addressed by one or more post-treatment operations include those that may be toxic or objectionable to humans, poultry, and/or livestock in drinking water such as, but not limited to, nitrates, nitrites, selenium, vanadium, and sulfides. Disinfecting processes may also be performed to at least partially inactivate or reduce the concentration of colony-forming microorganisms that may be harmful to human and/or livestock or that create biofilms that may clog irrigation nozzles.

Alternatively, or in combination with the one or more polishing unit operations, the systems and techniques of the invention may involve adding one or more species to at least a portion of the treated water. For example, gypsum may be added to adjust the concentration of one or more desirable species or adjust a characteristic of the water. Other additives may include fertilizers, disinfectants, or other supplements that facilitate crop growth when the water is used for irrigation.

An electrically-driven apparatus typically utilizes a potential field to create a motive force that induces one or more species, typically the target species, which can include desirable as well as undesirable species, to migrate from the carrier or fluid. The electrically-driven apparatus can utilize one or more components that segregate the target species during migration and/or inhibit the return or reverse process. Non-limiting examples of such devices include electrodialysis (ED) devices, including current reversing electrodialysis (EDR) devices, as well as electrodeionization (EDI) devices. "Electrodialysis" is a broader term and includes "electrodeionization." Another form of electrically-driven separation apparatus that may be utilized in various aspects and embodiments disclosed herein is a capacitive deionization (CapDI) apparatus which deionizes water by applying an electrical potential difference over two porous carbon electrodes. Anions are removed from the water and are stored in the positively polarized electrode; likewise, cations are stored in the cathode, which is the negatively polarized electrode. Aspects and embodiments disclosed herein are described as including ED apparatus, however, it is to be appreciated that in alternate embodiments other forms of electrically-driven separation apparatus may be used in addition to or instead of ED apparatus. Aspects and embodiments disclosed herein are not limited to one or a combination of particular electrically-driven separation apparatus and may be practiced with other apparatus that provide a motive force that facilitates the preferential migration of one or more target species over other species in the fluid to be treated.

The electrically-driven separation apparatus of the invention typically utilize ion selective membranes to facilitate separation phenomena. In some cases, the selectively permeable membrane can preferentially or selectively allow transport of some species relative to other species. For example, cation selective membranes may be utilized in some compartments of the electrically-driven separation apparatus. In other embodiments, anion selective membranes may be utilized in one or more compartments in addition to or instead of the cation selective membranes. In still other embodiments, the electrically-driven separation apparatus of the invention may comprise one or more monovalent ion selective membranes to selectively promote transfer of the monovalent cationic or anionic species. Indeed, in some embodiments of the invention, the separation apparatus of the invention may comprise monovalent cation selective membranes and one or more monovalent anion selective membranes. Non-limiting examples of commercially available monovalent selective membranes include NEOSEPTA® cation and anion selective membranes from ASTOM Corporation, Tokyo, Japan or Tokuyama Corporation, Tokyo, Japan. The monovalent cation or monovalent anion selective membranes may be selected to have a selectivity of, for example, greater than about 2, greater than about 5, or greater than about 10. In some embodiments, the monovalent cation selective membranes may have a selectivity coefficient for sodium over calcium of at least about 2, at least about 5, or at least about 10. In some embodiments, the monovalent anion selective membranes may have a selectivity coefficient for chloride over sulfate of at least about 2, at least about 5, or at least about 10. As the term is used herein, selectivity may be calculated according to the following formula which illustrates a calculation of selectivity of sodium (Na) over magnesium (Mg) and calcium (Ca), although the selectivity of separation apparatus for other elements or compounds over one another may be similarly calculated:

$$\text{Selectivity} = \frac{\frac{\Delta v_{Na}}{v_{Na}}}{2\left[\frac{\Delta v_{Ca} + \Delta v_{Mg}}{v_{Ca} + v_{Mg}}\right]}$$

where v is the molarity of ionic species i and Δv is the change in the molarity of ionic species i.

The monovalent cation and or anion selective membranes may provide for the embodiments of electrically-driven separation apparatus to be operated to produce treated water (diluate) having a sodium adsorption ratio (SAR) of less than about 20, less than about 9, or less than about 3 from brackish water having a TDS of between about 1,500 mg/L (1,500 ppm) and about 5,000 mg/L (5,000 ppm), and/or saline water containing high concentrations of dissolved solids or salts, for example, a concentration of dissolved salts of between about 500 mg/L and about 10,000 mg/L. These SAR values may be achievable due to the preferential transfer of monovalent cations vs. divalent or multivalent cations into concentrating compartments of the electrically-driven separation apparatus, thus increasing a ratio of the divalent or multivalent cations to monovalent cations in the diluting compartments of the electrically-driven separation apparatus.

A pressure-driven separation apparatus typically utilizes one or more barriers to inhibit migration of a first species therethrough while allowing penetration of another. The motive force facilitating the separation phenomena typically involve pressurizing fluid to be treated. Non-limiting examples of pressure-driven separation apparatus include microfiltration and nanofiltration (NF) apparatus as well as reverse osmosis (RO) systems. NF apparatus typically selectively pass monovalent ions as compared to divalent or multivalent ions. Accordingly, the permeate produced in a NF apparatus may have a higher concentration ratio of monovalent ions than divalent or multivalent ions than in the retentate produced in a NF apparatus. The retentate produced in a NF apparatus may thus have a lower SAR value than the permeate or the water influent to be treated in the NF apparatus. Examples of nanofilters that have a high selectivity for passing monovalent as compared to divalent ions and may be utilized in various embodiments disclosed herein may include SWSR nanofiltration membranes available from the General Electric Company, NF245 nanofiltration membranes, NF 270 nanofiltration membranes, or NF345 nanofiltration membranes, available from the Dow Chemical Company or ESNA1-LF-LD nanofiltration membranes or HYDRACoRe10 nanofiltration membranes available from Hydranautics.

One or more embodiments of the invention can be directed to a water treatment system 100 as exemplarily shown in FIG. 1. System 100 can be a system for providing potable water, irrigation water, or both, to, for example, a point of use 114. The treatment system 100 can comprise at least one separation unit operation or separation apparatus 110 that, in some cases, selectively removes one or more species or types of species from water from the source 102 of water to be treated. The system can optionally comprise one or more monitoring subsystems that provide an indication of one or more operating characteristics of the treatment system. As illustrated, system 100 can have one or more monitoring sensors 108 that typically provide an indication of water quality produced, or otherwise treated, from the separation apparatus 110. In some aspects of the present invention, system 100 can utilize a control system or controller configured or constructed and arranged to regulate one or more parameters of one or more unit operations in the systems of the invention. Referring again to FIG. 1, system 100 can thus have one or more controllers 106 that adjust at least one operating parameter of separation apparatus 110 typically to at least one desired condition. The one or more monitoring sensors 108 may communicate with the one or more controllers 106 though a communications network including, for example, a signal line 122, or additionally or alternatively, through a wireless communication link. The one or more controllers 106 may communicate with the at least one separation unit operation or separation apparatus 110 though a communications network including, for example, a signal line 124, or additionally or alternatively, through a wireless communication link. Any suitable control technique may be utilized to adjust the at least one operating parameter of any unit operation in system 100 to provide treated water having the one or more desired characteristics. For example, in some embodiments, a sensor/transmitter (not shown) located between the source 102 of water to be treated and the separation unit operation or separation apparatus 110 may be utilized to provide measurements of one or more parameters of the water to be treated to the controller 106 to control the removal of contaminants or water recovery from the treatment unit 110.

The systems and techniques of the invention may include one or more water distribution systems that facilitate delivery of the treated water to one or more points of use. For example, the distribution system may include an irrigation distribution system that delivers irrigation water to various points of use in an agricultural facility. To facilitate the delivery of the treated water, the distribution system can include one or more storage systems, such as reservoirs, tanks, wells, or other vessels and containers. The irrigation systems of the invention may utilize overhead and/or surface or sub-surface irrigation techniques to convey water to a designated area. The irrigation system components can thus employ non-movable as well as mobile devices.

The one or more storage systems may be considered as part of the distribution system or be an ancillary subsystem of the treatment system. The one or more storage systems may further facilitate providing treated water having desired characteristics. Treated water having a first condition or characteristic may be stored in one or more storage systems prior to further treatment or processing, for example, blending, with another treated or untreated water body or stream.

Figure 2:
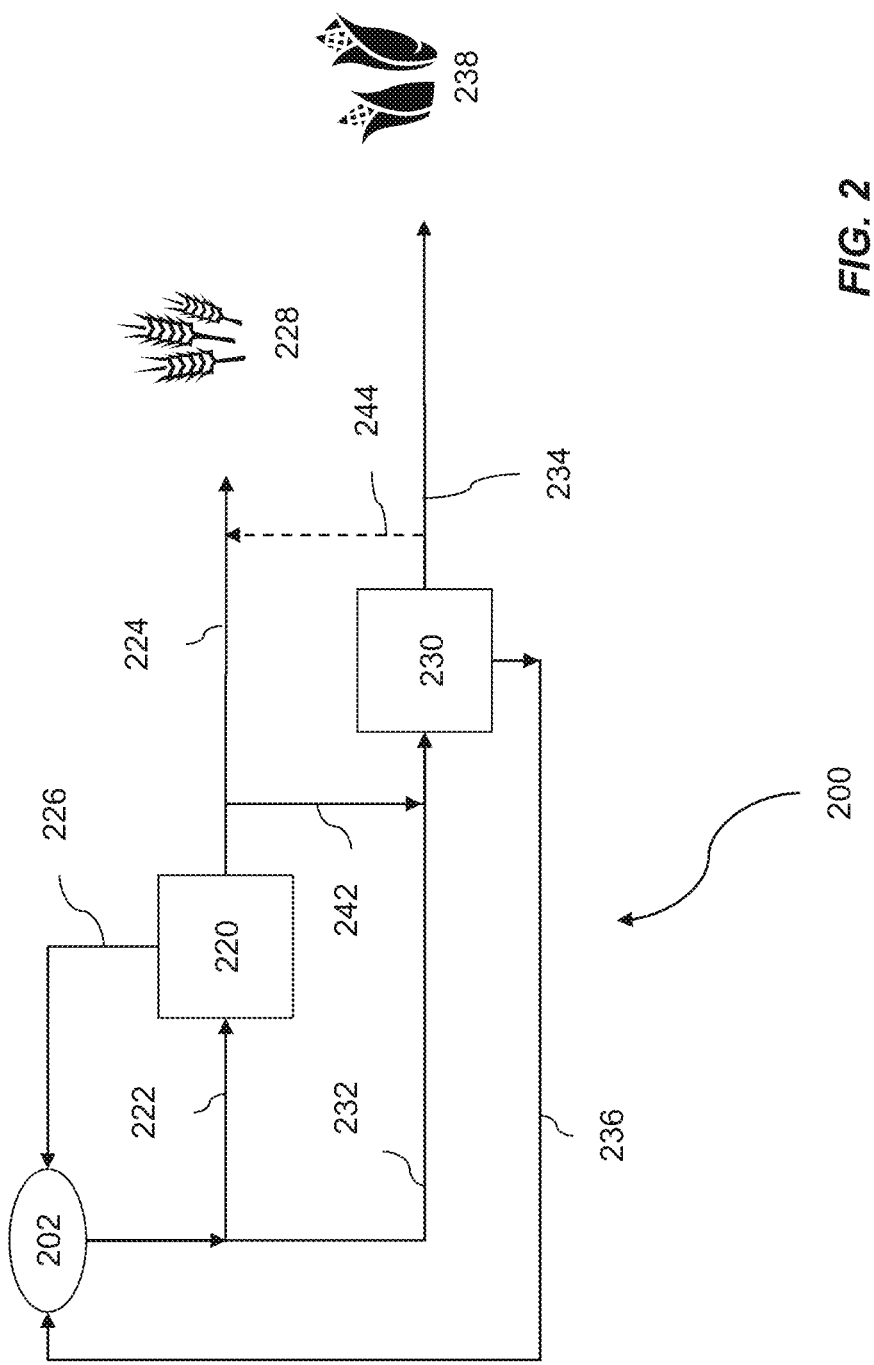
FIG. 2 is a schematic illustration of an irrigation system in accordance with further features of the invention.

FIG. 2 is a schematic diagram exemplarily showing some features of the invention pertinent to an irrigation system 200. Irrigation system 200 can comprise a separation apparatus 220 fluidly connected and, as illustrated, disposed to receive water to be treated from source 202, for example, through conduit 222. Separation apparatus 220 can treat water from source 202 and provide treated water to a first point of use 228, illustrated herein as a first type of crop through irrigation water distribution system 224. Point of use 228 can be a portion of a crop that, for example, is at a stage of growth different from at least one portion of the entire crop. System 200 can further comprise one or more second separation apparatus 230. Separation apparatus 230 can also treat water from source 202 and provide treated water to a second point of use 238, illustrated as a second type of crop, through second irrigation distribution system 234. Second point of use 238 may be a portion the same type of crop to be irrigated as, for example, first point of use 228 or a portion of a second crop at a different stage of growth. In accordance with some embodiments of the invention, separation apparatus 230 can optionally provide treated water to first point of use 228, instead of and/or to supplement treated water from separation apparatus 220, through conduit or connection 244. Some embodiments of the invention contemplate, at least partially, a staged treatment scheme. For example, first separation apparatus 220 may provide treated water having a first water quality or characteristic which can further be treated in second separation apparatus 230 through conduit or distribution system 242. A plurality of second separation apparatus 230 may be utilized with one or more first separation apparatus 220 to provide treated water to one or more points of use. Some embodiments of the invention may involve serial arrangement of separation apparatus and other embodiments may utilize separation apparatus in parallel configurations to provide treated water so as to satisfy the volumetric requirements of the one or more points of use. For example, water to be treated from source 202 may be provided in parallel to both first separation apparatus 220 and second separation apparatus 230 through conduits or distribution systems 222 and 232, respectively. In some cases, however, a combination of serial and parallel treatment paths may be implemented to provide treated water at a rate or a plurality of rates, wherein each of the one or more treated water streams have one or more desired characteristics.

Figure 19:
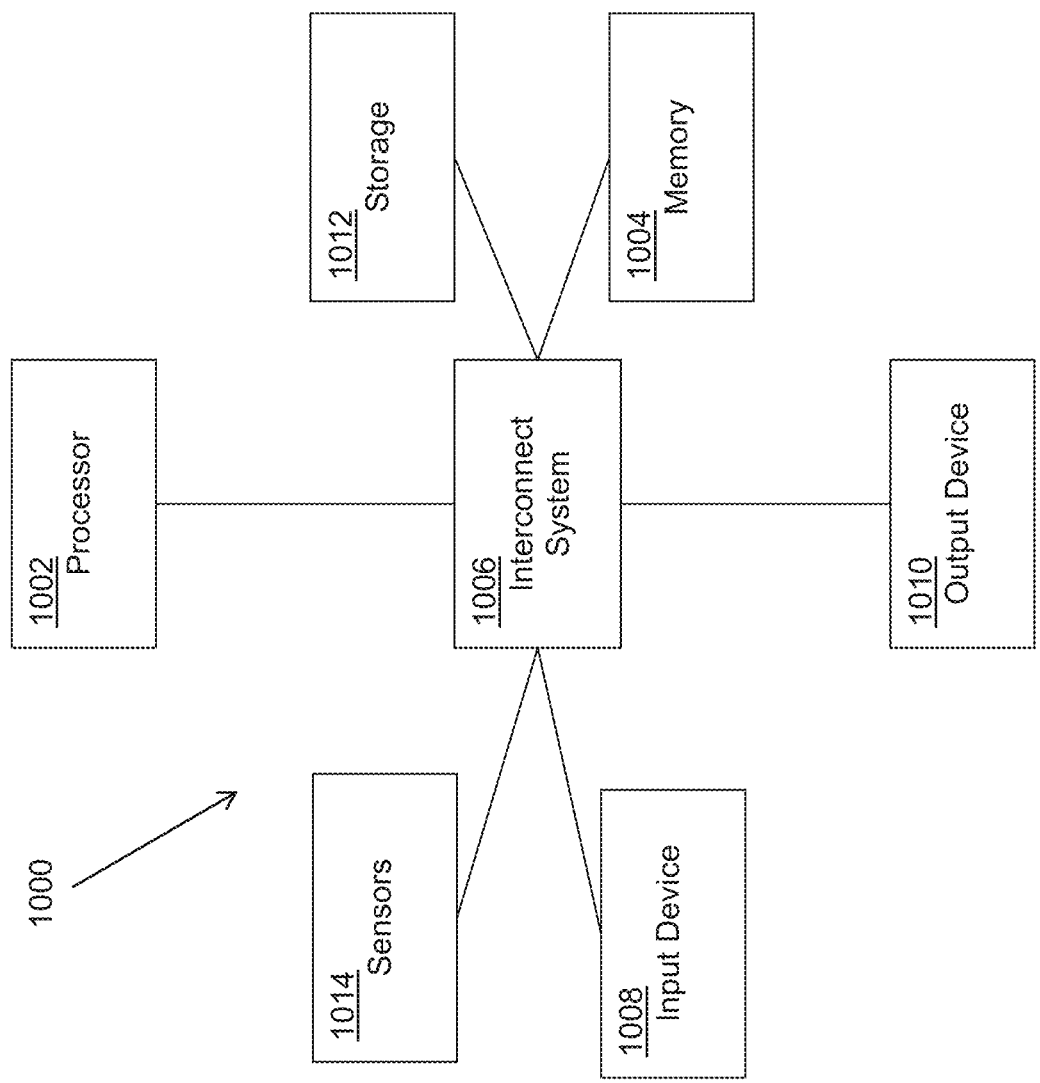
FIG. 19 illustrates a control system for embodiments of electrochemical cells and systems disclosed herein.
Figure 20:
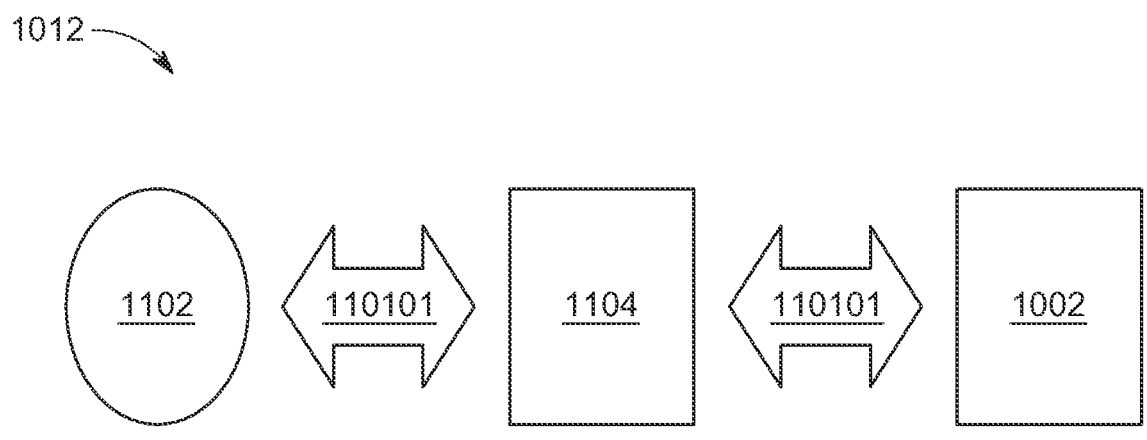
FIG. 20 illustrates a memory system for the control system of FIG. 19.

System 200 can include one or more controllers (e.g., as illustrated in FIGS. 19 and 20) to control one or more operating parameters of any component or subsystem of system 200. Like the system exemplarily illustrated in FIG. 1, system 200 can have one or more controllers that can adjust one or more operating parameters. For example, one or more controllers of system 200 can have adjust the current, potential, or both, of the applied electric field in any of the separation apparatus. Other parameters that may be adjusted include, for example, TDS content, pressure, temperature, pH, flow ratio or any combination, of any stream of the system.

In accordance with some aspects of the invention, the one or more characteristics of the treated water stream can be any measured or derived attribute of the product stream so as to render it suitable for its intended use at point 114. However, the invention is not limited as such; for example, the characteristic of the water may be an attribute of the treated or product water stream in terms relative to the water stream to be treated. The attribute or parameter can be a singular or a composite or aggregate characteristic of the water. Specific, non-limiting examples of such attributes can include the conductivity or resistivity of the water, the presence, absence, or concentration of one more particular species or kinds of species in the water, as well as combinations thereof.

In accordance with one or more embodiments of the invention, the systems and techniques of the invention provide water having a desired water attribute can be represented or quantified as a composite character. The composite character can provide an indication of suitability of the treated water for a particular purpose. Consequently, the systems and techniques of the invention can involve operations that seek or at least promote providing water having one or more desired composite characteristics. In irrigation applications, the treated water attribute can be related to its suitability as irrigation water. Thus, some aspects of the invention can be directed to treating non-potable water and rendering the water, as treated water, suitable for irrigation in one or more agricultural facilities by adjusting one or more characteristics thereof. Some aspects of the invention can provide irrigation water tailored to one or more crops grown or cultivated in one or more agricultural facilities. For example, with reference again to FIG. 2, the systems and techniques of the invention can provide a first treated water, having a first composite characteristic, to a first type of crop 228 and a second treated water, having a second composite characteristic, to a second type of crop 238. The second treated water can be used to supplement and/or adjust the characteristic of the first treated water and, conversely, the first treated water can be used to adjust one or more characteristics of the second treated water. The one or more characteristics can be adjusted to meet a particular requirement by, for example, mixing together or blending the one or more treated water streams or portions thereof. The particular target characteristic can be achieved by regulating the ratios or relative amounts or rates of the treated water streams to be mixed. The treated water streams may be mixed in any ratio desired, for example, by mixing from 0% (no mixing) to 100%, from about 10% to about 90%, from about 25% to about 75%, or from about 40% to about 60% of a the first treated water with the second treated water or by mixing from 0% (no mixing) to 100%, from about 10% to about 90%, from about 25% to about 75%, or from about 40% to about 60% of the second treated water with the first treated water.

During typical operation, each of the one or more separation apparatus 220 and 230 typically generates one or more secondary streams. Typically, the one or more secondary streams contain an unacceptable level of one or more undesirable species. Any one or more secondary streams can be discharged as waste streams. For example, the waste stream typically containing the one or more species transferred from the stream treated in separation apparatus 230 can be discharged or transferred to the source of water to be treated 202 through conduit or distribution system 236. The waste stream typically containing the one or more species transferred from the stream treated in separation apparatus 220 can be discharged or transferred to the source of water to be treated 202 through conduit or distribution system 226. Likewise, other embodiments of the invention contemplate combining one or more secondary streams, typically from one or more downstream separation apparatus, with a water stream to be treated in one or more upstream separation apparatus. For example, one or more streams output from a downstream electrically-driven or pressure-drive separation apparatus may be returned to an upstream electrically-driven separation apparatus as concentrate makeup or diluate makeup. The waste stream can also be discharged with other streams that may or may not be directly associated with the treatment system. For example, the stream to be discharged may be returned to the source of water to be treated after being mixed with one or more blow down streams from, for example, a cooling tower, which may not be a unit operation of the treatment system. In other cases, however, the one or more waste streams may be stored and combined with water having very low salinity to mitigate water infiltration problems that could result in leaching soluble minerals, and salts such as calcium from surface soils.

In some embodiments of the invention, the secondary stream from second separation apparatus 230 contained in conduit 236 can be introduced into first separation apparatus 220, alone or combined, as shown in FIG. 2, with water to be treated from source 202 as delivered through conduit 222.

The schematically illustrated systems depicted in FIGS. 1 and 2 may further comprise unit operations that facilitate the treatment of water. For example, an optional system may be utilized upstream of separation apparatus 220 and 230 to filter or otherwise remove at least a portion of suspended solids in the water from source 202. Non-limiting examples of pre-treatment unit operations that may be utilized to reduce the concentration of at least one suspended solid entrained in the water to be treated include microfilters, settlers, screen filters, and coarse particle filters.

Further, one or more unit operations may be utilized to further process one or more of the treated water streams. For example, a polishing bed may further remove one or more species from one or more of the treated streams in distribution systems 224 and 234. Non-limiting examples of such unit operations that can be utilized to remove at least a portion of weakly ionized or ionizable species, such as, but not limited to, boron, selenium, and arsenic, include ion exchange columns.

Further unit operations that facilitate post-treatment of one or more treated water streams of the invention include those that add or otherwise adjust a concentration of one or more desirable species or characteristics of the water stream. Post-treatment operations may be employed to render the one or more waste streams suitable for discharge to the environment.

Accordingly, a mixer may be disposed downstream of one or more separation apparatus of the invention that facilitates incorporation of another treated or untreated water stream, disinfectants, nutrients, and/or desirable salts from one or more sources of such. In accordance with some embodiments of the invention, one or more sources of a salt can be disposed to be introduced into the treated water stream. For example, a separation apparatus may be utilized in the treatment or irrigation system of the invention that selectively removes or reduces the concentration of divalent or other non-monovalent species from a water stream to be treated. Such an optional apparatus would typically provide at least one product stream having a relatively high concentration of non-monovalent species which can be introduced to the treated stream to adjust at least one characteristic thereof so as to provide a stream or body of water with a target or desirable condition. Examples of systems and techniques that advantageously provide beneficial species-rich streams include those disclosed in co-owned U.S. Pat. No. 7,820,024, titled "Electrically-Driven Separation Apparatus," the substance of which is incorporated herein by reference. In some cases, however, one or more otherwise unconnected or distinct sources of, for example, calcium and/or magnesium salts, may be utilized to adjust one or more characteristics of the treated water stream prior to its use. Additionally, one or more intrinsic and/or extrinsic properties of the water stream may be further adjusted. For example, the water stream may be cooled or heated to adjust the temperature thereof. The pH of the water stream or body may also be adjusted by, for example, adding one or more acids or bases, to achieve a desired pH value. The desired property or characteristic may be dependent on a plurality of factors including, for example, the pH of the soil to be irrigated, the salt tolerance the crops to be irrigated and, in some cases, the moisture content of the soil. Thus, some features of the invention provide further capabilities directed to achieving one or more desired composite characteristics.

The further adjustment of the one or more properties or characteristics may be performed after treatment in the separation apparatus, prior to use or introduction to the point of use, or during storage of the treated water in one or more reservoirs.

However, some aspects of the invention contemplate beneficial or economically attractive attributes of such secondary streams containing high concentrations of one or more dissolved species, relative to the first or treated product stream and/or the stream introduced into the separation apparatus. For example, the secondary product stream may contain high dissolved solids and can serve as a feed stream that may be further processed to obtain additional products or at least provide a product stream having a high concentration of a desirable species.

One or more characteristics of the water utilized in some systems and techniques of the invention can provide an indication of the suitability of the water for agricultural use. For example, the one or more characteristics of the water can be represented as the salinity, as total dissolved salts or solids content, and/or electrical conductivity, as well as or in conjunction with any of the alkalinity, iron content, and pH of the water. In some cases, the level of salinity of the water can become a selective parameter when considered relative to the type of crops to be irrigated by the at least partially treated water. Thus, in accordance with some aspects of the invention, the salinity of the water may be used as a factor to consider when making a determination whether to adjust at least one operating parameter of the systems of the invention. In other embodiments of the system and techniques of the invention, the characteristic value can be represented as a ratio of the concentration of species that tends to render soil as water-impermeable relative to the concentration of species that tends to render soil as aggregating or water-adsorbing.

In accordance with some aspects of the invention, the characteristic value can provide an indication of the suitability of the water for irrigation purposes, for human consumption, and/or for livestock or poultry use. In some embodiments, the characteristic value of a water stream or body can be represented as a ratio of the concentration of monovalent species relative to the concentration of divalent species in the water. For example, the characteristic value can be at least partially expressed as the sodium adsorption ratio (SAR) or exchangeable sodium percentage. Preferably, the SAR value of a stream or body of water can provide an indication as to whether the water may be suitable to irrigate a type or kind of crop. Thus, in accordance with some aspects of the invention, some embodiments thereof relate to systems and techniques that can involve controlling one or more operating parameters based at least partially on a desired characteristic value that is at least partially derived from at least one requirement of a point of use. Where the point of use is, for example, a crop to be irrigated, the desired characteristic value can be based on the salt tolerance of the crop and/or one or more attributes or characteristics of the soil.

The sodium adsorption ratio value is typically determined according to the following formula:

$$SAR = \frac{[Na]}{\sqrt{\frac{1}{2}([Ca]+[Mg])}}$$

where [Na] is the sodium species concentration, in milliequivalents/liter in the water, [Ca] is the calcium species concentration, in milliequivalents/liter in the water, and [Mg] is the magnesium species concentration, in milliequivalents/liter in the water. Other characteristic values of the water may be utilized, alone or in conjunction with the SAR value. Thus, in some cases, the characteristic value of the water that can serve as indication of water quality or suitability for its intended purpose involves the total dissolved solids concentration in the water, the pH, and/or the concentration of one or more toxic or hazardous species.

Adjusting the SAR value of the, for example, irrigation water, may be effected by adjusting one or more operating parameters of the water system. For example, the relative ratio of treated water from different treatment units having various associated SAR values may be adjusted to provide a composite or blended mixture of product water having the desired SAR value. Other techniques including reducing the flow rate of the water stream through the one or more separation apparatus or increasing the residence or treatment period can facilitate achieving the desired SAR value. In addition or in conjunction with such techniques, adjusting the applied potential or pressure level through, for example, the electrically-driven or pressure-driven separation apparatus can also facilitate providing treated water having the one or more desired characteristics.

Embodiments of systems of the invention may desalinate brackish water to provide irrigation water that avoids or reduces the extent of any soil permeability and/or infiltration problems.

The one or more characteristic values of the treated water may be a relative correlation between species contained in the water. For example, the characteristic value may be a ratio of dissolved sodium species to dissolved calcium. A preferred desirable sodium to calcium ratio of not more than about 3:1 may avoid or reduce the likelihood of water infiltration problems due to soil dispersion and plugging and soil surface pore sealing. Further, some embodiments of the invention can selectively reduce the concentration of monovalent sodium in irrigation water, so that a source of relatively calcium-rich water can be provided to counteract any sodium-dispersing phenomena in irrigation.

The product water can have an SAR value in a range from about 1 to about 8. The target or desirable SAR value may, however, depend on one or more factors in the agricultural facility. For example, the target SAR value depend on the type of crops grown in the facility, the stage of growth of one or more crops in the facility, and the soil conditions including the water infiltration rate, sodicity, and/or alkalinity of the soil. Particular guidelines that may be used to provide one or more target characteristics of irrigation water include those provided by The Food and Agriculture Organization of the United Nations (FAO) in the publication by Ayers, R. S. and Westcot, D. W., titled "Water Quality for Agriculture," FAO Irrigation and Drainage Paper 29 rev. 1, Food and Agriculture Organization of the United Nations, 1989, 1994. For example, the exchangeable sodium percentage (ESP=Exchangeable {(Na)/(Ca+Mg+K+Na)}×100), which can be correlated to the SAR value, can serve as a desirable characteristic value of water utilized for irrigation purposes, and a measure of the likelihood that a soil, particularly for ESP values greater than 15, will be rendered sodic with that likelihood increasing as the ESP increases. In particular, sensitive crops such as, but not limited to fruits, nuts, and citrus typically require irrigation water having an SAR value of up to about 8; other sensitive crops such as beans may tolerate irrigation water having an SAR value of up to about 18; moderately tolerant crops such as clover, oats, and rice may tolerate irrigation water having an SAR value of up to about 18 to 46; and tolerant crops such as, but not limited to wheat, barley, tomato, beets, and tall wheat grass, may tolerate irrigation water having an SAR value of up to about 46 to 102. Embodiments of systems disclosed herein may include treatment units or combinations of same configured to produce irrigation water having SAR values in any of the ranges disclosed above as desired for a particular use. SAR and ESP values even lower than the ones mentioned may further be beneficial, since although a given species may tolerate the SAR values above, crop yields may be deleteriously affected nonetheless. Further, elevated SAR values may affect soil aggregation and cause irrigation water to either run off the soil surface and not penetrate to the root systems of the crops, or, run through the soil levels rapidly and cause the irrigation water to run below the root systems prior to being absorbed by the crops.

Figure 6:
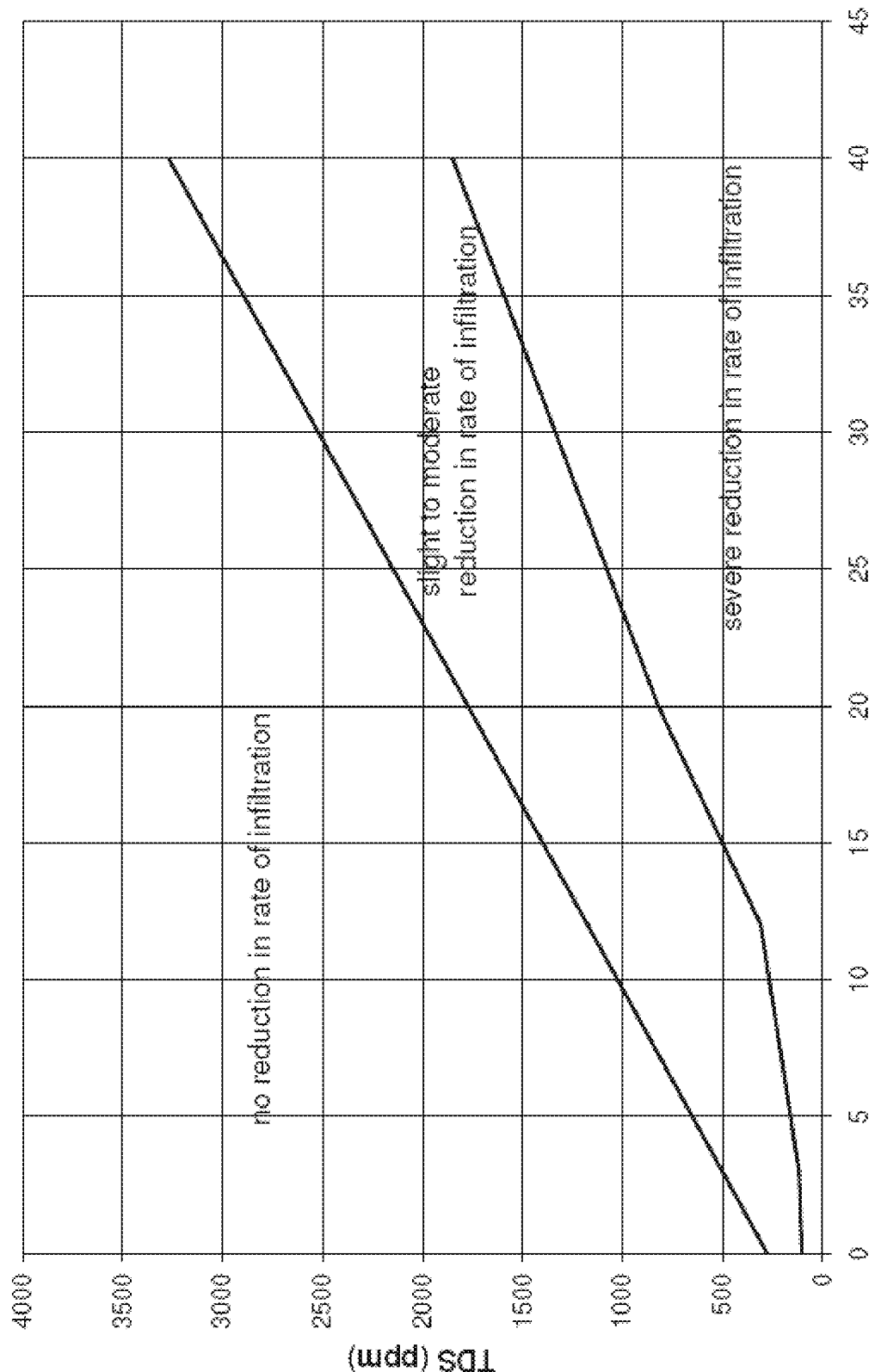
FIG. 6 is a graph showing representative ranges of acceptable levels of water characteristics in accordance with some aspects of the invention.

Infiltration issues typically arise when irrigation water does not enter the soil and becomes unavailable to crops. In contrast to salinity issues, which reduce the availability of water, infiltration problems can effectively reduce the quantity of water available for crop use. Water infiltration can increase with increasing salinity and can decrease with decreasing salinity or increasing sodium content relative to calcium and magnesium. Further, low salinity water having, for example, a conductivity (which can be measured either in the water or from a paste extract of the soil) of less than about 0.5 dS/m ("EC"), is typically corrosive and tends to leach surface soil of soluble minerals and salts, such as calcium, which in turn can reduce soil aggregation and structure. Soil without or having low salt content tends to be dispersive as fine soil particles which fill pore spaces, effectively sealing the soil surface and reducing the rate of water infiltration. The soil would tend to form a crust which reduces the amount of water entering the subsurface and can also prevent crop emergence. Thus, in some embodiments of the invention, the desired water quality may be further based on the salinity of the irrigation water. For example, FIG. 6, which is based on the publication by Ayers, R. S. and Westcot, D. W., titled "Water Quality for Agriculture," FAO Irrigation and Drainage Paper 29 rev. 1, Food and Agriculture Organization of the United Nations, 1989, 1994, and which shows the influence of salinity, as represented by TDS concentration, and SAR on infiltration, can conjunctively provide desirable salinity levels and SAR values of irrigation water that reduces or avoids infiltration problems. In FIG. 6, seawater properties were used to derive TDS concentration values from electrical conductivity data from the above reference. In particular, the correlations between the density and salinity and between the salinity and electrical conductivity of seawater at 20° C. were determined based on published physical properties. These correlations were then used to convert the electrical conductivity values of seawater from the above-identified reference into the corresponding TDS concentration, which were then mapped relative to the corresponding SAR values to obtain the infiltration guidelines presented in FIG. 6.

Further embodiments of the invention may also provide suitable irrigation water when it has a composite characteristic value such as having an SAR value of less than about 15 while having a TDS level of about 1,500 ppm or more.

Some embodiments of the invention can provide desalination systems and techniques that selectively remove undesirable species which contrasts to non-selective desalination techniques such as those based on thermal and pressure-driven processes. Further, some systems and techniques of the invention can provide a product water stream without requiring the further addition of preferred species. For example, embodiments of the invention can provide irrigation water that does not involve further adjusting characteristic values by the addition of supplemental species.

Figure 3:
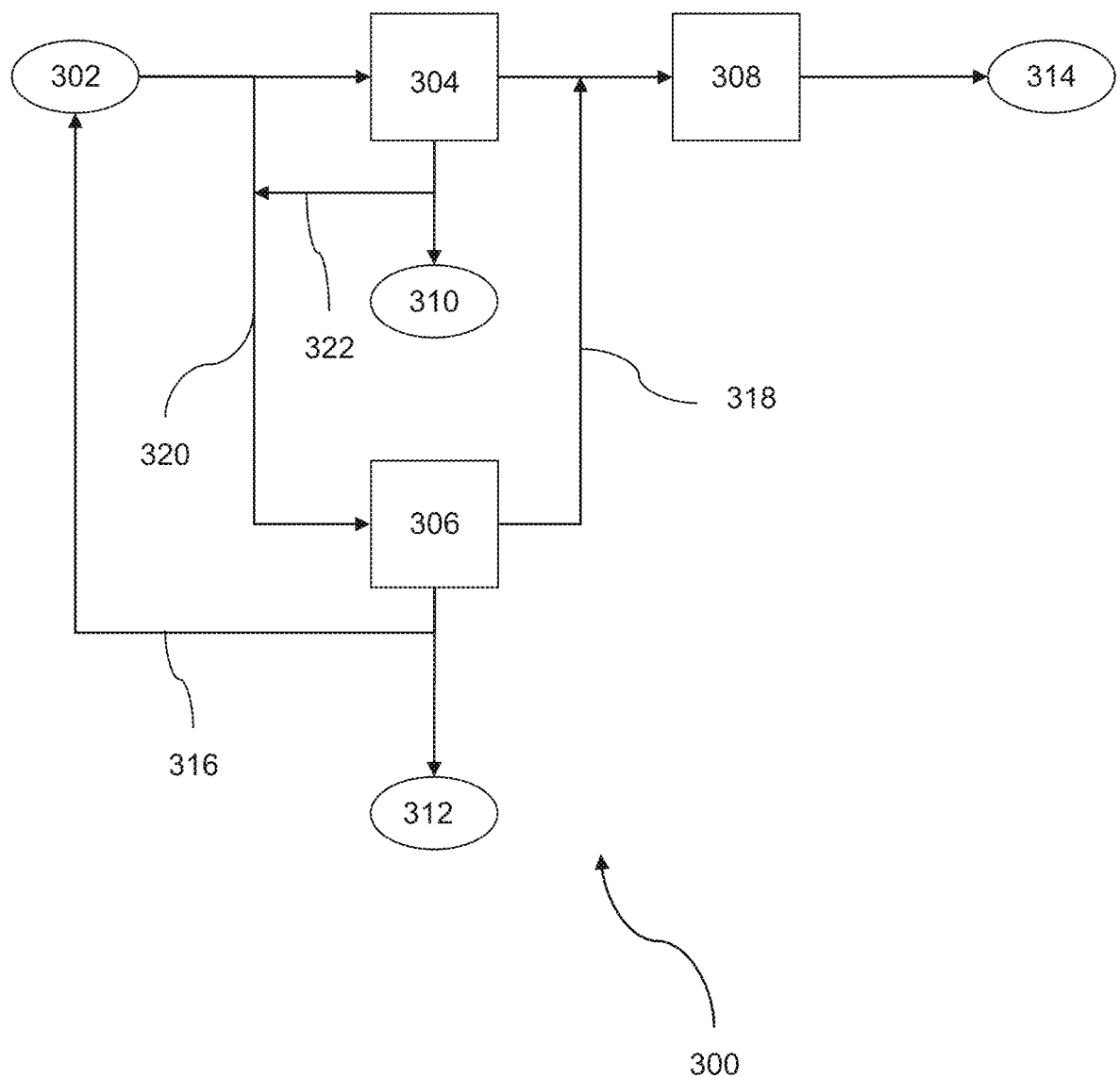
FIG. 3 is a schematic illustration of another system in accordance with further features of the invention.

Further features and aspects of the invention are illustrated in FIG. 3. The treatment system 300 exemplarily illustrated can comprise a first separation apparatus 304 and a second separation apparatus 306. Separation apparatus 304 and 306 typically treat a fluid from one or more sources 302. The water to be treated from source 302 typically contains a high or unacceptable level of dissolved species. The one or more separation apparatus can thus be utilized to at least partially remove or reduce the concentration of one or more undesirable species from the water. The water to be treated from source 302 may be supplied in parallel to both the first separation apparatus 304, and the second separation apparatus 306 through, for example, distribution system or conduit 320. As exemplarily illustrated, treated water from separation apparatus 304 can be combined with treated water from separation apparatus 306 delivered through, for example, distribution system or conduit 318, in one or more mixing operations or mixer 308 to provide a treated water stream having desired properties and/or characteristics to point of use 314. In accordance with some embodiments of the invention, the treated water may be rendered suitable to be used as potable and/or bathing water in one or more points of use 314.

First separation apparatus 304 may be an electrically-driven separation apparatus or a pressure-driven separation apparatus. Likewise, second separation apparatus 306 may be a pressure-driven separation apparatus. In accordance with some aspects of the invention, separation apparatus 304 removes at least a portion of a plurality of undesirable species in water to be treated from source 302.

The second separation apparatus can remove one or more undesirable species from the water stream to be treated. In some cases, the separation apparatus selectively removes at least a portion of one or more undesirable species from the water to produce a product water stream. If the product water stream from the second separation apparatus fails to meet or exceed potable water quality requirements, a portion of the treated water from the first separation apparatus that exceeds the potable water quality requirements may be incorporated or blended therewith. For example, where the first separation apparatus provides product water having a TDS level of about 250 mg/L and the second separation apparatus provides product water having a TDS level of about 1,000 mg/L, the product water streams can be combined in a volumetric ratio of about 2:1 to produce a blended product having a TDS level of about 500 mg/L. The target level may be a concentration that meets or exceeds one or more guidelines suggested by the World Health Organization for potable water in, for example, the WHO Guidelines for drinking-water quality, fourth edition, World Health Organization 2011. Other water streams may also be blended with one or more products streams of the separation apparatus of the invention to provide drinking and/or bathing water that meet or exceed guidelines or requirements typically set by government regulatory organizations.

One or more reject streams from the first separation apparatus, typically containing relative high levels of species removed from the first treated product stream may be discharged to drain, directed to one or more ancillary points of use 310, or returned to source 302. Further embodiments of the invention contemplate combining the reject water stream with water from source 302 through conduit 322 so as to be treated in the second separation apparatus. A secondary or reject water stream from second separation apparatus may also be discharged to a drain, directed to one or more ancillary points of use 310 and/or 312, returned to source 302 as shown through conduit 316.

Figure 4:
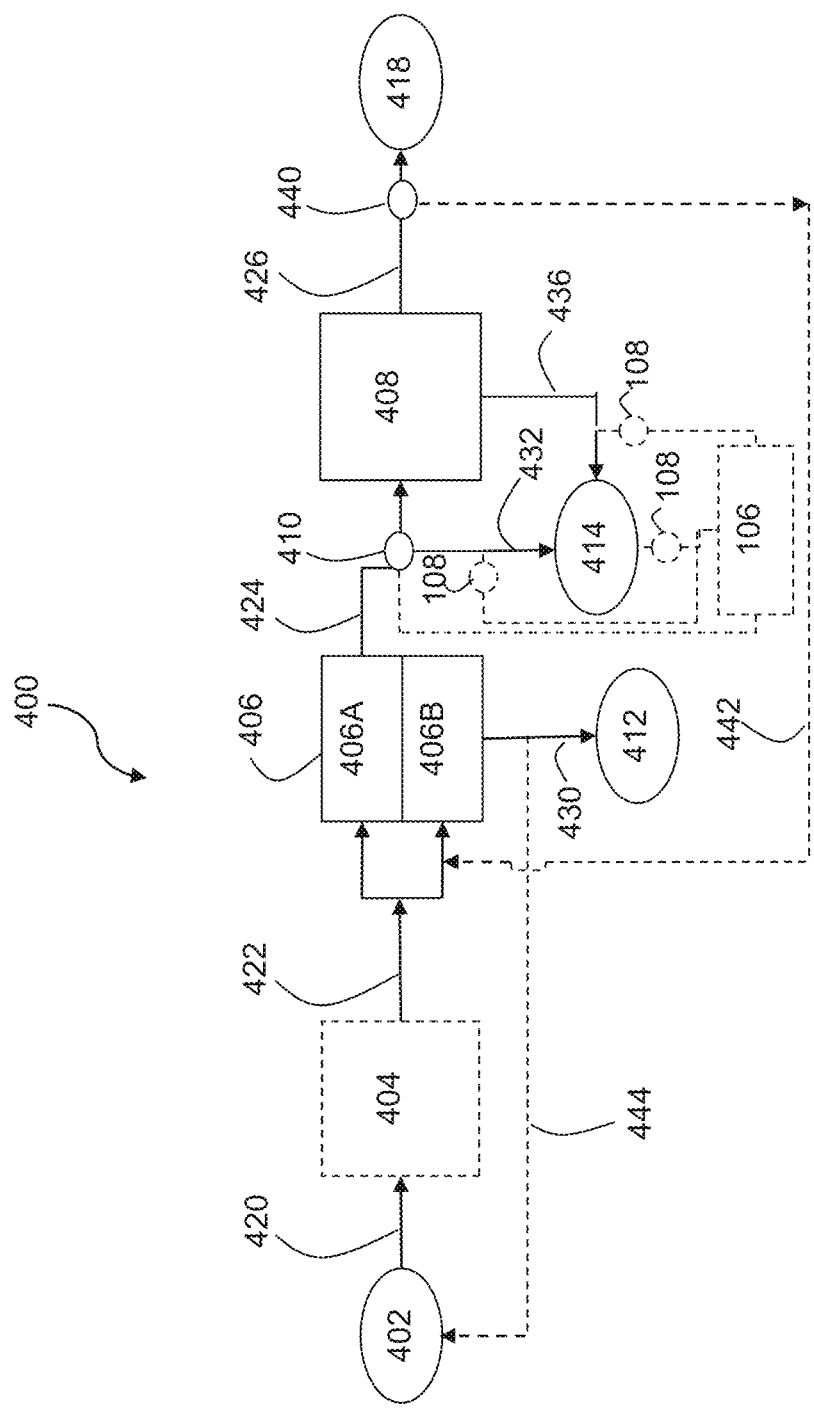
FIG. 4 is a schematic illustration of another system in accordance with further features of the invention.

In another embodiment, indicated generally at 400 in FIG. 4, a treatment system may include a source of water to be treated 402 which may include, for example, brackish water in fluid communication through a distribution system or conduit 420 to an optional pre-filtration system 404. The water to be treated may be brackish water having a TDS of between about 1,500 mg/L (1,500 ppm) and about 10,000 mg/L (10,000 ppm), and/or saline water containing high concentrations of dissolved solids or salts, for example, a concentration of dissolved salts of between about 500 mg/L and about 5,000 or about 10,000 mg/L and one or more other contaminants, for example, about 40 ppm of nitrate, and undesirable levels of any one or more of boron, silica, bicarbonate, or divalent selenate or selenite. The pre-filtration system 404 may be in fluid communication through a distribution system or conduit 422 to a first separation apparatus 406. Non-limiting examples of pre-treatment unit operations that may be utilized in pre-filtration system 404 which may reduce the concentration of at least one suspended solid entrained in the water to be treated include softening systems, microfilters, settlers, screen filters, microsand filters, and coarse particle filters. In some embodiments, the pre-treatment subsystem may include a VACLEEN® stainless steel self-cleaning filtration system available from Evoqua Water Technologies LLC or its affiliates. In other embodiments, the pre-treatment subsystem may alternatively or additionally include a Vortisand® cross flow microsand submicron filtration system available from Evoqua Water Technologies LLC or its affiliates.

The first separation apparatus 406 may be an electrically-driven separation apparatus, for example, an electrodialysis apparatus. Distribution system or conduit 422 may split to provide water to be treated to diluting compartments 406A and concentrating compartments 406B of the first separation apparatus 406. The first separation apparatus 406 may include one or more monovalent ion selective membranes to selectively promote transfer of one or more monovalent cationic and/or anionic species. In some embodiments, the first separation apparatus 406 may comprise one or more monovalent cation selective membranes and one or more monovalent anion selective membranes.

Because the nature of electrodialysis is that power costs are inversely related to the level of salinity in water to be treated, high concentrations of ionic contaminants in the water to be treated may reduce power losses in the electrodialysis equipment and also recover more of the incoming water as usable product (albeit at some expense of thermodynamic efficiency.) To promote tangential flow in the concentrating compartments 406B, while increasing the concentration of salts in compartments 406B, the system 406 may optionally include a pump and valve (fixed or controllable based on a set point) comprising a recirculation system (not shown) that recirculates all or a portion of side stream 444 back to the inlet feed stream to 406B and combines with the feed entering from 422. As a result the concentrate compartments may be operated at a controllable very low water usage from line 422 while maintaining optimum hydrodynamic conditions within compartments 406B. The lower water feed from line 422 can thus result, in a controllable way, in a very large fraction (water recovery) of the feed water being sent through the diluting compartments as product water for irrigation or potable use, and less to effluent stream 430. As described in further embodiments, the inlet feed to compartments 406B may also be sourced all or part not from line 422, but instead from line 442. As a result, since the outlet from line 442 has very low contaminant levels as compared to the inlet 422, the potential for operation at high water recoveries is even further increased.

The first separation apparatus 406 may remove a large fraction of contaminants from the water to be treated to produce a first diluate stream. The contaminants removed may include one or more ionic species. The first separation apparatus 406 may remove, for example, about 80% of sodium chloride and potassium chloride and about 8% of the nitrate from the water to be treated supplied through distribution system or conduit 422. The first separation apparatus 406 may produce a diluate which may be high in divalent ions as compared to monovalent ions and may be acceptable for agricultural use without further treatment. To be suitable for agricultural use, the diluate from the first separation apparatus 406 may have a SAR value of, for example, less than about 20, less than about 18, less than about 9, less than about 8, less than about 3, or less than about 2, and may have a TDS value of less than about 3,500 ppm or less than 750 ppm.

A first portion of the diluate from the first separation apparatus 406 may be directed through a distribution system or conduit 424 and a distribution system or conduit 432 to a point of use 414 for agricultural use, for example, an irrigation water system or a holding system for irrigation water. A second portion of the diluate from the first separation apparatus 406 may be directed through the distribution system or conduit 424 to a second separation apparatus 408. The relative amounts of the diluate from the first separation apparatus 406 directed to point of use 414 and to the second separation apparatus 408 may be selected in any amount in a range of from about 0% to about 100%, from about 10% to about 90%, from about 25% to about 75%, or from about 40% to about 60% as desired. A diverting valve or other form of diverting system 410 may be utilized to vary the amount of diluate from the first separation apparatus 406 directed to point of use 414 and to the second separation apparatus 408 as desired. The diverting valve or system 410 may be operated by a controller 106. The controller 106 may receive an indication of one or more parameters of water from one or more of distribution systems or conduits 432 or 436 or from the point of use 414 from one or more sensors 108. The one or more parameters of water may include, for example, salinity, conductivity, pH, SAR value, TDS value, or any other parameter or parameters of interest. The controller 106 may adjust the diverting valve or system 410 and thus the ratio of diluate from the first separation apparatus 406 directed to point of use 414 and to the second separation apparatus 408 based on the indication of the one or more parameters of water from the sensor(s) 108. Controller 106 may also adjust one or more operating parameters of the first separation apparatus 406 based on the indication of the one or more parameters of water from the sensor(s) 108. The one or more operating parameters of the first separation apparatus 406 may include, for example, current, flow rate, water recovery, or any other operating parameter or parameters.

Concentrate from the first separation apparatus 406 may be carried through a distribution system or conduit 430 as a waste stream which may be discharged to drain, directed to one or more ancillary points of use 412, for example, for use in the electrochemical production of chlorine, alkali (such as sodium hydroxide), chlorine gas, hypochlorite ion, hydrochloric acid, or sulfuric acid, or returned to the source 402, through, for example, distribution system or conduit 444. The first separation apparatus 406 may operate at very high water recoveries, for example, between about 20% and about 60% or 90% or more because monovalent ions may be present in the concentrate delivered through distribution system or conduit 430 at high concentrations without precipitation.

The partially desalinated water output as the first diluate stream from the first separation apparatus 406 may remain unacceptably high in monovalent salts and/or high in divalent salts, for example, calcium sulfates and/or magnesium sulfates for some uses. At least a portion of the first diluate stream may thus be further treated in a second separation apparatus 408. The second separation apparatus 408 may be a pressure-driven separation apparatus, for example, a membrane filtration system. The second separation apparatus 408 may include nanofiltration membranes or reverse osmosis membranes. The second separation apparatus 408 may be a low-pressure nanofiltration system, for example, a nanofiltration system operated with a transmembrane pressure of between about 1 and about 15 bar, between about 2 and about 4 bar, or less than about 3 bar. The second separation apparatus 408 may treat water provided through the distribution system or conduit 424 to produce a permeate and a retentate. The second separation apparatus 408 may remove a large fraction, for example, between about 10% and about 95% of remaining monovalent ions from the influent diluate from the first separation apparatus 406 and substantially all the divalent ionic constituents, and produce a permeate stream with a very low concentration, for example, less than about 250 mg/L or less than 150 ppm or less than 50 ppm of monovalent ionic contaminants. The second separation apparatus 408 may also remove additional undesirable components from the portion of the diluate from the first treatment apparatus 408, for example, an additional 10% to 95% of nitrates from the portion of the diluate from the first separation apparatus 406. Retentate from the second separation apparatus 408 may be directed through distribution system or conduit 436 to point of use 414 where it may be used alone or combined with the first portion of the diluate from the first separation apparatus 406 for agricultural use. Point of use 414 may include a mixer (not shown) configured to blend diluate produced in the electrodialysis apparatus 406 with any retentate produced in the nanofiltration apparatus 408 and produce irrigation water when mixed having a SAR value intermediate of a SAR value of the diluate and a SAR value of the retentate.

Permeate from the second separation apparatus 408 may be low in divalent ionic contaminants and/or particulates and/or microbial contaminants. Permeate from the second separation apparatus 408 may be suitable for potable use, and may have characteristics defined in recognizable standards, for example, those provided by the WHO. The filtrate from the second separation apparatus 408 may include, for example, a TDS level of less than about 500 ppm or less than about 250 ppm, low amounts of divalent ions, low amount of metals and trace elements, low levels of nitrates, for example, less than about 10 ppm of nitrates, low levels of particulates and/or colloidal or microbiological impurities, and/or a low organic content. The characteristics of the filtrate from the second separation apparatus 408 may meet regulatory requirements for potable water in a jurisdiction in which the system 400 is operated. Filtrate from the second separation apparatus 408 may be directed through a distribution system or conduit 426 to a point of use 418 for use as potable water.

In some embodiments a portion of the permeate from the second separation apparatus 408 may be directed through a distribution system or conduit 442 to be used as concentrate makeup for the first separation apparatus 406. The amount or fraction of permeate from the second separation apparatus 408 utilized as concentrate makeup for the first separation apparatus 406 may be selected as desired. The amount or fraction of permeate from the second separation apparatus 408 used as concentrate makeup for the first separation apparatus 406 may be selected based on, for example, the quality of the filtrate from the second separation apparatus 408 and the need for the concentrate makeup. A valve or other diverting system 440 may provide for the amount of filtrate from the second separation apparatus 408 utilized as concentrate makeup for the first separation apparatus 406 to be adjusted as desired. Valve or diverting system 440 may be operated by the controller 106 responsive to information from any of sensors 108 or other sensors located in various portions of the system. The amount of the permeate from the second separation apparatus 408 used as concentrate makeup for the first separation apparatus 406 may be selected based on, for example, the quality of the permeate from the second separation apparatus 408 and/or the need for the concentrate makeup.

The first separation apparatus 406 may include one or more monovalent ion selective membranes to selectively promote transfer of one or more monovalent cationic or anionic species. The first separation apparatus 406 may include, for example, an electrodialysis system. In other embodiments, the water treated in the first separation apparatus 406 may be sufficiently low in monovalent ions that monovalent ion selective membranes would not be required in the first separation apparatus 406. The first separation apparatus 406 may thus utilize standard ion exchange membranes known in the art. These standard ion exchange membranes may be not monovalent ion selective.

The system illustrated in FIG. 4 has advantages over many alternate approaches to producing irrigation water and/or potable water from brackish water. As compared to conventional electrodialysis systems including conventional or monovalent selective membranes, the system illustrated in FIG. 4 may operate with a higher recovery, may require less salt removal in the electrically-driven separation apparatus than conventional electrodialysis systems, and may exhibit less loss of calcium than conventional electrodialysis systems. The electrically-driven separation apparatus of the system illustrated in FIG. 4 may thus be smaller and may consume less power than conventional electrodialysis systems for producing irrigation water and/or potable water from brackish water. The system illustrated in FIG. 4 provides for a controllable ratio of irrigation water vs. potable water produced from influent water to be treated. The system produces waste that is low in species such as calcium, magnesium, boron, selenium, and silica. The majority of calcium, magnesium, and a fraction of nitrate in water to be treated introduced into the system is included in the irrigation water produced by the system. The system may utilize a nanofiltration filter as the pressure-driven separation apparatus rather than a more expensive and high operating cost reverse osmosis system to produce potable water suitable for use as drinking water. The system illustrated in FIG. 4 can produce irrigation water with a lower SAR value than conventional electrodialysis systems alone.

Figure 5:
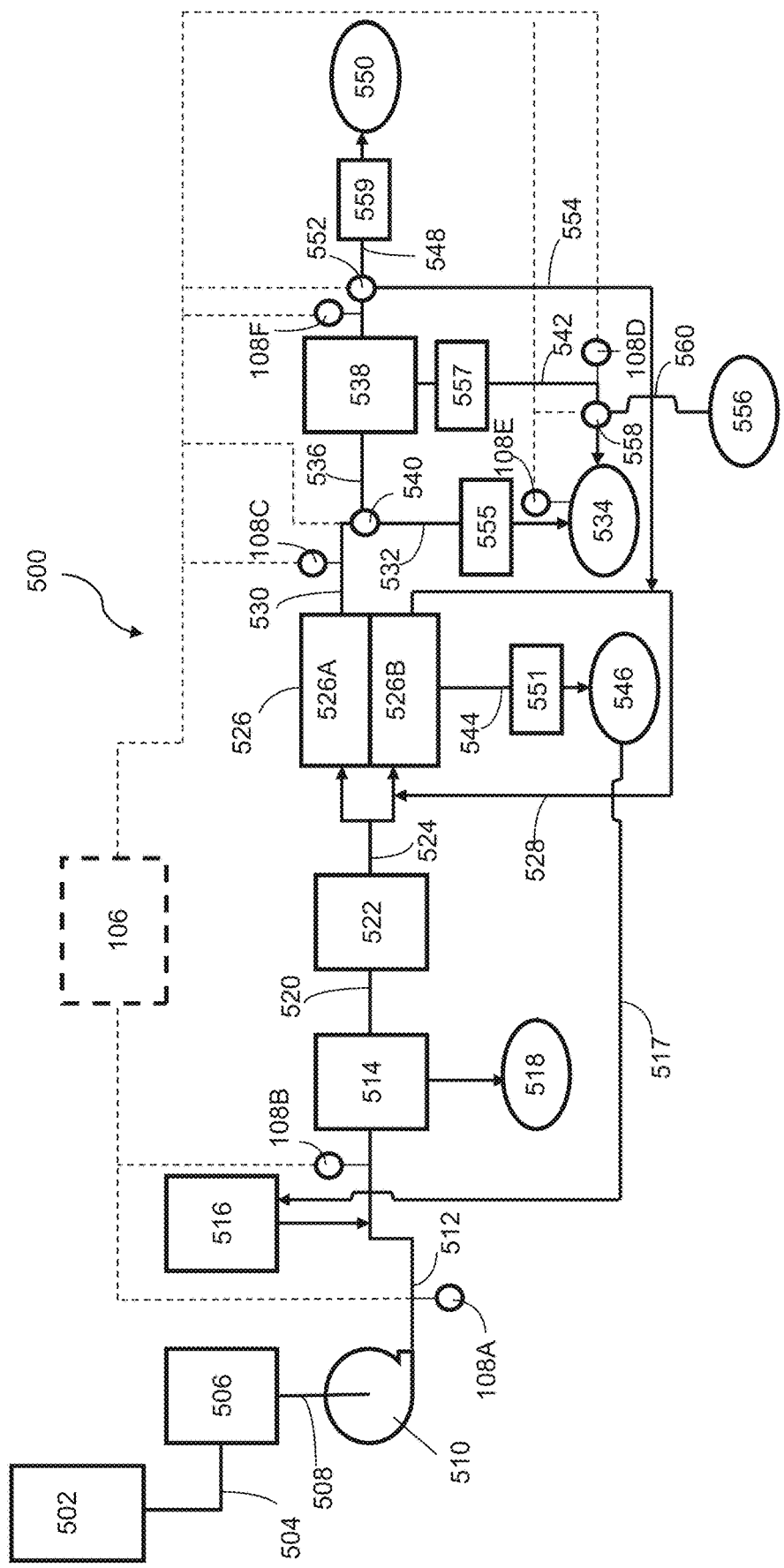
FIG. 5 is a schematic illustration of another system in accordance with further features of the invention.

In another embodiment, indicated generally at 500 in FIG. 5, a treatment system may include a source of water to be treated 502. The source of water to be treated 502 may be, for example, a groundwater well. The water to be treated in the source of water to be treated 502 may be brackish water or saline water having a concentration of dissolved salts of between about 500 mg/L and about 5,000 mg/L or about 10,000 mg/L as well undesired species such as nitrates (in concentrations of up to about 40 ppm), bicarbonates (in concentrations up to about 400 ppm), sulfates (in concentrations up to about 2,000 ppm), iron, boron, manganese, selenium, calcium, magnesium, arsenic, silica, and/or sulfur or fluoride compounds. The source of water to be treated 502 may be fluidly connected to a break tank 506 via a conduit 504.

A booster pump 510 may be positioned and arranged to direct water to be treated from the break tank 506 through conduits 508 and 512 to an air stripper 514. Air stripper 514 may include a column and inert media, for example, gravel, greensand, or beads or pieces of porous silica through which the water to be treated downwardly flows while air flows upward in a countercurrent direction. Alternatively, the greensand may be included in a separate unit process for removal of iron and manganese, independent of the air stripper 514. The air stripper 514 may remove bicarbonate, manganese, arsenic, iron, and/or sulfide from the water to be treated. To facilitate removal of the bicarbonate, an acid, for example, hydrochloric acid or sulfuric acid from a source of pH adjustment agent 516 may injected into conduit 512 (or optionally into break tank 506 or conduit 508) to reduce the pH of the water to be treated entering the air stripper 514 to an acidic pH as low as about 4.2 to facilitate conversion of bicarbonate to carbon dioxide gas that would be removed from the water to be treated in the air stripper 514. The amount of pH adjustment agent added to the water to be treated may be controlled based on pH and/or flow reading from one or more sensors 108A, 108B upstream or downstream of the pH adjustment agent injection point. The iron, manganese, arsenic, and/or sulfide may be adsorbed onto the media within the air stripper 514 or may form oxidized solid precipitates that may be removed by filtration. A trickling stream of water passing through the air stripper 514 may flush removed contaminants into a drain or sump 518. In implementations where it is desirable to concentrate chlorides in the electrodialysis concentrate, it may be preferable to utilize hydrochloric acid to downwardly adjust the pH. In other implementations, particularly with waters having high monovalent anion levels relative to monovalent cation levels, it may be preferable to utilize sulfuric acid to downwardly adjust the pH.

After passing through the air stripper 514, the water to be treated passes through conduit 520 to a pre-filter 522, which may include a screen filter with apertures with sizes of, for example, about 10 µm. Pre-filter 522 may also or alternatively include any one or more of a, microfilter, settler, sand filter, or screen filter, microsand filter, or coarse particle filter.

The pre-filtered water to be treated may be then directed through conduit 524 and may be split to be introduced into diluting compartments 526A and concentrating compartments 526B of electrodialysis apparatus 526. The pre-filtered water to be treated introduced into the concentrating compartments 526B of electrodialysis apparatus 526 may be supplement by recycled concentrate makeup water from concentrate loop 528. Alternately, the influent water may be exclusively directed into the diluting compartments, and make up water to the electrode and/or concentrate compartments may be sourced from the nanofilter permeate through line 554.

The electrodialysis apparatus 526 may remove a large fraction of contaminants from the water to be treated to produce a first diluate stream. The contaminants removed may include one or more ionic species. The electrodialysis apparatus 526 may remove, for example, about 80% of sodium chloride and potassium chloride and about 80% of the nitrate from the water to be treated supplied through distribution system or conduit 524. The electrodialysis apparatus 526 may produce a diluate which may be high in divalent ions as compared to monovalent ions and may be acceptable for agricultural use without further treatment. To be suitable for agricultural use, the diluate from the electrodialysis apparatus 526 may have a SAR value of, for example, less than about 20, less than about 18, less than about 9, less than about 8, less than about 3, or less than about 2, and may have a TDS value of less than about 3,500 ppm and/or greater than about 1,500 ppm. A ratio of divalent selenate or selenite ion concentration to chloride concentration in diluate from the electrodialysis apparatus 526 may be less than that of the water to be treated (if using non selective anion membranes) and a ratio of calcium ion concentration to sodium ion concentration in the diluate from the electrodialysis apparatus 526 may be greater than that of the water to be treated (if using monovalent selective cation membranes).

A first portion of the diluate from the electrodialysis apparatus 526 may be directed through a distribution system or conduit 530 and a distribution system or conduit 532 to a point of use 534 for agricultural use, for example, an irrigation water system or a holding system for irrigation water. The first portion of the diluate from the electrodialysis apparatus 526 directed to the point of use 534 for agricultural use may have a lower concentration ratio of monovalent ions such as sodium and chlorine and a higher concentration of divalent ions such as calcium and magnesium than the original water to be treated. The first portion of the diluate from the electrodialysis apparatus 526 directed to the point of use 534 for agricultural use may have a substantially similar concentration of boron, selenium (or divalent selenate or selenite), and silica as the original water to be treated. In some embodiments the portion of the diluate from the electrodialysis apparatus 526 directed to the point of use 534 for agricultural use may be further treated to reduce levels of boron, for example, using an ion exchange system 555. Unlike RO, since silica levels are not increased in the concentrate, silica does not limit water recovery through the system.

A second portion of the diluate from the electrodialysis apparatus 526 may be directed through the distribution system or conduit 536 to a nanofiltration apparatus 538, optionally after further treatment to further reduce boron concentration. The relative amounts of the diluate from the electrodialysis apparatus 526 directed to point of use 534 and to the nanofiltration apparatus 538 may be selected in any amount in a range of from about 0% to about 100%, from about 10% to about 90%, from about 25% to about 75%, or from about 40% to about 60% as desired. A diverting valve or other form of diverting system 540 may be utilized to vary the amount of diluate from the electrodialysis apparatus 526 directed to point of use 534 and to the nanofiltration apparatus 538 as desired. The diverting valve or system 540 may be operated by a controller 106. The controller 106 may receive an indication of one or more parameters of water from one or more of distribution systems or conduits 532 or 542 or from the point of use 534 from one or more sensors 108C, 108D, 108E. The one or more parameters of water may include, for example, salinity, conductivity, pH, SAR value, TDS value, or any other parameter or parameters of interest. The controller 106 may adjust the diverting valve or system 540 and thus the ratio of diluate from the electrodialysis apparatus 526 directed to point of use 534 and to the nanofiltration apparatus 538 based on the indication of the one or more parameters of water from the sensor(s) 108C, 108D, 108E. Controller 106 may also adjust one or more operating parameters of the electrodialysis apparatus 526 based on the indication of the one or more parameters of water from the sensor(s) 108C, 108D, 108E. The one or more operating parameters of the electrodialysis apparatus 526 may include, for example, current, flow rate, or any other operating parameter or parameters.

Concentrate from the electrodialysis apparatus 526 may be carried through a distribution system or conduit 544 as a waste stream which may be discharged to drain, directed to one or more ancillary points of use 546, for example, for use in the electrochemical production of chlorine, alkali, chlorine gas, hypochlorite ions, hydrochloric acid, or sulfuric acid. Acid produced in the ancillary points of use 546, which may be or include an electrochemical generation system, may be used to supply source of pH adjustment agent 516 through, for example, conduit 517. In other embodiments the concentrate from the electrodialysis apparatus 526 may meet water quality standards for use in produced oil recovery operations and ancillary point of use 546 may include an oil drilling operation. The concentrate from the electrodialysis apparatus 526 may be softened to reduce a concentration of divalent cations prior to use in produced oil recovery operations in the ancillary point of use 546, for example, by treatment in ion exchange system 551. System 551 may alternatively or additionally include a pH adjustment system to adjust a pH of the concentrate from the electrodialysis apparatus 526 to a pH suitable for use in produced oil recovery operations. The amount of concentrate directed to the one or more ancillary points of use 546 may be between about 5% and about 10% of the amount of concentrate produced in the electrodialysis apparatus 526. The concentrate directed to the one or more ancillary points of use 546 may have an elevated concentration of sodium chloride as compared to the original water to be treated and a substantially similar concentration of boron, selenium (or divalent selenate or selenite) and silica as the original water to be treated. A ratio of divalent selenate or selenite ion concentration to chloride ion concentration in the concentrate from the electrodialysis apparatus 526 may be less than that of the water to be treated.

The electrodialysis apparatus 526 may operate at very high water recoveries, for example, between about 20% and about 60% or 90% or more because monovalent ions may be present in the concentrate delivered through distribution system or conduit 544 at high concentrations without precipitation.

The partially desalinated water output as the first diluate stream from the electrodialysis apparatus 526 may remain unacceptably high in monovalent salts and/or high in divalent salts, for example, calcium sulfates and/or magnesium sulfates for some uses. At least a portion of the first diluate stream may thus be further treated in nanofiltration apparatus 538. The nanofiltration apparatus 538 may be a low-pressure nanofiltration system, for example, a nanofiltration system operated with a transmembrane pressure of between about 1 and about 10 bar, between about 2 and about 4 bar, less than about 4 bar, or less than about 3 bar. The nanofiltration apparatus 538 may treat water provided through the distribution system or conduit 536 to produce a permeate and a retentate. A ratio of retentate outlet flow to permeate flow through the nanofiltration apparatus 538 may be controlled so as to limit a scaling potential of dissolved constituents of the nanofiltration retentate. The nanofiltration apparatus 538 may remove a large fraction, for example, between about 50% and about 95% or up to about 97% of remaining monovalent ions from the influent diluate from the electrodialysis apparatus 526 and produce a permeate stream with a very low concentration, for example, less than about 500 mg/L (500 ppm) or less than about 200 ppm of monovalent ionic contaminants. In other implementations, the nanofiltration apparatus 538 may remove substantially all divalent ions and about 10%-25% of monovalent ions to produce a permeate stream with substantially no divalent ions and only slightly reduced monovalents. The nanofiltration apparatus 538 may produce retentate having a higher concentration divalent cations such as calcium and magnesium than the concentration of the divalent cations in the diluate from the electrodialysis apparatus 526 and a lower concentration of monovalent cations such as sodium than the concentration of the monovalent cations in the diluate. The nanofiltration apparatus 538 may also remove additional undesirable components from the portion of the diluate from the electrodialysis apparatus 526, for example, an additional 10% to 90% of nitrates from the portion of the diluate from the electrodialysis apparatus 526. Retentate from the nanofiltration apparatus 538 may be directed through distribution system or conduit 542 to point of use 534 where it may be combined with the first portion of the diluate from the electrodialysis apparatus 526 for agricultural use. In some embodiments the retentate from the nanofiltration apparatus 538 and/or the diluate from the electrodialysis apparatus directed to the point of use 534 for agricultural use may be further treated to reduce levels of boron, for example, using an ion exchange system 557 and/or 555. In other cases, the electrodialysis feed or the nanofilter feed may be operated at elevated pH by addition of sodium hydroxide, such that dissolved boron is ionized to borate and then removed either during the electrodialysis step through the anion membrane or during the nanofiltration step. It is to be noted that side advantages of the bicarbonate removal step through acidification and stripping results in a feed water to the electrodialysis and nanofilter apparatus that has low scaling potential at elevated pH and is unbuffered, and thus will require a relatively cost effectively low amount of caustic soda to increase the pH of the water to levels sufficient to remove boron.

The retentate from the nanofiltration apparatus 538 may have a SAR value lower than the SAR value of diluate from the electrodialysis apparatus 526 and lower than the SAR value of the permeate from the nanofiltration apparatus 538. Point of use 534 may include a mixer (not shown) configured to blend diluate produced in the electrodialysis apparatus 526 with any retentate produced in the nanofiltration apparatus 538 and produce irrigation water having a SAR value intermediate of a SAR value of the diluate and a SAR value of the retentate.

In some embodiments a portion of the retentate from the nanofiltration apparatus 538 may be directed to an electrochemical generation system 556 for production of sulfuric acid via diverting valve or system 558 and conduit 560 under control of controller 106. The electrochemical generation system 556 may include a water softening apparatus upstream of the inlet to electrochemical generation apparatus included therein for treating the retentate prior to electrochemical generation of the sulfuric acid. Sulfuric acid produced in the electrochemical generation system 556 may be used to supply source of pH adjustment agent 516.

Permeate from the nanofiltration apparatus 538 may be low in divalent ionic contaminants and/or particulates and/or microbial contaminants. Permeate from the nanofiltration apparatus 538 may be suitable for potable use, and may have characteristics defined in recognizable standards, for example, those provided by the WHO. The permeate from the nanofiltration apparatus 538 may include, for example, a TDS level of less than about 500 ppm, low amounts of divalent ions, low amount of metals and trace elements, low levels of nitrates, for example, less than about 10 ppm of nitrates, low levels of particulates and/or colloidal or microbiological impurities, and/or a low organic content. The characteristics of the permeate from the nanofiltration apparatus 538 may meet regulatory requirements for potable water in a jurisdiction in which the system 500 is operated. Permeate from the nanofiltration apparatus 538 may be directed through a distribution system or conduit 548 to a point of use 550 for use as potable water. In some embodiments, the permeate from the nanofiltration apparatus 538 may be further treated, for example in post-treatment unit 559, to achieve at least one of upward pH adjustment, lowered pH adjustment, addition of chlorine gas or addition of hypochlorite ion.

In some embodiments a portion of the permeate from the nanofiltration apparatus 538 may be directed through a distribution system or conduit 554 to be used as concentrate makeup and/or an electrode stream for the electrodialysis apparatus 526. The portion of the permeate from the nanofiltration apparatus 538 used as concentrate makeup for the electrodialysis apparatus 526 may be directed through conduit 554 into the concentrate recirculation loop 528 of the electrodialysis apparatus 526. The amount or fraction of the permeate from the nanofiltration apparatus 538 utilized as concentrate makeup for the electrodialysis apparatus 526 may be selected as desired. The amount or fraction of permeate from the nanofiltration apparatus 538 used as concentrate makeup for the electrodialysis apparatus 526 may be selected based on, for example, the quality of the permeate from the nanofiltration apparatus 538 and the need for the concentrate makeup. The quality of the permeate from the nanofiltration apparatus 538 may be measured by sensor 108F, which may, in various embodiments, measure any one or more of pH, salinity, flow rate, ionic species, SAR value, or any other desired parameter of the permeate from the nanofiltration apparatus 538. The amount or fraction of permeate from the nanofiltration apparatus 538 used as concentrate makeup for the electrodialysis apparatus 526 may also or alternatively be selected based on, for example, the quality of the diluate from the electrodialysis apparatus 526. The quality of the diluate from the electrodialysis apparatus 526 may be measured by sensor 108C, which may, in various embodiments, measure any one or more of pH, salinity, flow rate, ionic species, SAR value, or any other desired parameter of the diluate from the electrodialysis apparatus 526.

A valve or other diverting system 552 may provide for the amount of permeate from the nanofiltration apparatus 538 utilized as concentrate makeup for the electrodialysis apparatus 526 to be adjusted as desired. Valve or diverting system 552 may be operated by the controller 106 responsive to information from any of sensors 108C, 108D, 108E, 108F or other sensors located in various portions of the system.

The electrodialysis apparatus 526 may include one or more monovalent ion selective membranes to selectively promote transfer of one or more monovalent cationic or anionic species. In other embodiments, the water treated in the electrodialysis apparatus 526 may be sufficiently low in monovalent ions that monovalent ion selective membranes would not be required in the electrodialysis apparatus 526. The electrodialysis apparatus 526 may thus utilize standard ion exchange membranes known in the art. These standard ion exchange membranes may be not monovalent ion selective.

In each of the systems described above, total water recoveries of between about 66% and about 95% or higher may be possible with low processing costs and high energy efficiency, for example, an energy efficiency of about 2.0 kwh/m$^3$ of purified water or less. In some embodiments none of the water purified to a level suitable for agricultural or potable use would need to be used for wastewater makeup. Rather, makeup water for the concentrate or electrode streams for the electrodialysis systems could be made up from influent feed. The provision of this makeup water from these downstream sources may improve the overall electrical efficiency of the disclosed system as compared to systems not including the provision of makeup water as described.

Potable water produced in the above systems may be low in salinity and substantially or completely free of particulates, colloids, dissolved organic materials, viruses, or microbes. In implementations where selenium levels from the electrodialysis apparatus meet minimum standards for irrigation but are in excess of requirements for potability, this selenium in the form of divalent selenate or selenite will be adequately removed in the nanofiltration step. In implementations where selenium levels are in excess of requirements for irrigation, the electrodialysis apparatus can incorporate non-selective anion membranes and be operated such that the divalent selenate or selenite is adequately reduced in the diluate. In implementation where selenium levels are acceptable in the feed water for irrigation, but concentration of selenium would be harmful to wildlife in the effluent from the system, the electrodialysis system can incorporate monovalent selective anion membranes to prevent divalent selenate or selenite from entering the concentrating compartments. The potable water may have characteristics defined in recognizable standards, for example, those provided by the WHO. The fraction of purified water produced that is suitable for agricultural use may include high levels of divalent ions and minerals, but have very low concentrations of impurities such as sodium chloride or potassium chloride. The fraction of purified water produced that is suitable for agricultural use may not require processing by softening membranes. Since only a small fraction of the total water influent to the treatment systems described above may be processed by water softening membranes to produce potable water, the size and capital and operational costs of the water softening membrane units may be low to relative to other systems where a greater quantity of water would need to be processed through water softening membrane units. Also, in some embodiments, only a small portion of the influent water to be treated would be processed through electrodialysis units including monovalent ion selective membranes, providing further for reduced treatment unit sizes and reduced capital and operational costs.

In some embodiments transport of divalent ions through electrodialysis including monovalent ion selective membranes may be substantially avoided or eliminated. This may result in a reduced buildup of scale in the electrodialysis units and may reduce pH shifts and high voltages caused by calcium or sulfate transport through a typical cation or anion selective ion exchange membrane.

Each of the embodiments of treatment systems described above may be used partially within a total system such that combinations of the various embodiments can be used for customized agricultural and potable water production quantities or qualities, depending on the feed water makeup and demand for the water for agricultural or potable uses. The quantities of water suitable for potable or agricultural consumption may be changed based on demand by running more or less water to be treated through each of the various embodiments, changing the relative water recoveries or adjusting based on salinity changes in the water to be treated.

As noted above, ancillary systems may be utilized in the systems and techniques of the invention in post-treatment operations. For example, one or more disinfecting systems such as those that irradiate (such as by UV treatment), oxidize, or otherwise reduce microbiological activity in the water may be disposed to further treat the water. Further, one or more storage systems may be also used as discussed above.

Because some embodiments of the invention can selectively remove monovalent species, any resultant secondary or concentrate streams would be less susceptible to scaling and fouling. This feature advantageously allows some separation embodiments of the invention to operate at higher water recovery rates, compared to non-selective techniques, because the volumetric rate of any secondary streams can be effectively reduced without or with less concern for undesirable precipitation. Thus, some embodiments of the invention directed to utilizing systems and techniques that selectively separate monovalent species can be operated at higher recovery rates compared to non-selective ED and distillation-based separation apparatus, and even much higher recovery rates compared RO and NF based separation apparatus. Significantly, because RO and NF based separation systems selectively reduce the concentration of non-monovalent species, these processes cannot effectively provide treated water having low SAR values.

A further advantage of the selective separation systems and techniques of the invention pertains to the reduction or removal of non-ionized species that have little or no influence on crop growth. For example, silica is typically not preferentially removed in the ED-based systems of the invention or the nanofilter-based systems of the invention, thereby avoiding any scaling or fouling concerns in secondary streams that typically arise when treating silica-containing water in RO and distillation apparatus. In addition, because secondary streams of some embodiments of the invention typically have reduced scaling tendencies, the recovery rates in the separation systems and techniques of the invention may be greater than the recovery rates of RO and distillation-based systems.

A further advantage of the nanofiltration system is that the water retentate from the nanofilter may be useful for irrigation water. Thus, in cases where irrigation needs are substantial, all or a substantial part of the diluate from the electrodialysis system may be sent to the nanofilter and the nanofilter operated at low water recovery. The result of operating at relatively low water recovery of the nanofilter is that the retentate flow is increased and the concentration of the retentate is reduced and thus less prone to scaling or fouling or operation at high osmotic pressure loss. Overall water usage is maintained because the entire effluent from the retentate of the nanofilter may be an excellent source of low SAR water for irrigation.

Various embodiments of systems disclosed herein may include electrochlorination cells and electrochlorination devices or electrolytic and electrochemical cells used for any one of multiple purposes.

Current commercially electrochlorination cells are typically based on one of two electrode arrangements, concentric tubes (CTE) and parallel plates (PPE).

Aspects and embodiments disclosed herein are generally directed to systems including electrochemical devices to generate disinfectants such as sodium hypochlorite. The terms "electrochemical device" and "electrochemical cell" and grammatical variations thereof are to be understood to encompass "electrochlorination devices" and "electrochlorination cells" and grammatical variations thereof. Aspects and embodiments of electrochemical cells disclosed herein are described as including one or more electrodes.

Embodiments of electrochemical cells included in systems disclosed herein may include metal electrodes, for example, one or more anodes, one or more cathodes, and/or one or more bipolar electrodes. The term "metal electrodes" or grammatical variation thereof as used herein is to be understood to encompass electrodes formed from, comprising, or consisting of one or more metals, for example, titanium, aluminum, or nickel although the term "metal electrode" does not exclude electrodes including of consisting of other metals or alloys. In some embodiments, a "metal electrode" may include multiple layers of different metals. Metal electrodes utilized in any one or more of the embodiments disclosed herein may include a core of a high-conductivity metal, for example, copper or aluminum, coated with a metal or metal oxide having a high resistance to chemical attack by electrolyte solutions, for example, a layer of titanium, platinum, a mixed metal oxide (MMO), magnetite, ferrite, cobalt spinel, tantalum, palladium, iridium, silver, gold, or other coating materials. "Metal electrodes" may be coated with an oxidation resistant coating, for example, but not limited to, platinum, a mixed metal oxide (MMO), magnetite, ferrite, cobalt spinel, tantalum, palladium, iridium, silver, gold, or other coating materials. Mixed metal oxides utilized in embodiments disclosed herein may include an oxide or oxides of one or more of ruthenium, rhodium, tantalum (optionally alloyed with antimony and/or manganese), titanium, iridium, zinc, tin, antimony, a titanium-nickel alloy, a titanium-copper alloy, a titanium-iron alloy, a titanium-cobalt alloy, or other appropriate metals or alloys. Anodes utilized in embodiments disclosed herein may be coated with platinum and/or an oxide or oxides of one or more of iridium, ruthenium, tin, rhodium, or tantalum (optionally alloyed with antimony and/or manganese). Cathodes utilized in embodiments disclosed herein may be coated with platinum and/or an oxide or oxides of one or more of iridium, ruthenium, and titanium. Electrodes utilized in embodiments disclosed herein may include a base of one or more of titanium, tantalum, zirconium, niobium, tungsten, and/or silicon. Electrodes for any of the electrochemical cells in any of the systems disclosed herein can be formed as or from plates, sheets, foils, extrusions, and/or sinters.

Some aspects and embodiments of electrochemical cells included in systems disclosed herein are described as including rigid electrodes. As the term is used herein, a "rigid" object is one that maintains its shape in the absence of an applied force at a normal operating temperature and/or at an elevated temperature. A "rigid electrode," as the term is used herein, is considered to have sufficient mechanical stiffness such that it maintains its shape and separation between adjacent electrodes or electrode windings in the various embodiments of electrochemical cells and devices disclosed herein without the need for spacers. For example, a flexible film including a metal coating is not to be considered a "rigid electrode" as the term is used herein.

The term "tube" as used herein includes cylindrical conduits, however, does not exclude conduits having other cross-sectional geometries, for example, conduits having square, rectangular, oval, or obround geometries or cross-sectional geometries shaped as any regular or irregular polygon.

The terms "concentric tubes" or "concentric spirals" as used herein includes tubes or interleaved spirals sharing a common central axis but does not exclude tubes or interleaved spirals surrounding a common axis that is not necessarily central to each of the concentric tubes or interleaved spirals in a set of concentric tubes or interleaved spirals.

In some embodiments, a line passing from a central axis of an electrochlorination cell toward a periphery of the electrochlorination cell in a plane defined normal to the central axis passes through multiple electrode plates. The multiple electrode plates may include multiple anodes and/or multiple cathodes and/or multiple bipolar electrodes. The central axis may be parallel to an average direction of flow of fluid through the electrochemical cell.

In embodiments of electrochemical cells included in systems disclosed herein including multiple anode or cathode tube electrodes, the multiple anode tube electrodes may be referred to collectively as the anode or the anode tube, and the multiple cathode tube electrodes may be referred to collectively as the cathode or the cathode tube. In embodiments of electrochemical cells included in systems including multiple anode and/or multiple cathode tube electrodes, the multiple anode tube electrodes and/or multiple cathode tube electrodes may be collectively referred to herein as an anode-cathode pair.

In some aspects and embodiments of electrochemical cells included in systems disclosed herein including concentric tube electrodes, for example, one or more anodes and/or cathodes as disclosed herein, the electrodes are configured and arranged to direct fluid through one or more gaps between the electrodes in a direction parallel to a central axis of the electrochemical cell. In some aspects and embodiments of electrochemical cells including concentric tube electrodes, for example, one or more anodes and/or cathodes as disclosed herein, the electrodes are configured and arranged to direct all fluid introduced into the electrochemical cell through the one or more gaps between the electrodes in a direction parallel to a central axis of the electrochemical cell.

Electrochlorination cells are used in marine, offshore, municipal, industrial and commercial applications. The design parameters of electrochlorination cells including a plurality of concentric electrode tubes, for example, inter-electrode spacing, thickness of electrodes and coating density, electrode areas, methods of electrical connections, etc., can be selected for different implementations. Aspects and embodiments disclosed herein are not limited to the number of electrodes, the space between electrodes, the electrode material or spacer material, number of passes within the electrochlorination cells or electrode coating material.

PCT application PCT/US2016/018210 is incorporated herein by reference in entirety for all purposes.

Aspects and embodiments disclosed herein include systems and processes for the regulation of the composition of an electrolyzer feed stream. Through the use of these techniques, it is possible to decrease the rate of precipitate formation and increase the concentration of hypochlorite produced by an electrolyzer.

Configurations of concentric tubular electrolyzer (CTE) cells for improving system performance have been discussed in U.S. 62/633,790 which is incorporated herein by reference in its entirety for all purposes. Electrolyzer systems including various arrangements of electrochemical cells (e.g., CTE systems including multiple CTE cells) are disclosed in PCT Application PCT/US2019/019072 which is incorporated herein by reference in its entirety for all purposes. In addition to the cell arrangement, however, CTE system performance strongly depends on its feed stream composition.

The overall electrochemical reaction conditions for the generation of NaOCl from water including sodium chloride in a CTE system are listed in the Background section of this disclosure in equation sets A1 and A2.

The major reaction product at the anode of a CTE system generating NaOCl from water including sodium chloride is $Cl_2$. Anode current and the concentration of NaCl in solution regulate the rate at which $Cl_2$ is produced, which in turn determines the amount of NaOCl formed in solution. The amount of NaOCl formed relative to the volumetric flow rate of the system dictates the overall product strength.

The major reaction products at the cathode of a CTE system generating NaOCl from water including sodium chloride are $H_2$ and $OH^-$. Current, and therefore cathode current density, regulates the rate at which they are produced, and those production rates impact pH within the system.

The kinetics of the above reactions, along with other factors, drive pH within the CTE system.

Above its solubility, $H_2$ will outgas as it is produced in a CTE cell, displacing fluid volume and blinding the cathode. Decreasing the local fluid volume while maintaining the same $OH^-$ production rate will increase local pH at the cathode.

Local $OH^-$ concentration at the cathode of a CTE cell is also a function of velocity, since turbulence, and therefore mixing, are a function of velocity. Decreasing the flow rate will therefore also increase the local cathode pH.

Water having high concentrations of divalent ions, for example, $Mg^{2+}$ and $Ca^{2+}$ in solution may precipitate scale, for example, $Mg(OH)_2$ and/or $CaCO_3$ when treated in a CTE cell. Both of these species will impair the performance of a CTE cell. The rate and amount of precipitate formation may dependent on factors such as temperature, pH, concentration of the divalent ions, and flow rate of fluid through the CTE cell. For example, at a pH threshold of 10.7-11, $Mg(OH)_2$ begins to form.

Variations in the TDS of the process stream will affect its conductivity, and thus the overall power consumption of an electrolyzer, since cell voltage and conductivity are inversely related.

Figure 7A:
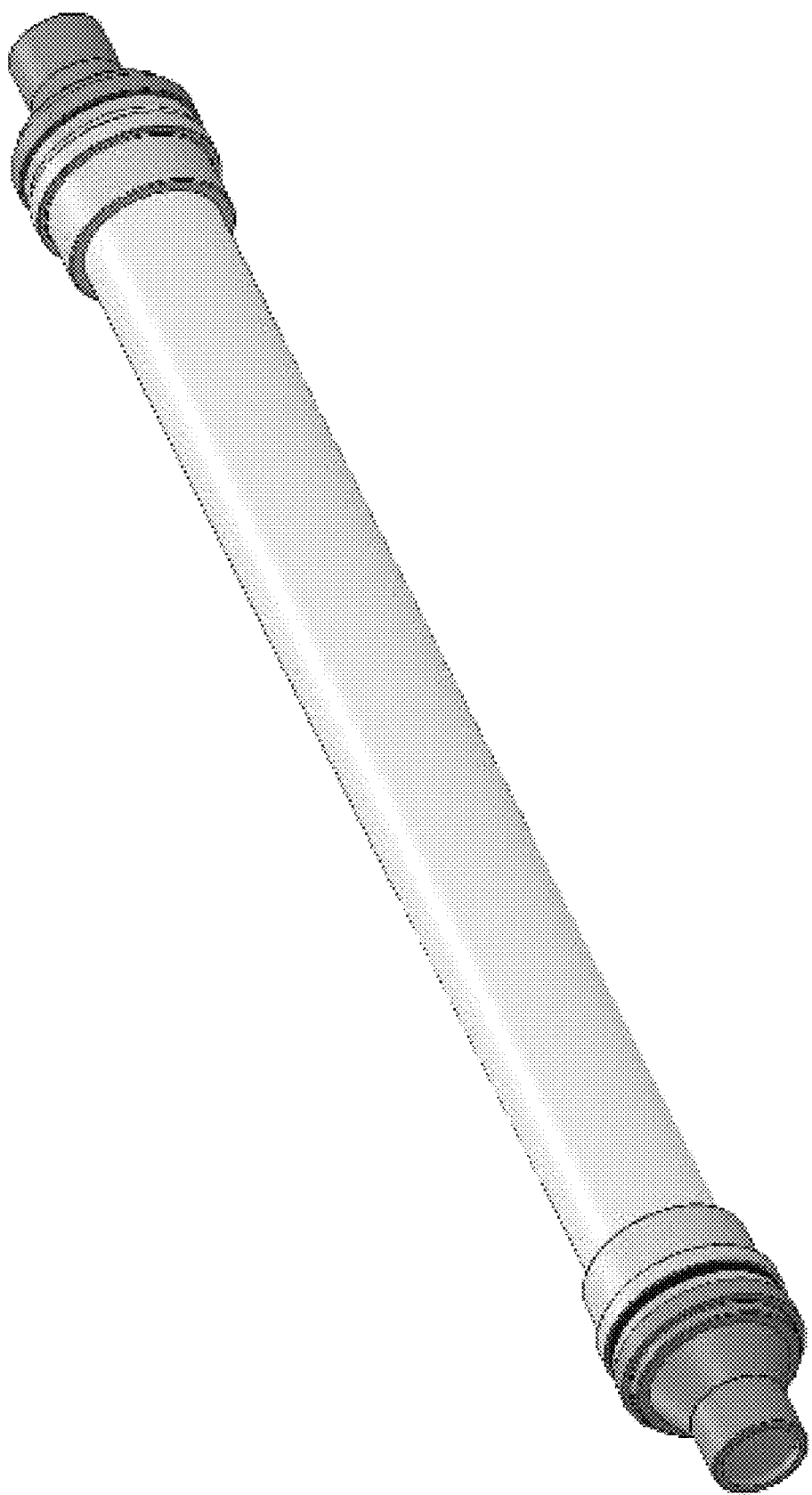
FIG. 7A is a perspective view of an embodiment of a multi-tube concentric tube electrolyzer cell.
Figure 7B:
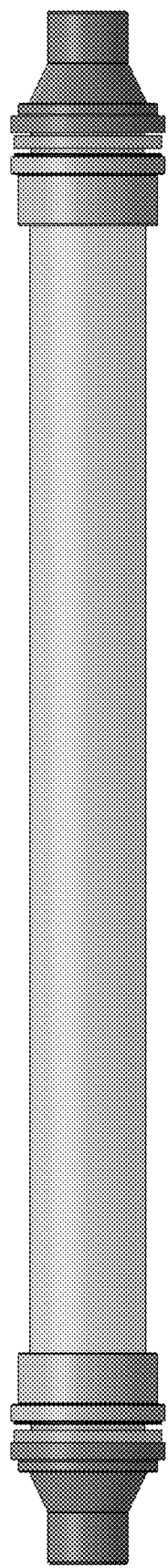
FIG. 7B is a side view of the concentric tube electrolyzer cell of FIG. 7A.
Figure 7C:
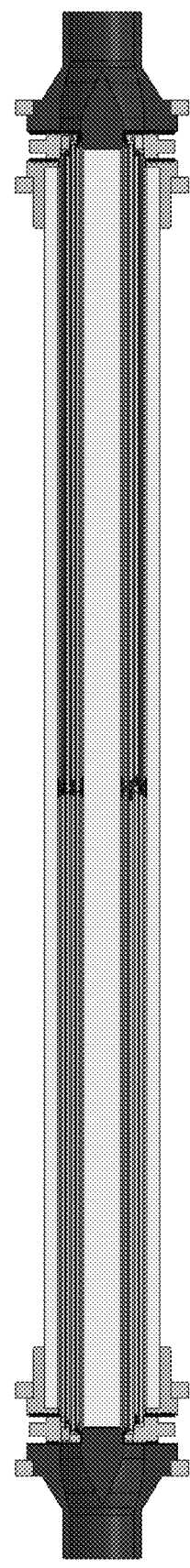
FIG. 7C is a cross-sectional view of the concentric tube electrolyzer cell of FIG. 7A.
Figure 8:
FIG. 8 illustrates an electrolyzer system including 20 electrochemical cells fluidically connected in series.

A current Evoqua state of art CTE cell is shown in FIGS. 7A-7C. An example system comprising twenty CTE cells hydraulically in series is shown in FIG. 8. Parameters of particular note include the volumetric flow rate of liquid through the system (FIG. 9A), the mass flow rates of FIG. 9B, the volumetric generation rates of $H_2$ (FIG. 9C), and the mass generation rates of FIG. 9D.

At a flow velocity of 2-3 m/s, a system as illustrated in FIG. 8 is capable of self-cleaning operation, assuming a feed stream with $Na^+$ concentrations between about 10,000 and 16,000 ppm, $Cl^-$ concentrations between about 18,000 and 23,000 ppm, $Mg^{2+}$ concentrations between about 750 and 1,800 ppm, and $Ca^{2+}$ concentrations between about 200 and 500 ppm.

For these feed conditions, NaOCl output concentrations between about 2,000 ppm and about 3,000 ppm are achievable. Again, this product strength is theoretically limited by the rate of precipitate formation and by the amount of NaCl in solution. To improve the performance of an electrochlorination system, one may, for example:

Mitigate precipitation (via pH regulation or $Mg^{2+}/Ca^{2+}$ removal); and/or

Increase the concentration of NaCl in the feed stream

Techniques exist to compensate for divalent hardness and/or enhance monovalent salt concentrations. For systems as described above, however, many processes are impractical. Examples of both suitable and unsuitable processes are listed below.

Unsuitable:

Anti-scalant dosing: Reagent cost for the mass to be treated is prohibitive

Chelation: Reagent cost for the mass to be treated is prohibitive

Distillation: Energy costs to treat the required volumes are prohibitive

Electrodeionization (EDI): Requires a low hardness feed, outside of the process range Ion exchange: Requires manned operation; cost and hazardous nature of regenerative chemicals is prohibitive Lime softening/Clark's process: Requires manned operation; mass for treatment and sludge disposal costs are prohibitive Magnetic water treatment (AMT): Unproven process, with little supporting data.

Suitable:

Acid dosing: Acid injection can reduce pH, which may mitigate scale formation

Capacitive Deionization (CAPDI): Can reduce divalent and enhance monovalent ion concentrations; relatively low energy (cyclical adsorption/desorption)

Figure 10:
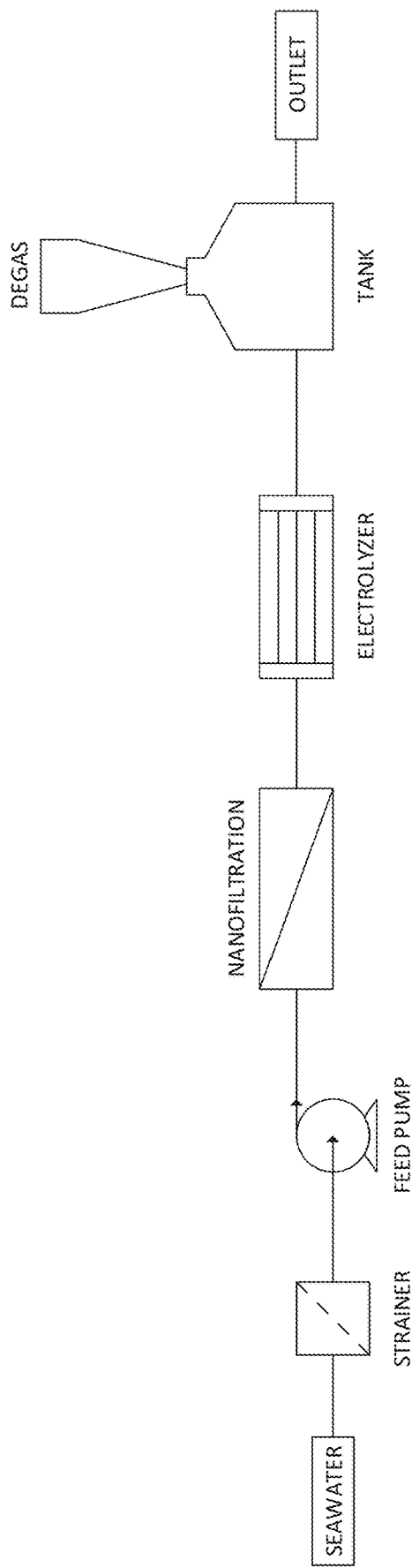
FIG. 10 illustrates a system to adjust feed stream composition of an electrolyzer system via nanofiltration.

Nanofiltration/Reverse osmosis: Can reduce divalent ion concentrations, with a concurrent reduction in monovalent ion concentrations; relatively low energy Electrodialysis (ED): Can selectively transport monovalent ions and/or generate acid FIG. 10 depicts a system to adjust feed stream composition via nanofiltration (NF). Use of NF may reduce divalent hardness, specifically $Mg^{2+}$ and $Ca^{2+}$, and thus reduce or prevent electrolyzer precipitation. The NF unit separates the seawater into a retentate and a filtrate, the retentate having a higher ratio of divalent ions to monovalent ions than the filtrate. A filtrate outlet of the NF unit provides the filtrate to an inlet of the electrolyzer. Reference data for such a NF system is included in FIG. 11 (reproduced from Telzhensky, M., Birnhack, L., Lehmann, O., Windler, E., Lahav, O. Selective separation of seawater $Mg^{2+}$ ions for use in downstream water treatment processes. Chemical Engineering Journal 175 (2011) 136-143). In some embodiments, the NF unit illustrated in FIG. 10 may be the NF unit 538 of FIG. 5, and the source of seawater, strainer, and feed pump illustrated in FIG. 10 may be replaced with the features of the system of FIG. 5 disposed upstream of the NF unit 538. The electrolyzer of FIG. 10 may be located in, for example, the electrochemical generation system 556 of FIG. 5.

In this configuration, monovalent ion concentrations may be reduced by roughly 2-10%, while divalent ion concentrations may be reduced by roughly 50-90% by the NF unit.

Figure 12:
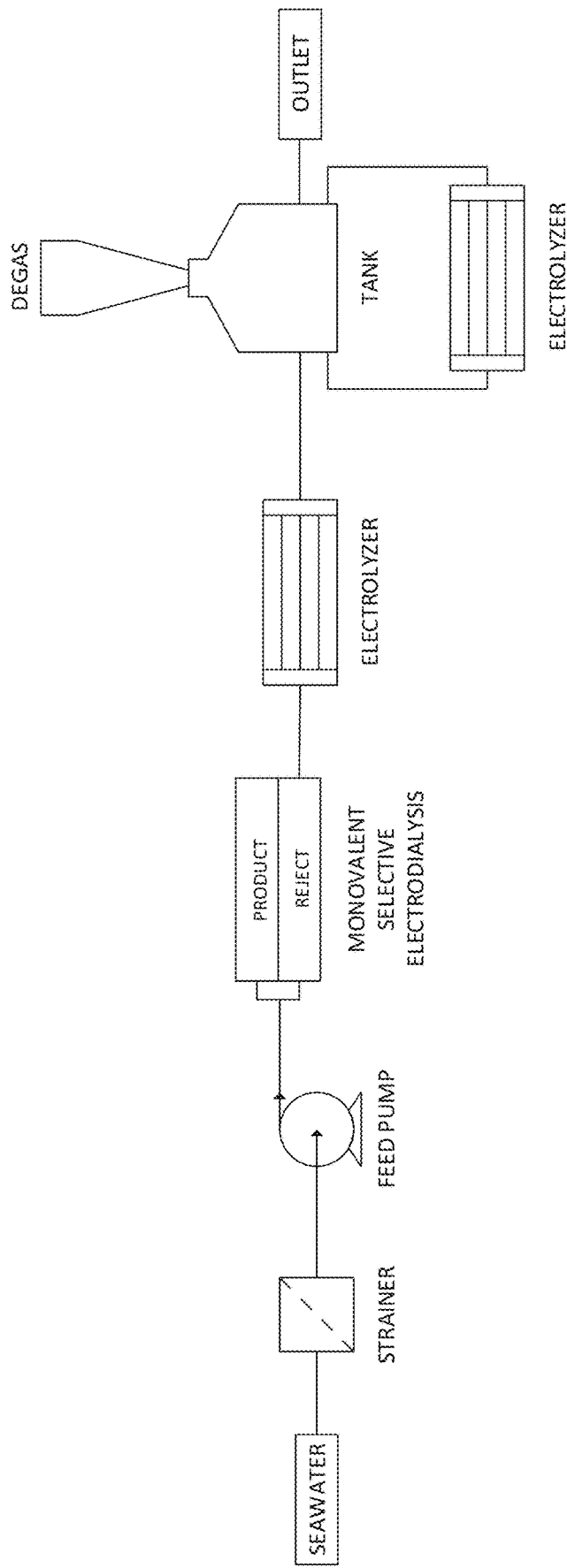
FIG. 12 illustrates a system to adjust feed stream composition of an electrolyzer system via electrodialysis.
Figure 13A:
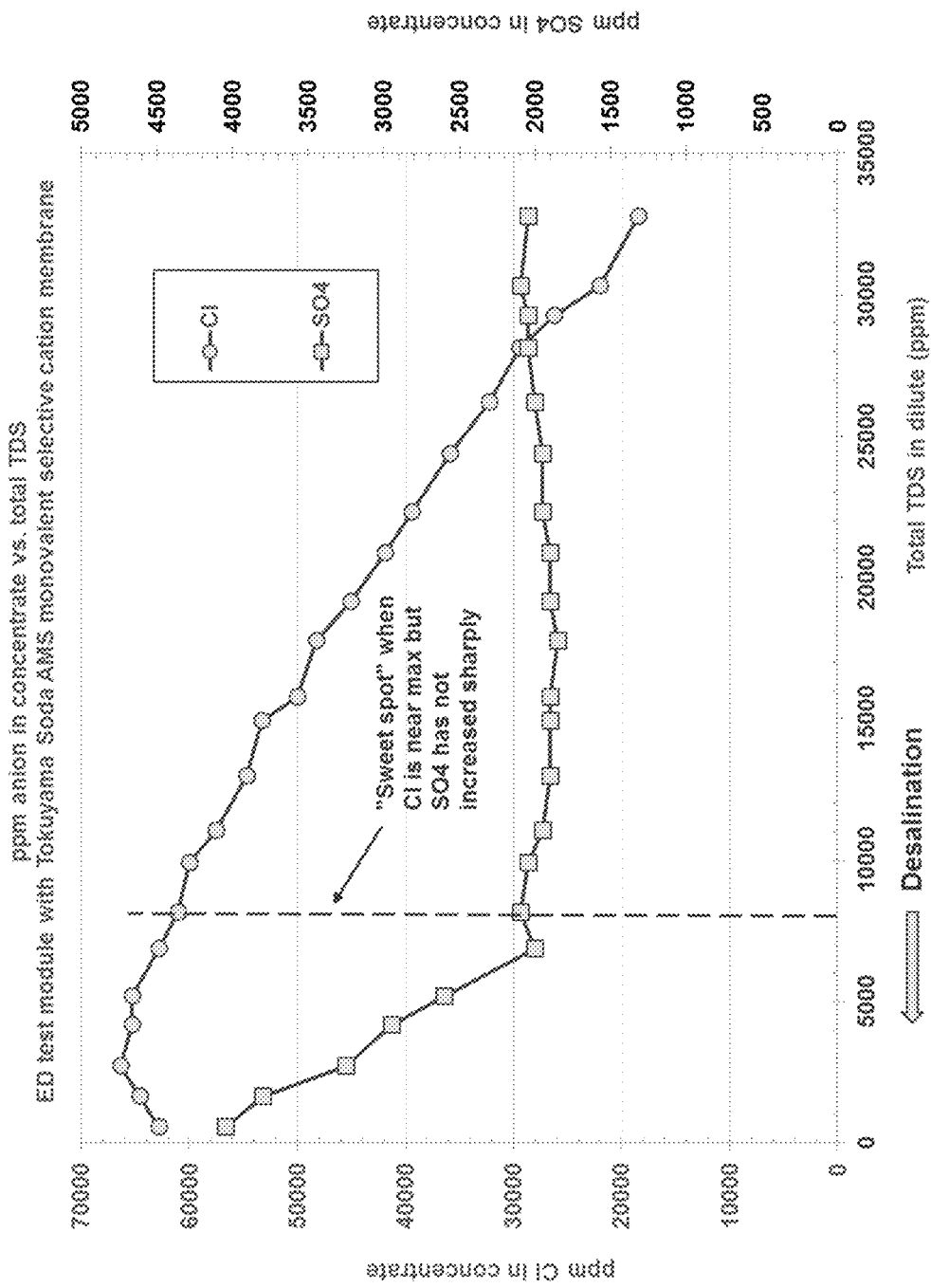
FIG. 13A illustrates relative levels of Cl$^-$ and SO$_4^{2-}$ as a function of total TDS in seawater concentrate from an example electrodialysis module.
Figure 14B:
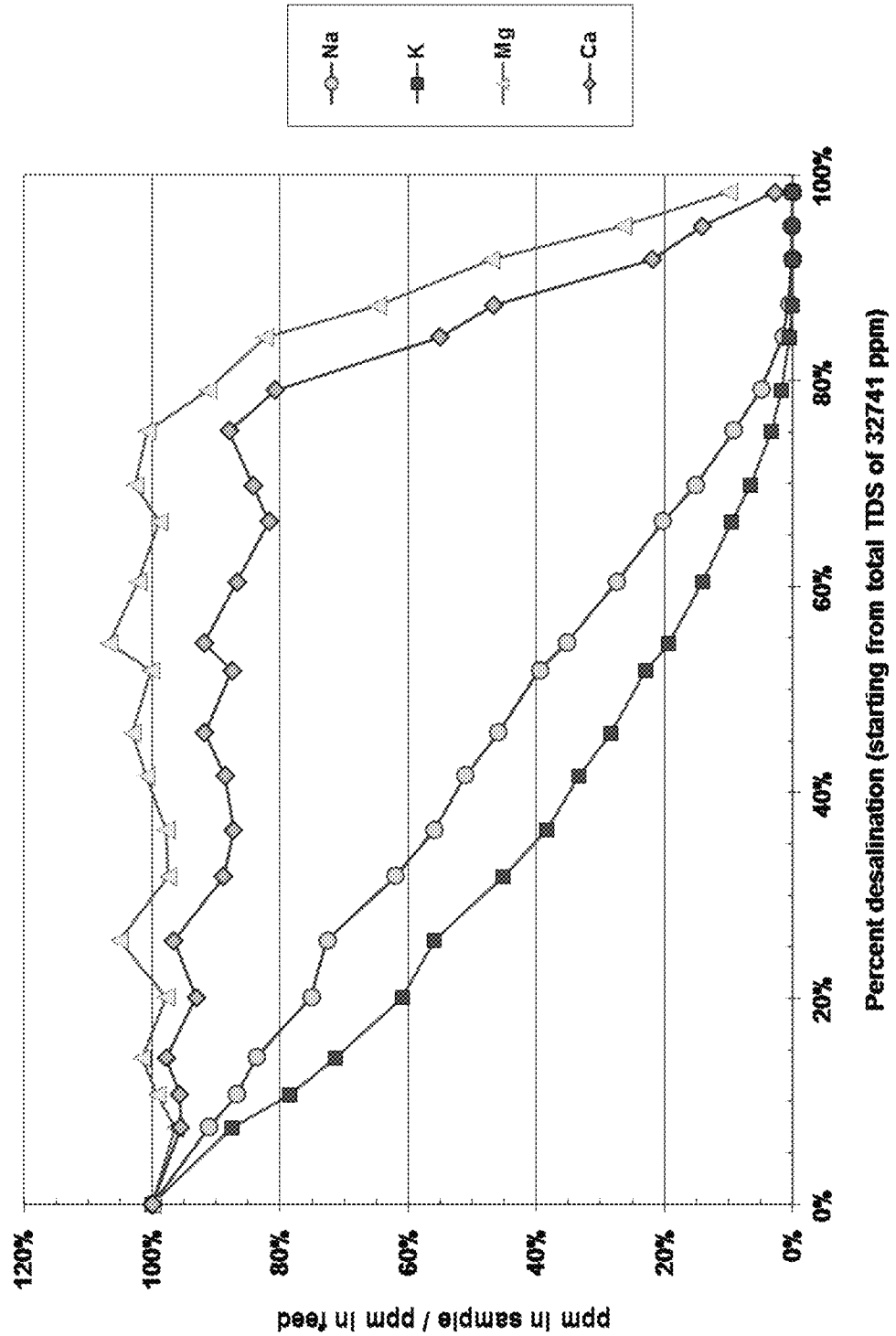
FIG. 14B illustrates relative levels of select cations as a function of desalination percent in an example electrodialysis module.

FIG. 12 depicts a system to adjust feed stream composition via electrodialysis (ED). Such a system would make use of monovalent selective membranes to preferentially transport monovalent ions from the dilute to the concentrate stream. Reference data for such a process is included in FIGS. 13A-14B. FIGS. 13A-14B illustrate the performance of an example of an ED system utilizing monovalent-selective membranes. With increasing treatment (decreasing in TDS or increasing degree of desalination) the monovalent ions (Cl, Na, K) quickly move from the dilute to the concentrate stream, while the divalent ions ($SO_4$, Mg, Ca) remain in the concentrate stream until a high degree of TDS removal/desalination is achieved. In this configuration, monovalent ion concentrations in the concentrate stream may be increased by roughly 3%-400%, with no concurrent change in the concentration of divalent ion species. The ED system illustrated in FIG. 12 may be the first separation apparatus 406 of FIG. 4 or the electrodialysis apparatus 526 of FIG. 5. The source of seawater, strainer, and feed pump illustrated in FIG. 12 may be replaced with the features of the system of FIG. 4 or FIG. 5 disposed upstream of the first separation apparatus 406 of FIG. 4 or the electrodialysis apparatus 526 of FIG. 5. The electrolyzer of FIG. 12 may be located in, for example, the ancillary points of use 412 of FIG. 4 or the ancillary point of use 546 of FIG. 5.

As further illustrated in FIG. 12, product, for example, an aqueous solution including NaOCl, from the electrolyzer may be sent to a product holding tank which may include a degas system to remove residual gasses, for example, chlorine or hydrogen from the product. An additional electrolyzer may be included in a recirculation line in fluidic communication with the product holding tank that may further treat product from the product holding tank and, for example, increase a concentration of NaOCl or another desired product component in the product in the product holding tank.

Figure 15A:
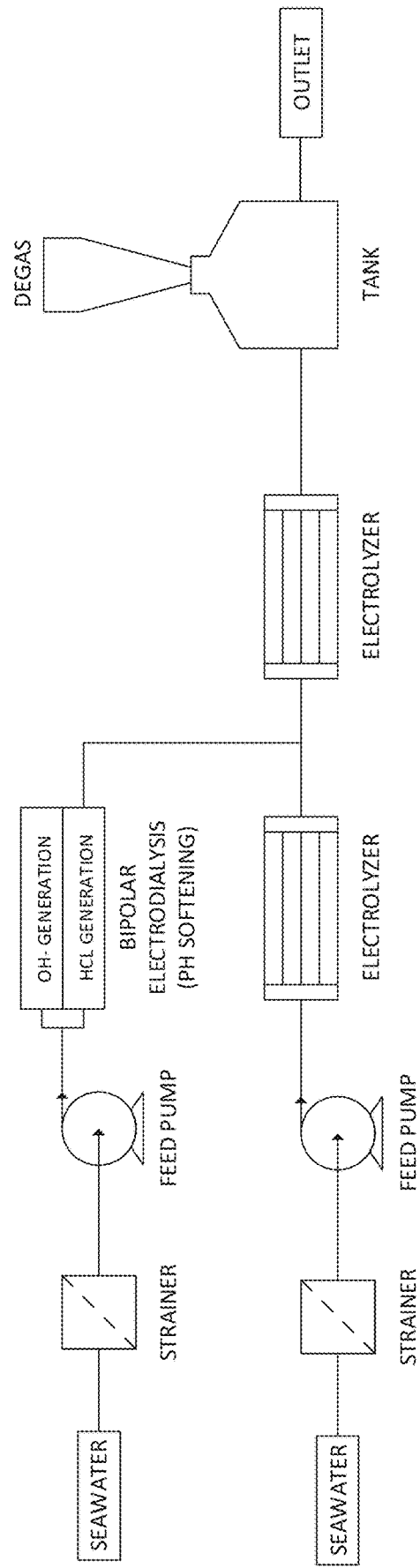
FIG. 15A illustrates a system to adjust an electrolyzer feed stream pH via electrodialysis.
Figure 15B:
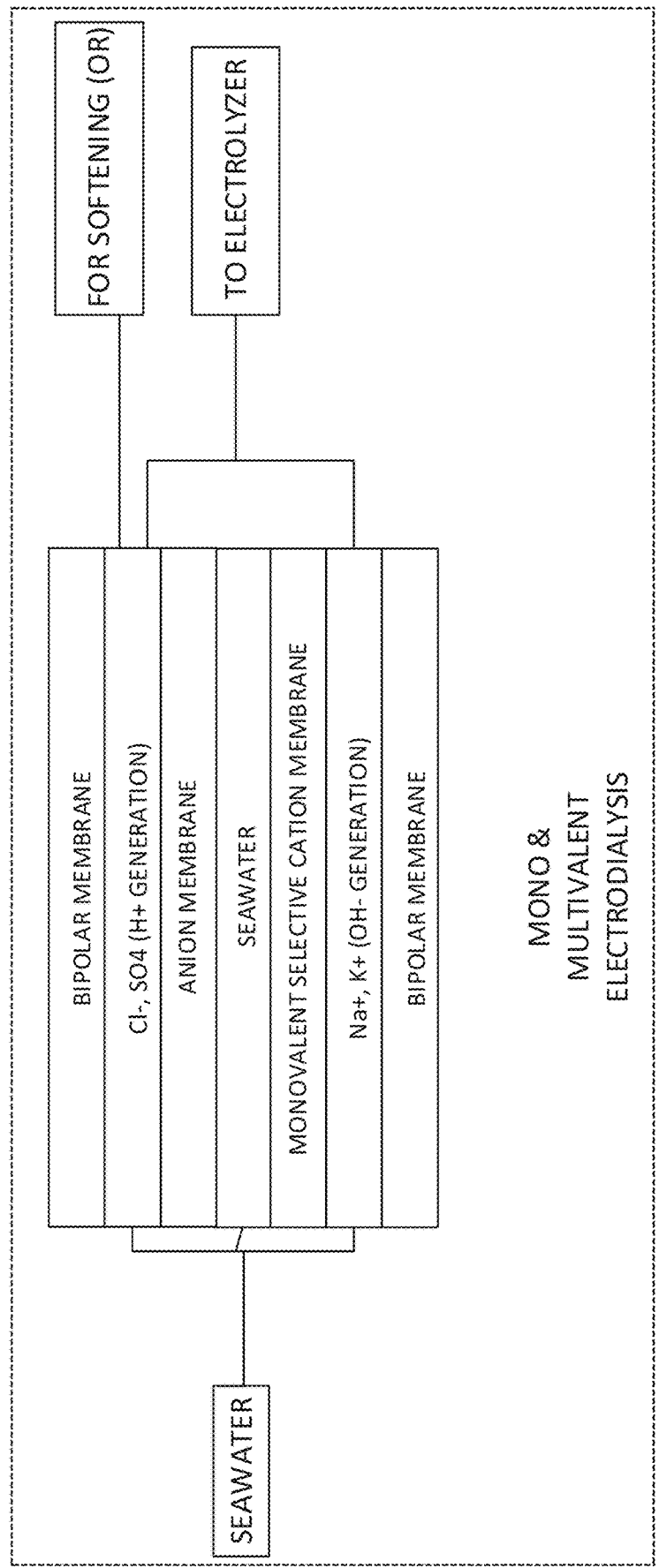
FIG. 15B illustrates the bipolar electrodialysis module of FIG. 15A in greater detail.
Figure 16:
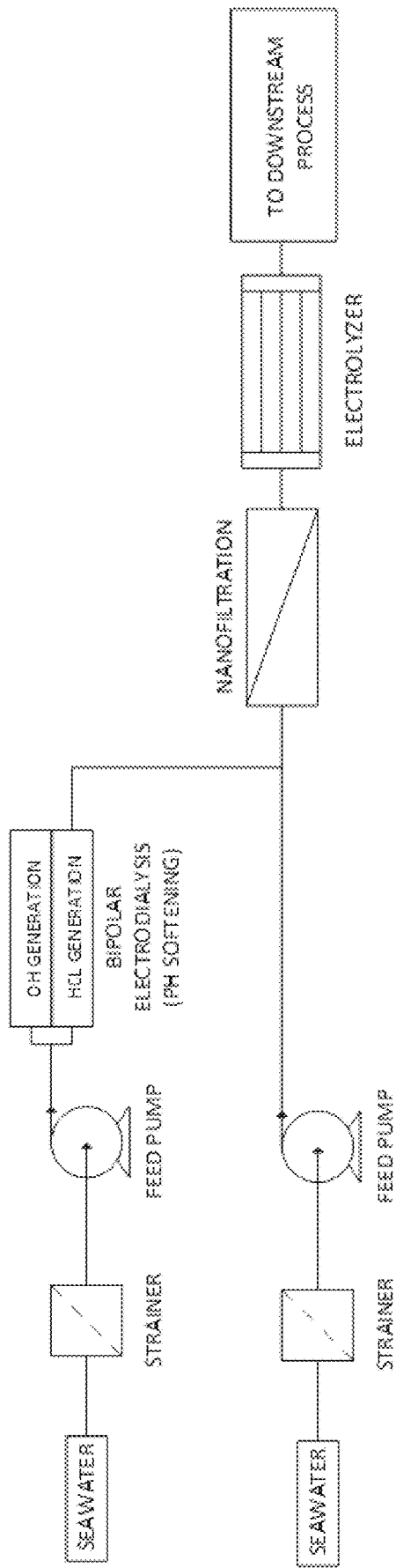
FIG. 16 illustrates a system to adjust an electrolyzer feed stream pH via nanofiltration.

FIG. 15A depicts a system to adjust electrolyzer feed stream pH via ED. This system makes use of an electrodialysis system including bipolar membranes to generate $H^+$ and $OH^-$ (FIG. 15A). $H^+$ can be used to adjust pH either at the electrolyzer (FIG. 15B), or at an NF module (FIG. 16).

Figure 17A:
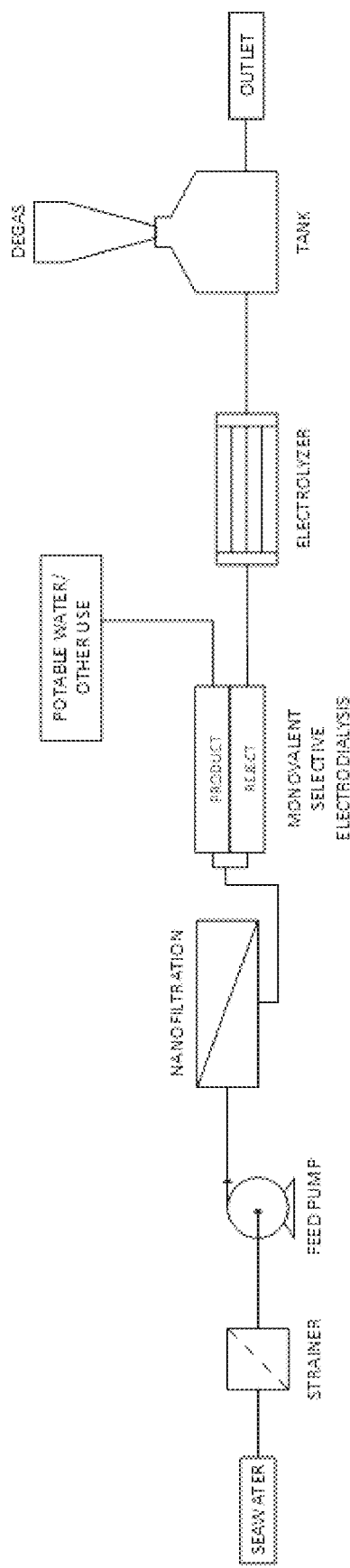
FIG. 17A illustrates a system combining nanofiltration and electrodialysis to adjust an electrolyzer feed stream.
Figure 17B:
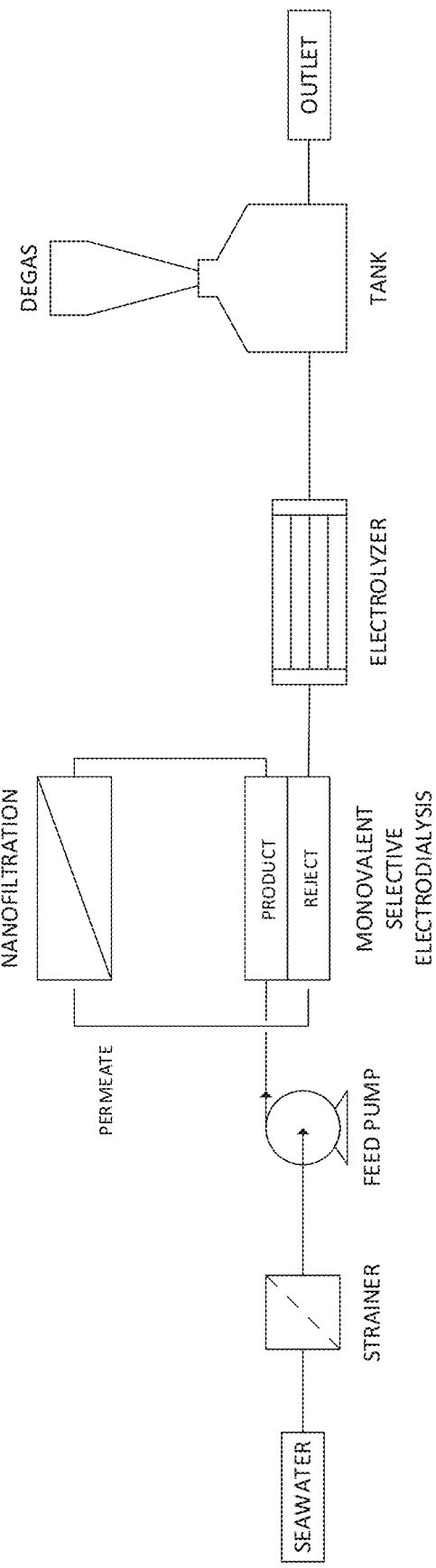
FIG. 17B illustrates another system combining nanofiltration and electrodialysis to adjust an electrolyzer feed stream.

FIGS. 17A and 17B depict systems combining NF and ED to adjust the electrolyzer feed stream. In the system of FIG. 17A, NF is used to reduce divalent hardness. The retentate stream from the NF feeds both the dilute and concentrate streams of a monovalent selective ED module. As bromide ions would pass to the concentrate stream, the dilute stream of the monovalent selective ED module could be used for other applications, such as potable or cooling water. The concentrate stream, with reduced divalent and increased monovalent ion concentrations, could then be used as the feed stream for the electrolyzer. In some embodiments, the NF unit illustrated in FIG. 17A may be the NF unit 538 of FIG. 5, and the source of seawater, strainer, and feed pump illustrated in FIG. 17A may be replaced with the features of the system of FIG. 5 disposed upstream of the NF unit 538. The electrolyzer and/or other features illustrated in FIG. 17A may be located in, for example, the electrochemical generation system 556 of FIG. 5.

In the system of FIG. 17B, the diluting stream of a monovalent selective ED module is first used to reduce the concentration of monovalent ions in the feed stream. The dilute stream of the ED device is then used as the feed for an NF module, to reduce divalent hardness. The permeate of the NF module is then fed to the concentrate stream of the ED device, conserving the overall concentration of monovalent ions.

Figure 18A:
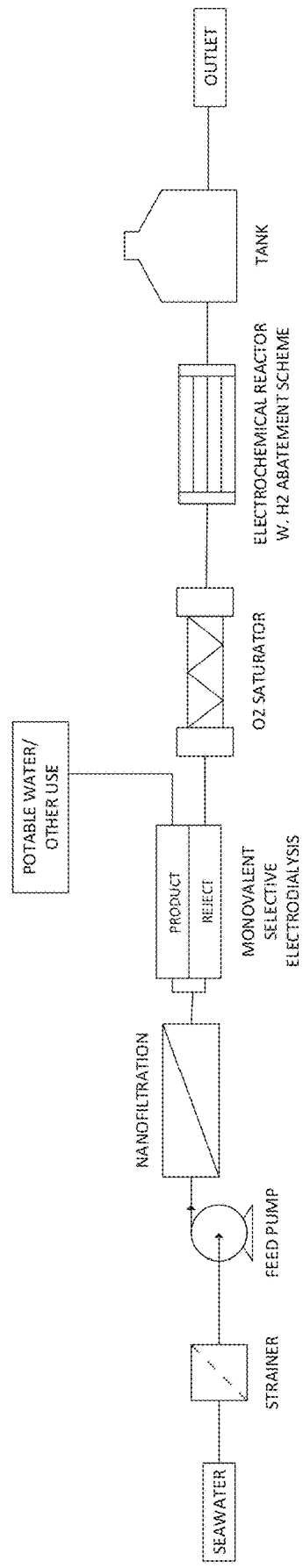
FIG. 18A illustrates a system to adjust feed stream composition, coupled with an electrolyzer configured for reaction product abatement.
Figure 18B:
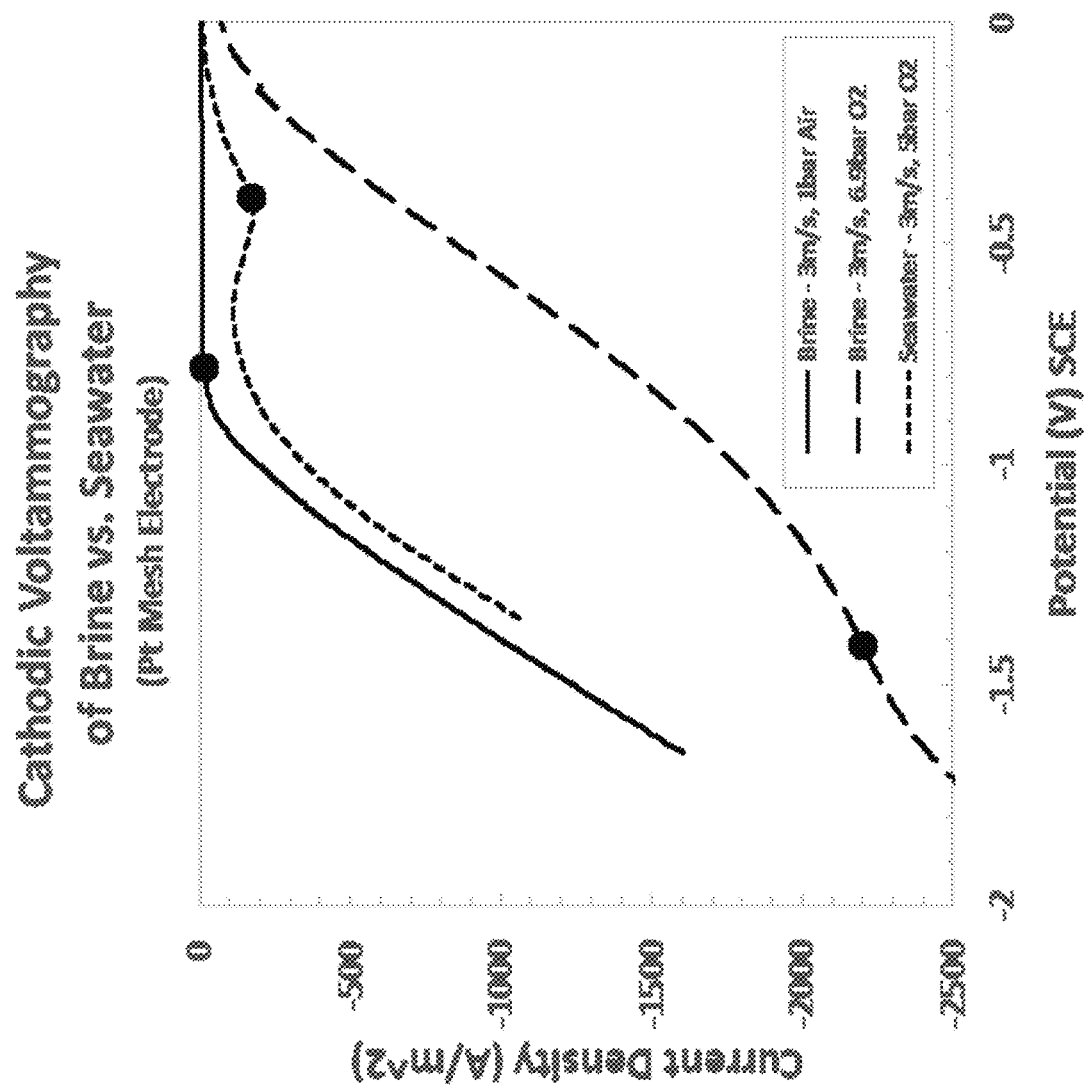
FIG. 18B illustrates the relative performance of hydrogen abatement for different feed solutions to an electrolyzer.

FIG. 18A depicts a system to adjust feed stream composition, coupled with an electrolyzer including features for reaction product abatement. Previous experiments comparing reaction product abatement for varying feed compositions, specifically seawater and brine, found that the presence of $Mg^{2+}$ hardness resulted in cathodic masking, and a reduction in operational current density, from about 2,200 to 200 $A/m^2$ (FIG. 18B), with a concurrent shift from oxygen consumption to hydrogen generation. In FIG. 18B, the shift from oxygen consumption to hydrogen generation occurs at the inflection point marked in each of the lines. The "Brine—3 m/s, 1 bar Air" line represents performance without any improvements. The "Brine—3 m/s, 6.9 bar O2" line represents the fully realized performance enhancement. The "Seawater—3 m/s, 5 bar O2" line illustrates the diminished performance caused by Mg interference. By eliminating divalent hardness, specifically $Mg^{2+}$ utilizing, for example, the nanofiltration unit illustrated in FIG. 18A, an electrolyzer system capable of generating NaOCl without hydrogen would then be possible. An oxygen saturator may also be provided to introduce oxygen into the electrochemical reactor feed stream to react with dissolved ft to form water and prevent the ft from coming out of solution. In some embodiments, the NF unit illustrated in FIG. 18A may be the NF unit 538 of FIG. 5, and the source of seawater, strainer, and feed pump illustrated in FIG. 18A may be replaced with the features of the system of FIG. 5 disposed upstream of the NF unit 538. The electrolyzer and/or other features illustrated in FIG. 18A may be located in, for example, the electrochemical generation system 556 of FIG. 5.

A controller used for monitoring and controlling operation of the various elements of embodiments of the systems disclosed herein, for example, controller 106, may include a computerized control system. The computer system may be implemented using specially-programmed, special-purpose hardware, for example, an application-specific integrated circuit (ASIC) or controllers intended for water treatment system. Various aspects of the controller may be implemented as specialized software executing in a general-purpose computer system 1000 such as that shown in FIG. 19. The computer system 1000 may include a processor 1002 connected to one or more memory devices 1004, such as a disk drive, solid state memory, or other device for storing data. Memory 1004 is typically used for storing programs and data during operation of the computer system 1000. Components of computer system 1000 may be coupled by an interconnection mechanism 1006, which may include one or more busses (e.g., between components that are integrated within a same machine) and/or a network (e.g., between components that reside on separate discrete machines). The interconnection mechanism 1006 enables communications (e.g., data, instructions) to be exchanged between system components of system 1000. Computer system 1000 also includes one or more input devices 1008, for example, a keyboard, mouse, trackball, microphone, touch screen, and one or more output devices 1010, for example, a printing device, display screen, and/or speaker.

The output devices 1010 may also comprise valves, pumps, or switches which may be utilized to introduce product water (e.g. brackish water or seawater) from the feed source into an electrochlorination system as disclosed herein or a point of use and/or to control the speed of pumps. One or more sensors 1014 may also provide input to the computer system 1000. These sensors may include, for example, pressure sensors, chemical concentration sensors, temperature sensors, fluid flow rate sensors, or sensors for any other parameters of interest to an operator of a water treatment system. These sensors may be located in any portion of the system where they would be useful, for example, upstream of point of use and/or one or more unit operations of embodiments of the systems disclosed herein or in fluid communication with a feed source. For example, one or more sensors 108 (or 108A-108F) may be configured as input devices that are directly connected to controller 106, metering valves, pumps, and/or components of the various embodiments disclosed herein may be configured as output devices that are connected to controller 106. Any one or more of such subcomponents or subsystems may be coupled to another computer system or component so as to communicate with the computer system over a communication network. Such a configuration permits one sensor to be located at a significant distance from another sensor or allow any sensor to be located at a significant distance from any subsystem and/or the controller, while still providing data therebetween. In addition, computer system 1000 may contain one or more interfaces (not shown) that connect computer system 1000 to a communication network in addition or as an alternative to the interconnection mechanism 1006.

The storage system 1012, shown in greater detail in FIG. 20, typically includes a computer readable and writeable nonvolatile recording medium 1102 in which signals are stored that define a program to be executed by the processor 1002 or information to be processed by the program. The medium may include, for example, a disk or flash memory. Typically, in operation, the processor causes data to be read from the nonvolatile recording medium 1102 into another memory 1104 that allows for faster access to the information by the processor than does the medium 1102. This memory 1104 is typically a volatile, random access memory such as a dynamic random access memory (DRAM) or static memory (SRAM). It may be located in storage system 1012, as shown, or in memory system 1004. The processor 1002 generally manipulates the data within the integrated circuit memory 1104 and then copies the data to the medium 1102 after processing is completed. A variety of mechanisms are known for managing data movement between the medium 1102 and the integrated circuit memory element 1104, and aspects and embodiments disclosed herein are not limited thereto. Aspects and embodiments disclosed herein are not limited to a particular memory system 1004 or storage system 1012.

The computer system may include specially-programmed, special-purpose hardware, for example, an application-specific integrated circuit (ASIC). Aspects and embodiments disclosed herein may be implemented in software, hardware or firmware, or any combination thereof. Further, such methods, acts, systems, system elements and components thereof may be implemented as part of the computer system described above or as an independent component.

Although computer system 1000 is shown by way of example as one type of computer system upon which various aspects and embodiments disclosed herein may be practiced, it should be appreciated that aspects and embodiments disclosed herein are not limited to being implemented on the computer system as shown in FIG. 19. Various aspects and embodiments disclosed herein may be practiced on one or more computers having a different architecture or components that that shown in FIG. 19.

Computer system 1000 may be a general-purpose computer system that is programmable using a high-level computer programming language. Computer system 1700 may be also implemented using specially programmed, special purpose hardware. In computer system 1000, processor 1002 is typically a commercially available processor such as an Intel PENTIUM®-type processor, a Motorola PowerPC® processor, a Sun UltraSPARC® processor, a Hewlett-Packard PA-RISC® processor, or any other type of processor or combinations thereof. Many other processors are available, including programmable logic controllers. Such a processor usually executes an operating system which may be, for example, the Windows 7, Windows 8, or Windows 10 operating system available from the Microsoft Corporation, the MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that aspects and embodiments disclosed herein are not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects and embodiments disclosed herein may be performed on a client-server system that includes components distributed among one or more server systems that perform various functions according to various aspects and embodiments disclosed herein. These components may be executable, intermediate (e.g., IL) or interpreted (e.g., Java) code which communicate over a communication network (e.g., the Internet) using a communication protocol (e.g., TCP/IP). In some embodiments one or more components of the computer system 200 may communicate with one or more other components over a wireless network, including, for example, a cellular telephone network.

It should be appreciated that the aspects and embodiments disclosed herein are not limited to executing on any particular system or group of systems. Also, it should be appreciated that the aspects and embodiments disclosed herein are not limited to any particular distributed architecture, network, or communication protocol. Various aspects and embodiments disclosed herein are may be programmed using an object-oriented programming language, such as SmallTalk, Java, C++, Ada, or C# (C-Sharp). Other object-oriented programming languages may also be used. Alternatively, functional, scripting, and/or logical programming languages may be used, for example ladder logic. Various aspects and embodiments disclosed herein are may be implemented in a non-programmed environment (e.g., documents created in HTML, XML or other format that, when viewed in a window of a browser program, render aspects of a graphical-user interface (GUI) or perform other functions). Various aspects and embodiments disclosed herein may be implemented as programmed or non-programmed elements, or any combination thereof.

Prophetic Example—Tranquility Water District, California:

Tranquility Water District has a need for both potable and irrigation water with a scarce supply of fresh water capable of meeting its needs for both types of water. There is, however, an ample and sustainable supply of shallow inexpensive to obtain ground water but that is saline and unusable for either irrigation or potable water without removal of impurities. Presently this shallow ground water is a nuisance because as the water table increases through irrigation from other alternative and expensive or unsustainable fresh water sources such as from deep wells, the water table can rise to reach the root zones of crops and reduce crop yields despite the use of the expensive alternative pure water sources. An embodiment of the present invention may solve these problems by inexpensively treating a very high amount of this shallow ground water to sustainably provide both high quality irrigation and potable water while reducing the effects of increased water table, and providing a low quantity of water for disposal that is relatively non-toxic to wildlife and easy to manage.

Referring to the embodiment of FIG. 4 the system design there described will be used to calculate expected concentration of contaminants at an overall 90% water recovery and where the electrodialysis system is controlled to an 70% TDS removal in the electrodialysis diluate, a 90% recovery in the concentrate, contains monovalent selective anion and cation membranes using commercially available selectivities, and the pretreatment to the electrodialysis system consists of screen type prefiltration followed by acidification using hydrochloric acid to pH 4.5, and air stripping to remove incoming bicarbonate ion, and any iron, manganese, or sulfide and pH increase to pH 5.5. The concentrate makeup to the electrodialysis concentrate is taken from the pretreated influent and there is internal recirculation around the concentrate compartments.

A water analysis from Tranquility's shallow saline source is summarized below:

TDS: 3941 ppm; temperature 68 F; feed pH 6.5; Calcium 240 ppm as ion, magnesium 28 ppm as ion, sodium 1080 as ion, potassium 12 ppm as ion, sulfate 1480 ppm as ion, bicarbonate (post stripper) 25 ppm as ion, chloride (post acidification) 1076 as ion. (SAR of 17.6)

Calculated diluate from the electrodialysis apparatus is as follows:

TDS: 1209 ppm; calcium 209 ppm as ion, magnesium 25 ppm as ion, sodium 140 ppm as ion, potassium 2 ppm as ion, sulfate 617 ppm as ion, bicarbonate 7 ppm as ion, chloride 209 ppm as ion. (SAR of 1.7)—this water is also sent in part to the nanofiltration apparatus.

Calculated concentrate effluent from the electrodialysis apparatus is as follows:

TDS 27660 ppm; calcium 520 ppm as ion, magnesium 16 ppm as ion, sodium 9443 ppm as ion, potassium 100 ppm as ion, sulfate 8630 ppm as ion, bicarbonate 186 ppm as ion, chloride 8795 as ion. (SAR of 111).

As can be seen, this diluate water is ideal for use as irrigation water with SAR of 1.7 and low alkalinity and pH to aid in reducing soil sodicity. It is possible that the district would wish to remove only 50% or 60% of the TDS in such a case and operate and control the system to a somewhat higher but still acceptable SAR value, to utilize a still smaller electrodialysis system or save still more energy, or capture even more of the divalents for use in agriculture. The concentrate is low volume, and with low scaling potential (saturation index of 0.35) with only 10% of the influent water being sent to drain or for further high concentration use with predominantly sodium as the cation to be potentially used as a feed to prepare hydrochloric/sulfuric acid, caustic soda, or chlorine. The concentrate will also be relatively low in selenium and boron as compared to for example that what would be expected from reverse osmosis retentate, and thus more safely disposable.

Using a "loose" nanofilter a part of the electrodialysis diluate is then used to produce potable water. A loose nanofilter will typically reject 97.5% of divalents and 10% of the monovalents. Calculating from the diluate as feed and such rejections, the permeate from the nanofilter will have a calculated TDS of 333, well within the acceptable potability range. If even lower TDS values are desired for potable use, then a somewhat "tighter' nanofilter can be used, to reject monovalents for example up to 20% or 40% or higher. Since in the nanofilter, divalents are selectively rejected, the SAR of the nanofilter retentate will have an SAR even lower than the 1.7 SAR of the influent, and thus permit the retentate to be fully useful for irrigation water either by itself or in combination with the diluate of the electrodialysis apparatus. Recovery from the nanofilter apparatus can be determined strictly by the safety factor to reduce the precipitation potential in the retentate without regard to the amount of internal water recovery. This is due to the realization that the retentate may be fully used for irrigation and thus none of the retentate is wasted.

Total DC power to the electrodialysis system is a very low 3.653 kWh/kgal diluate owing to the fact that only 70% of the TDS need be removed. Pumping energy is also quite inexpensive because the wells are shallow, the electrodialysis system is generally a low pressure device, and the nanofilter is also operates at low pressure. Further, since 70% of the TDS is removed prior to entering the nanofilter apparatus, the osmotic pressure losses are low in the nanofilter.

Figure 21A:
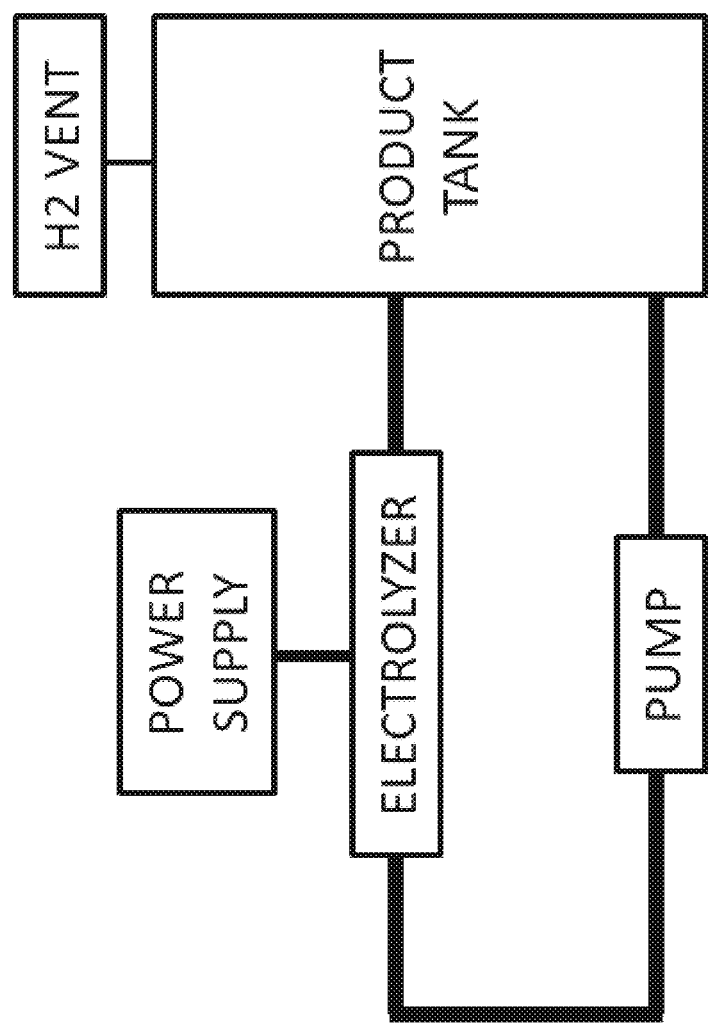
FIG. 21A illustrates the setup of a test system to evaluate performance of a recirculating electrolyzer system.

Example of Performance of an Electrochlorination System:

FIG. 21A depicts a recirculating electrolyzer system that has been tested.

In this setup, a 3.5% Instant Ocean® synthetic seawater solution (FIG. 21B) was prepared within the product tank. That solution was then recirculated through the electrolyzer for varying lengths of time (FIG. 21C, 7-120 min), while power was applied across the cell. $H_2$ gas was vented as it was generated, and the NaOCl product was allowed to accumulate.

Per the background discussion, it is believed that venting $H_2$ would prevent cathodic blinding, thus maintaining the local pH near the bulk value and mitigating $Mg(OH)_2$ scale. As confirmation, the bulk pH was measured to be between 8.6 and 8.8, and no observable precipitation was formed.

After sustained operation, the NaOCl product strength was measured via iodometric titration. Product strengths between about 750 and 6,200 ppm (FIG. 21C) were achieved. Such results represent a significant improvement over the current state of art.

It is anticipated that, through the regulation of feed stream composition, the aspects and embodiments disclosed herein would be able to achieve similar or greater performance.

Although various embodiments exemplarily shown have been described as using sensors, it should be appreciated that the invention is not so limited. The invention contemplates the modification of existing facilities to retrofit one or more systems, subsystems, or components and implement the techniques of the invention. Thus, for example, an existing facility, especially an agricultural or crop-growing facility, can be modified to include one or more systems configured to provide irrigation water, potable water, or both, accordance with any one or more embodiments exemplarily discussed herein. Alternatively, existing systems and/or components or subsystems thereof can be modified to perform any one or more acts of the invention.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in the claims.

Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is therefore to be understood that the embodiments described herein are presented by way of example only and that, within the scope of the appended claims and equivalents thereto; the invention may be practiced otherwise than as specifically described.

As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of" are closed or semi-closed transitional phrases, respectively, with respect to the claims. Further the use of the term "potable" with reference to water, especially treated water, does not limit the scope of the inventive subject matter and can refer to water suitable for livestock use, including consumption.

What is claimed is:

1. A water treatment system for producing potable water and water for irrigation from saline water, the system comprising:
   a nanofiltration apparatus having an inlet fluidly connectable to a source of water to be treated, a permeate outlet, and a retentate outlet;
   an electrodialysis apparatus positioned downstream of the nanofiltration apparatus and including one or more monovalent selective membranes, an inlet fluidly connectable to the retentate outlet of the nanofiltration apparatus, a diluate outlet, and a concentrate outlet; and
   an electrolyzer in fluid communication with the concentrate outlet and configured to generate a product stream including one or more of chlorine gas, hypochlorite ion, sodium hydroxide, sulfuric acid, hydrochloric acid, or sodium hypochlorite.

2. The water treatment system of claim 1, further comprising a product holding tank fluidically connected downstream of the electrolyzer.

3. The water treatment system of claim 1, wherein the electrolyzer includes a plurality of concentric tube electrode (CTE) electrochemical cells each having an anode-cathode pair disposed substantially concentrically.

4. The water treatment system of claim 3, wherein the plurality of CTE cells are fluidically connected in series.

5. The water treatment system of claim 1, further comprising a source of pH adjustment agent in fluid communication with an inlet of the electrolyzer.

6. The water treatment system of claim 5, wherein the source of pH adjustment agent includes an electrodialysis system.

7. The water treatment system of claim 6, wherein the electrodialysis system included in the source of pH adjustment agent includes bipolar membranes.

8. The water treatment system of claim 1, wherein the electrodialysis apparatus is configured to produce potable water.

9. The water treatment system of claim 1, further comprising a fluid oxygenation system in fluid communication between the electrodialysis apparatus and the electrolyzer.

10. The water treatment system of claim 1, further comprising an irrigation distribution system fluidly connectable to the retentate outlet of the nanofiltration apparatus and with the diluate outlet of the electrodialysis apparatus.

11. The water treatment system of claim 1, wherein the electrodialysis apparatus is configured to produce diluate having a sodium adsorption ratio (SAR) value of less than about 10.

12. The water treatment system of claim 11, wherein the nanofiltration apparatus is configured to produce retentate having a SAR value less than the SAR value of the diluate.

13. The water treatment system of claim 1, wherein the electrodialysis apparatus is configured to produce diluate having a higher ratio of divalent cations including magnesium and calcium to monovalent cations including sodium and a lower total concentration of ions than in the water to be treated.

14. The water treatment system of claim 1, wherein the inlet of the electrodialysis apparatus is configured to provide the retentate from the nanofiltration apparatus to both diluate and concentrate compartments of the electrodialysis apparatus.

* * * * *